(12) United States Patent
Matsushita et al.

(10) Patent No.: US 7,024,264 B2
(45) Date of Patent: Apr. 4, 2006

(54) DESIGNING METHOD OF A GLASS-PLATE-AIMED BENDING MOLD MAKING USE OF A 3-DIMENSIONAL CAD APPLICATION FOR SOLID MODELS

(75) Inventors: Yoshimitsu Matsushita, Osaka (JP); Chie Sugishita, Osaka (JP); Koichi Tsujiuchi, Osaka (JP); Mitsuo Tanaka, Osaka (JP)

(73) Assignee: Nippon Sheet Glass Company, Limited, Osaka (JP)

( * ) Notice: Subject to any disclaimer, the term of this patent is extended or adjusted under 35 U.S.C. 154(b) by 0 days.

(21) Appl. No.: 10/477,283

(22) PCT Filed: Jul. 1, 2002

(86) PCT No.: PCT/JP02/06640

§ 371 (c)(1),
(2), (4) Date: Nov. 10, 2003

(87) PCT Pub. No.: WO03/004424

PCT Pub. Date: Jan. 16, 2003

(65) Prior Publication Data

US 2004/0236447 A1 Nov. 25, 2004

(30) Foreign Application Priority Data

Jul. 4, 2001 (JP) ............................. 2001-203279

(51) Int. Cl.
*G06F 19/00* (2006.01)
(52) U.S. Cl. ...................................... 700/98; 700/197
(58) Field of Classification Search ................. 700/98, 700/197; 65/287–288, 104–107, 374.12
See application file for complete search history.

(56) References Cited

U.S. PATENT DOCUMENTS

| 4,865,639 A | * | 9/1989 | Kudo ........................... 65/287 |
| 4,964,068 A | * | 10/1990 | Matsushita et al. ........... 358/1.3 |
| 5,071,461 A | * | 12/1991 | Hirotsu et al. ................ 65/104 |

FOREIGN PATENT DOCUMENTS

| JP | 05 108765 A | 8/1993 |
| JP | 2000 099565 A | 9/2000 |
| JP | 2000 351639 A | 4/2001 |

OTHER PUBLICATIONS

International Search Report, Jan. 14, 2003.

* cited by examiner

*Primary Examiner*—Leo Picard
*Assistant Examiner*—Douglas S. Lee
(74) *Attorney, Agent, or Firm*—RatnerPrestia

(57) ABSTRACT

The present invention aims at providing a method for designing a glass-plate-aimed bending mold making use of a 3-dimensional CAD application for solid models, in a short time with simple operations, by utilizing a previously designed solid model. To this end, there is modified a ring frame of a solid model of a mold stored in an existing-solid-model storing part, such that the ring frame conforms to the shape of a new glass plate, by glass shape replacing means. By using modified parameter reflecting means, the modification of the modifiable parameters inherited from the existing solid-model is reflected to the modified solid model, to thereby optimize the modifiable parameters of a new solid model.

11 Claims, 67 Drawing Sheets

GEOMETRIC MODEL

WIREFRAME MODEL

SURFACE MODEL

SOLID MODEL

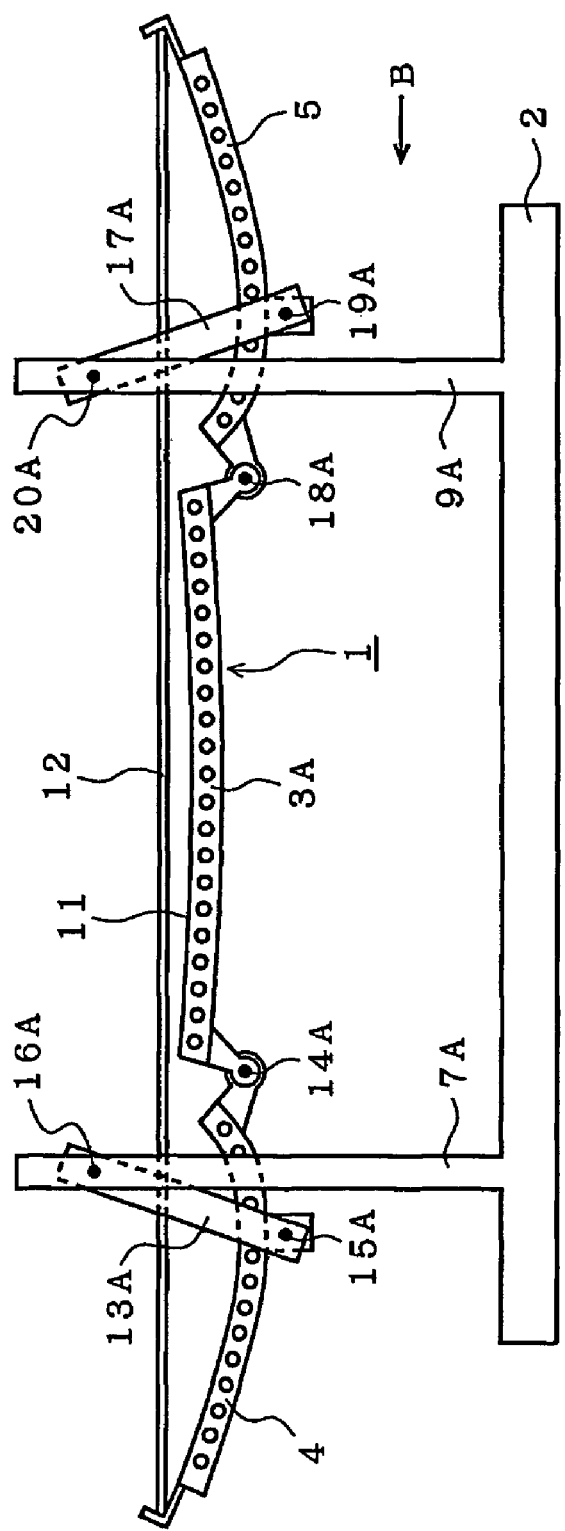
F I G. 8

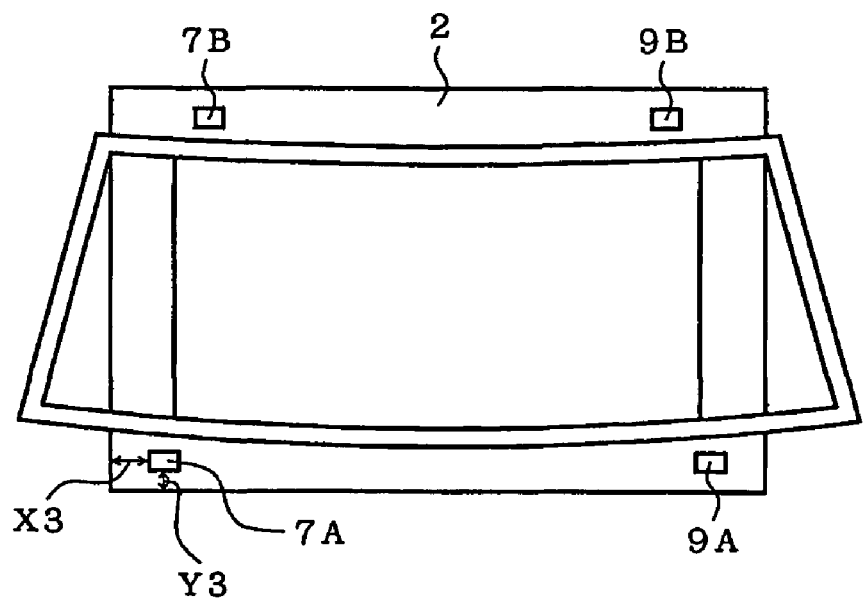
F I G. 2 1
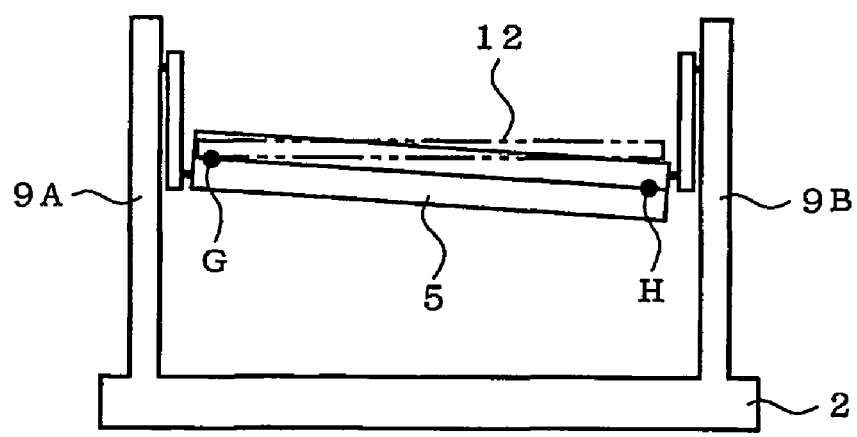
F I G. 2 2

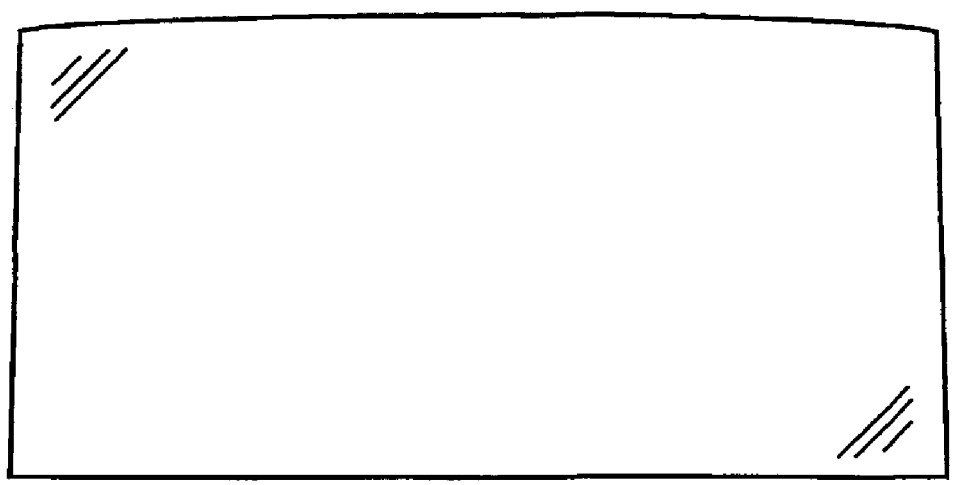
F I G . 2 4
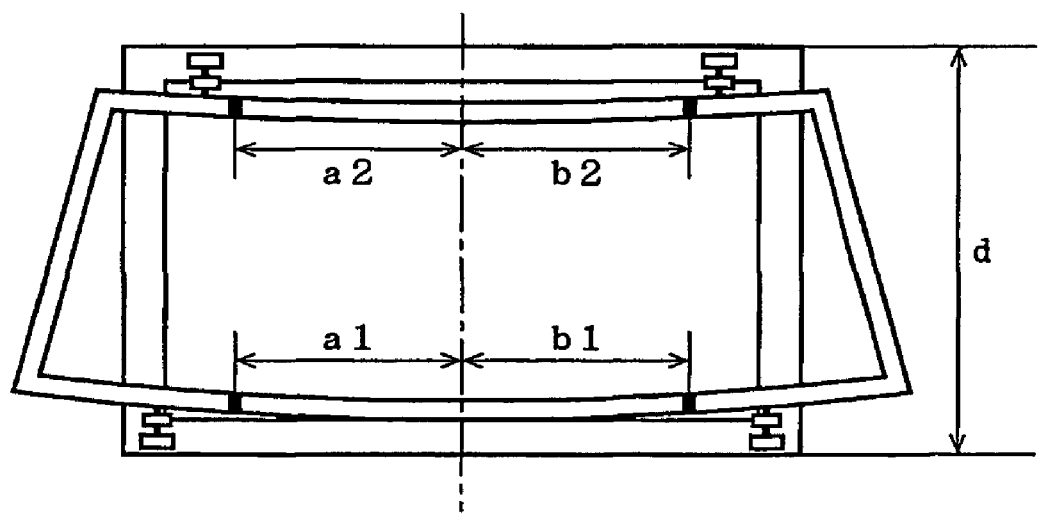
F I G . 2 5

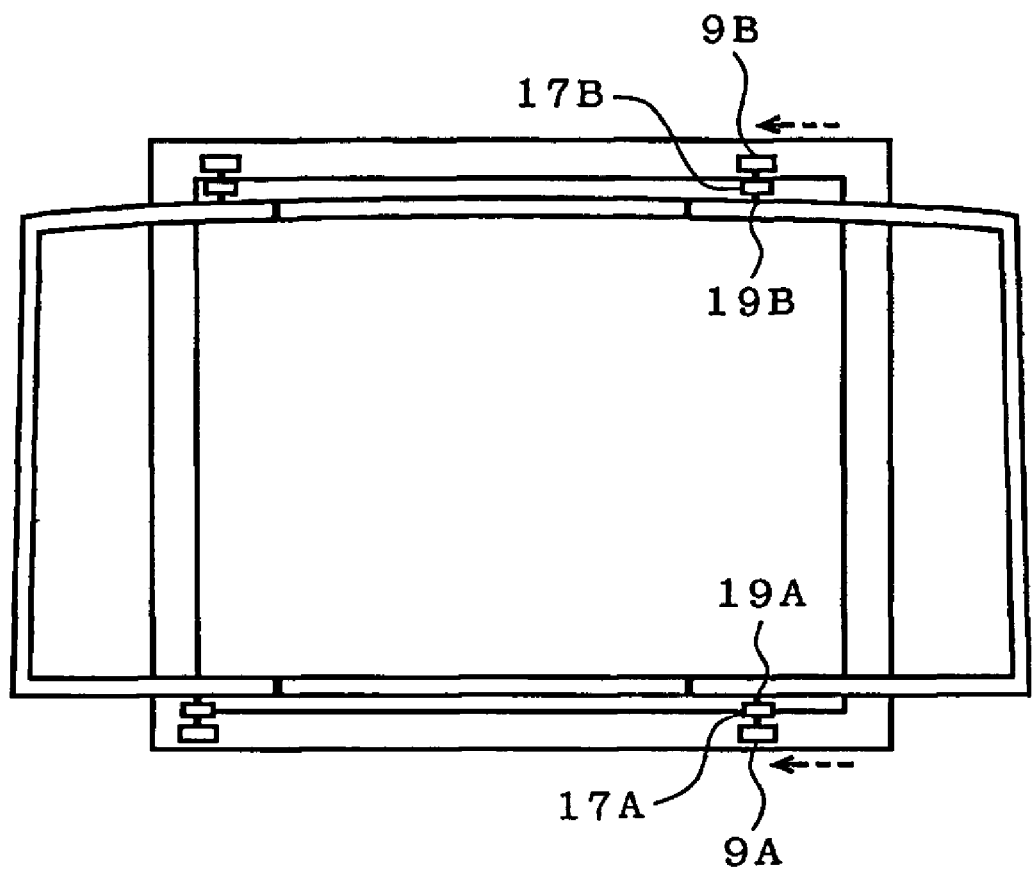
F I G . 2 9

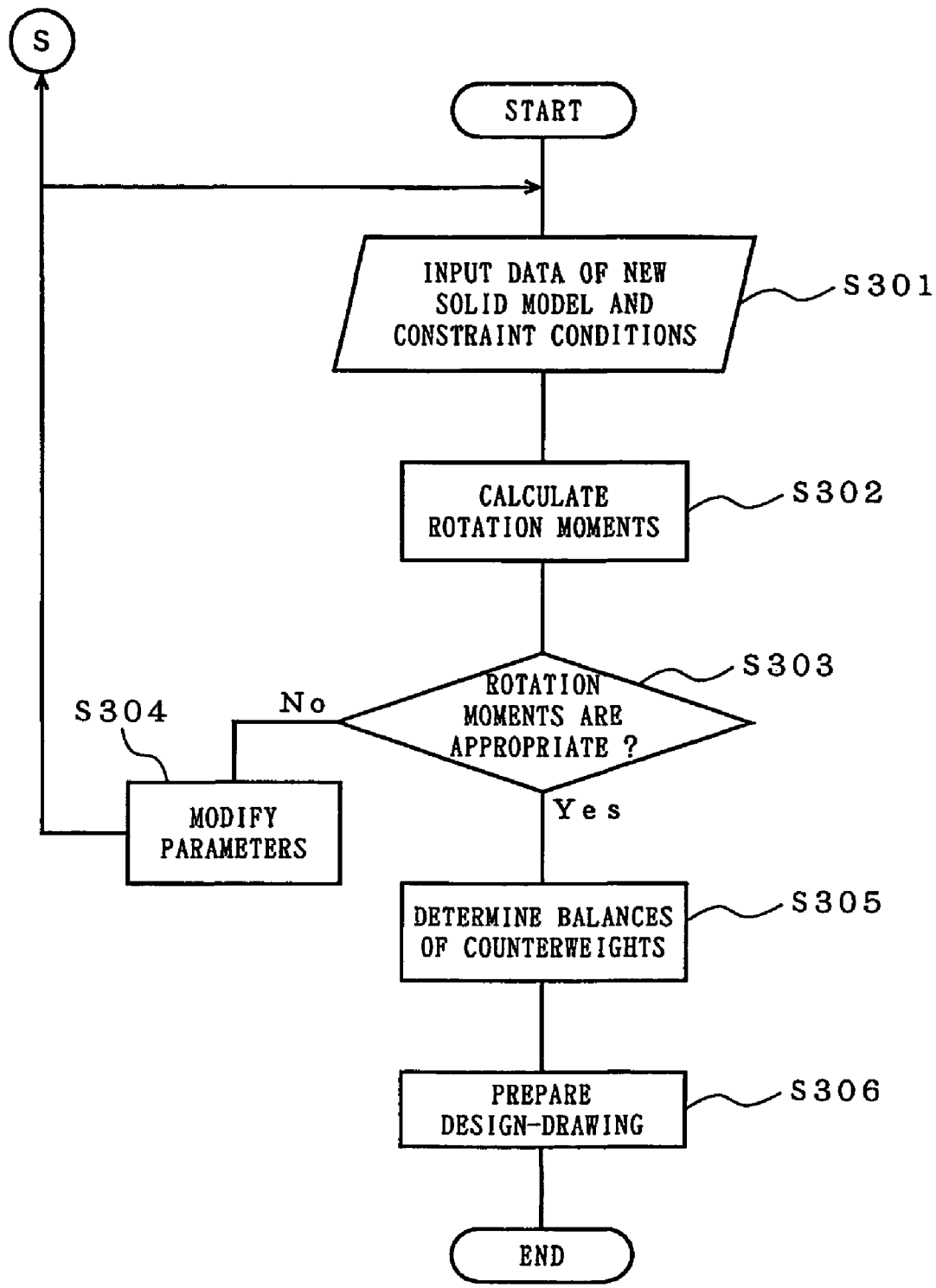
F I G. 3 0

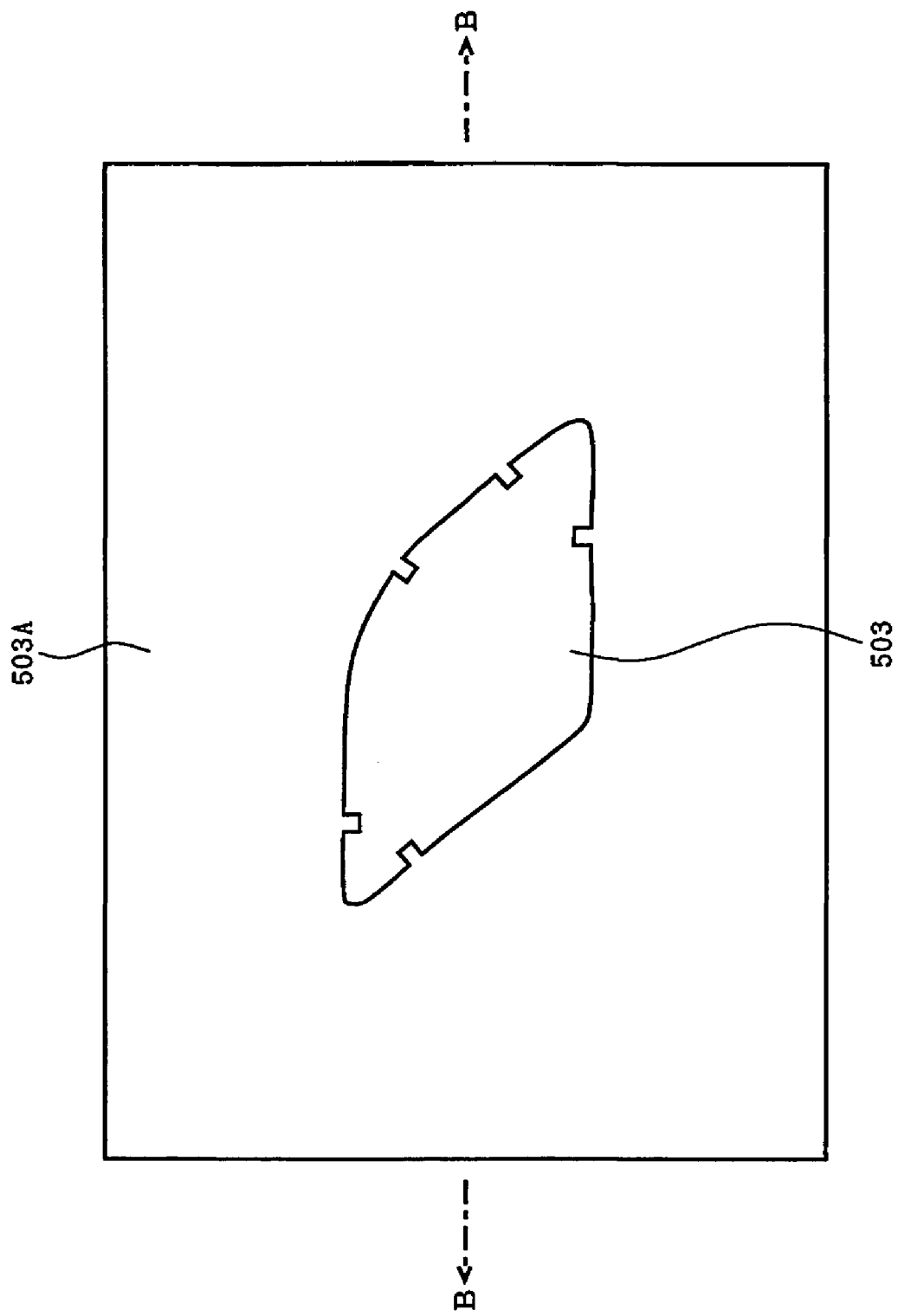
F I G . 3 3

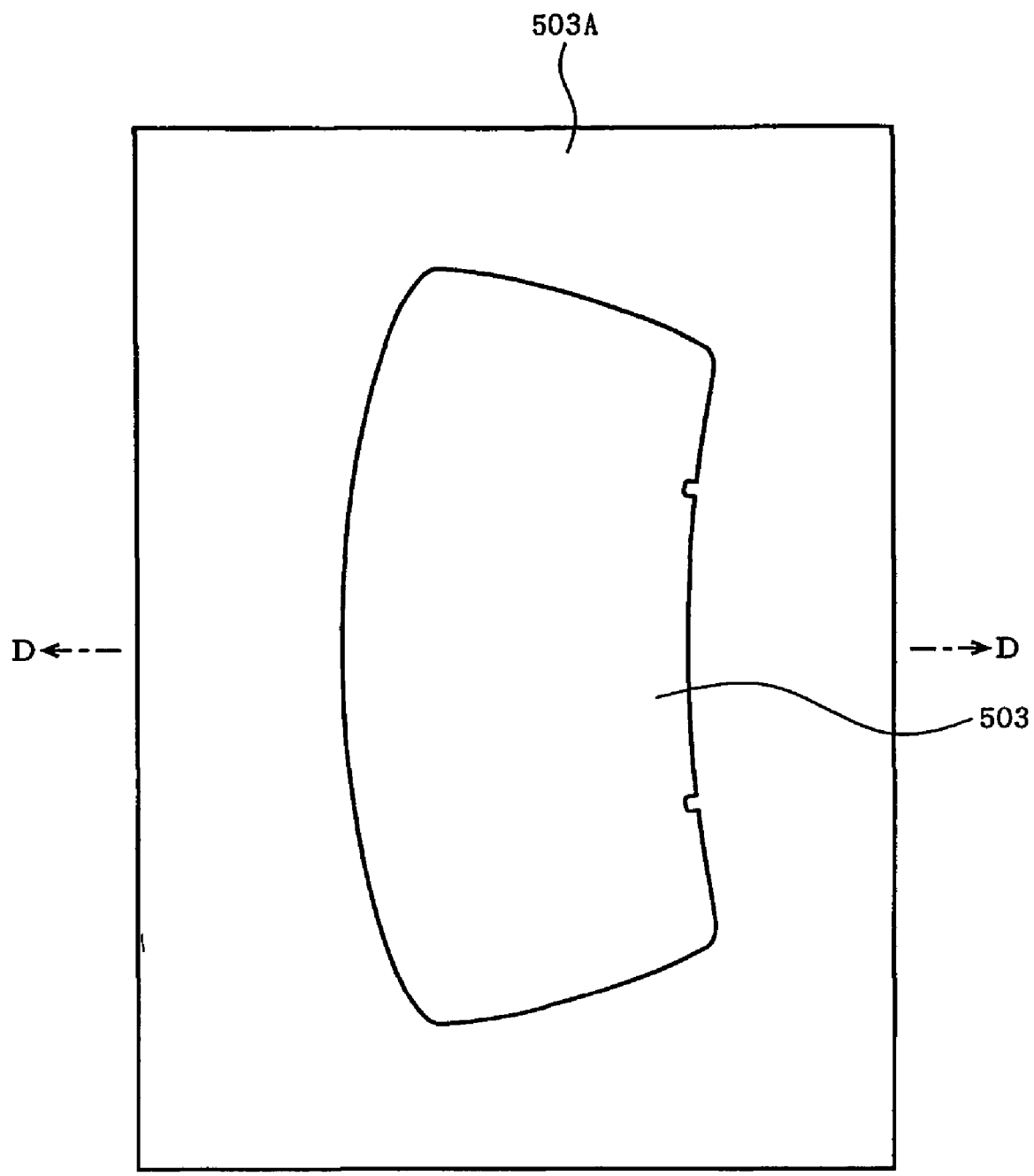
F I G. 3 6

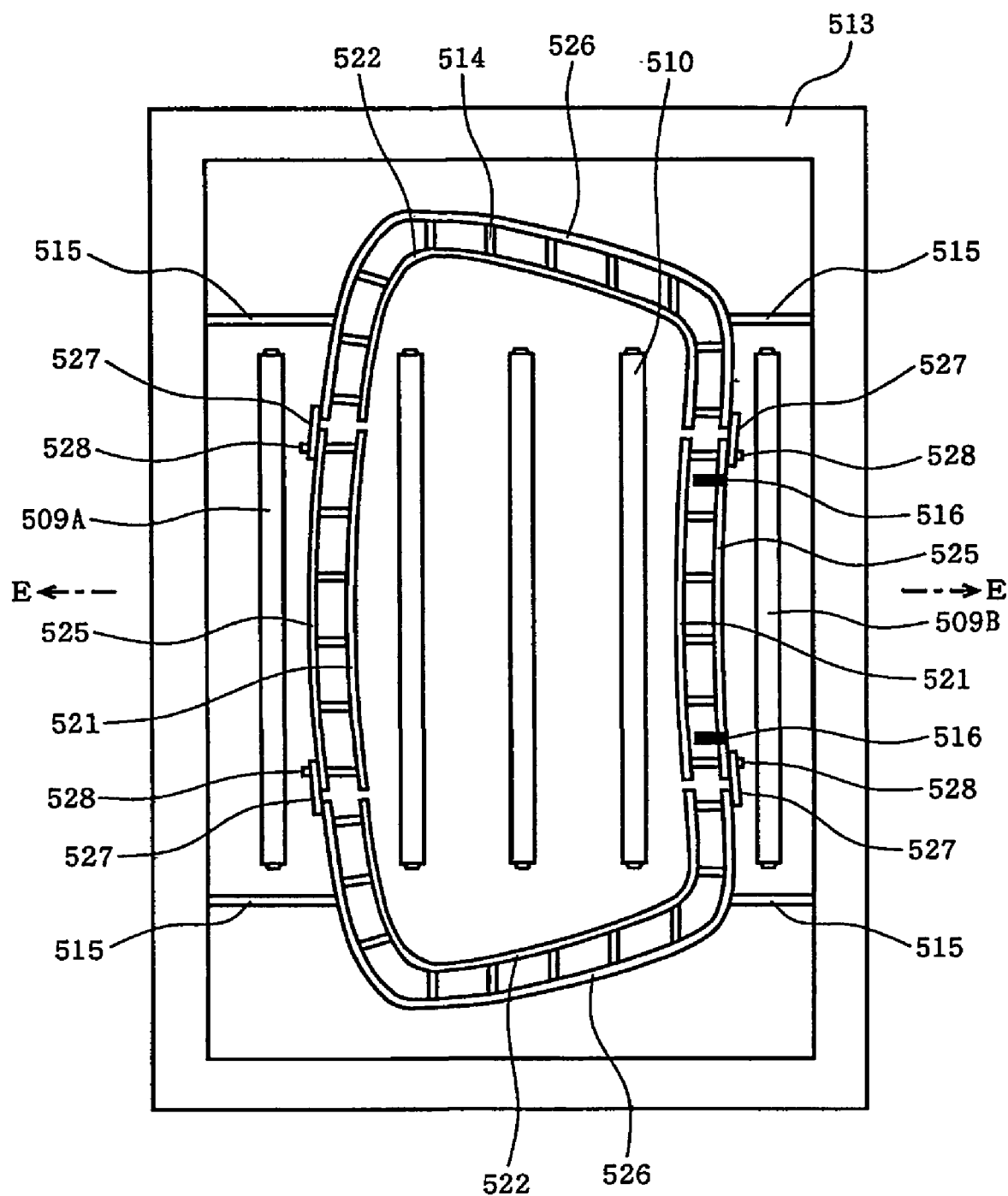
F I G . 3 8

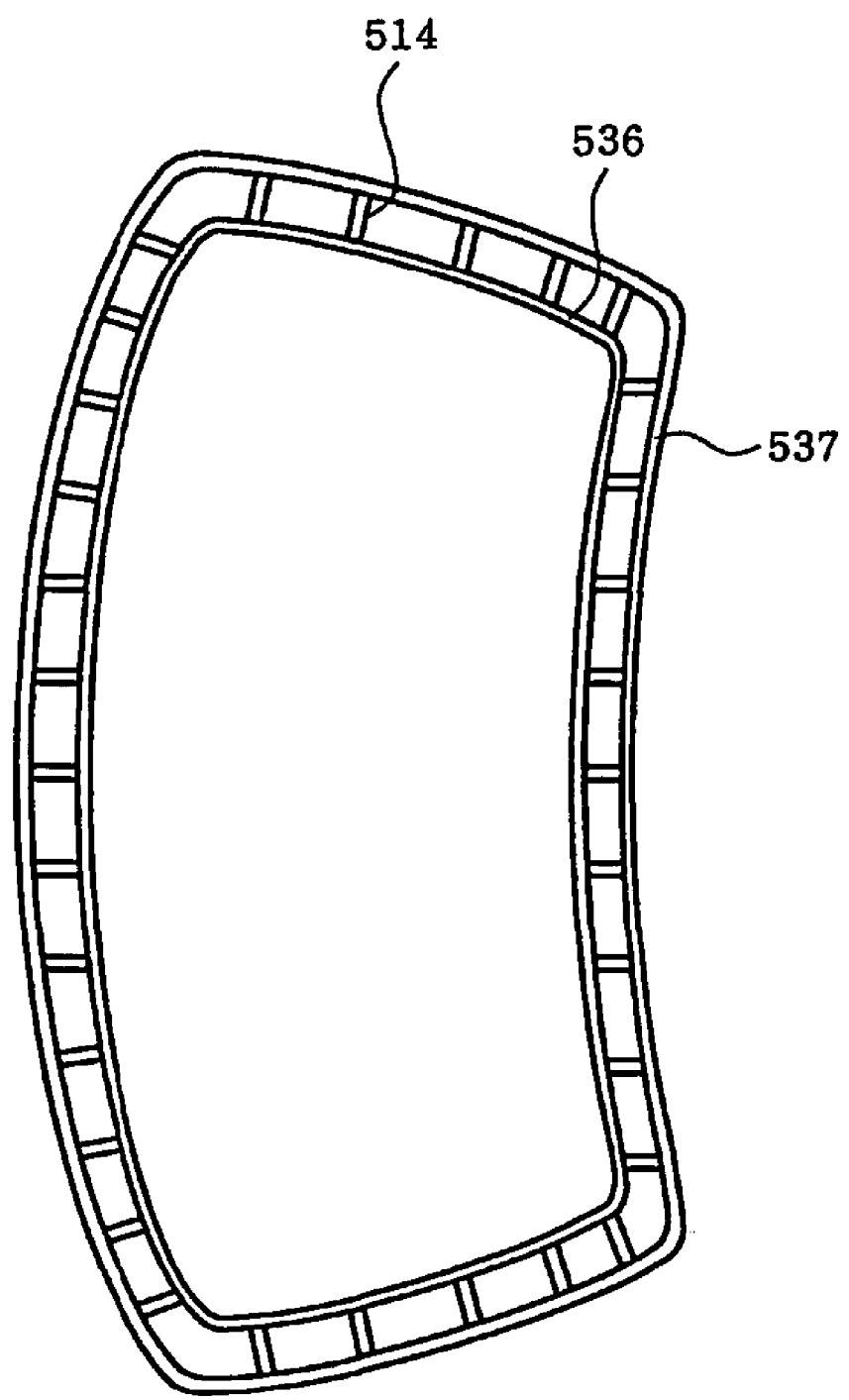
F I G. 4 1

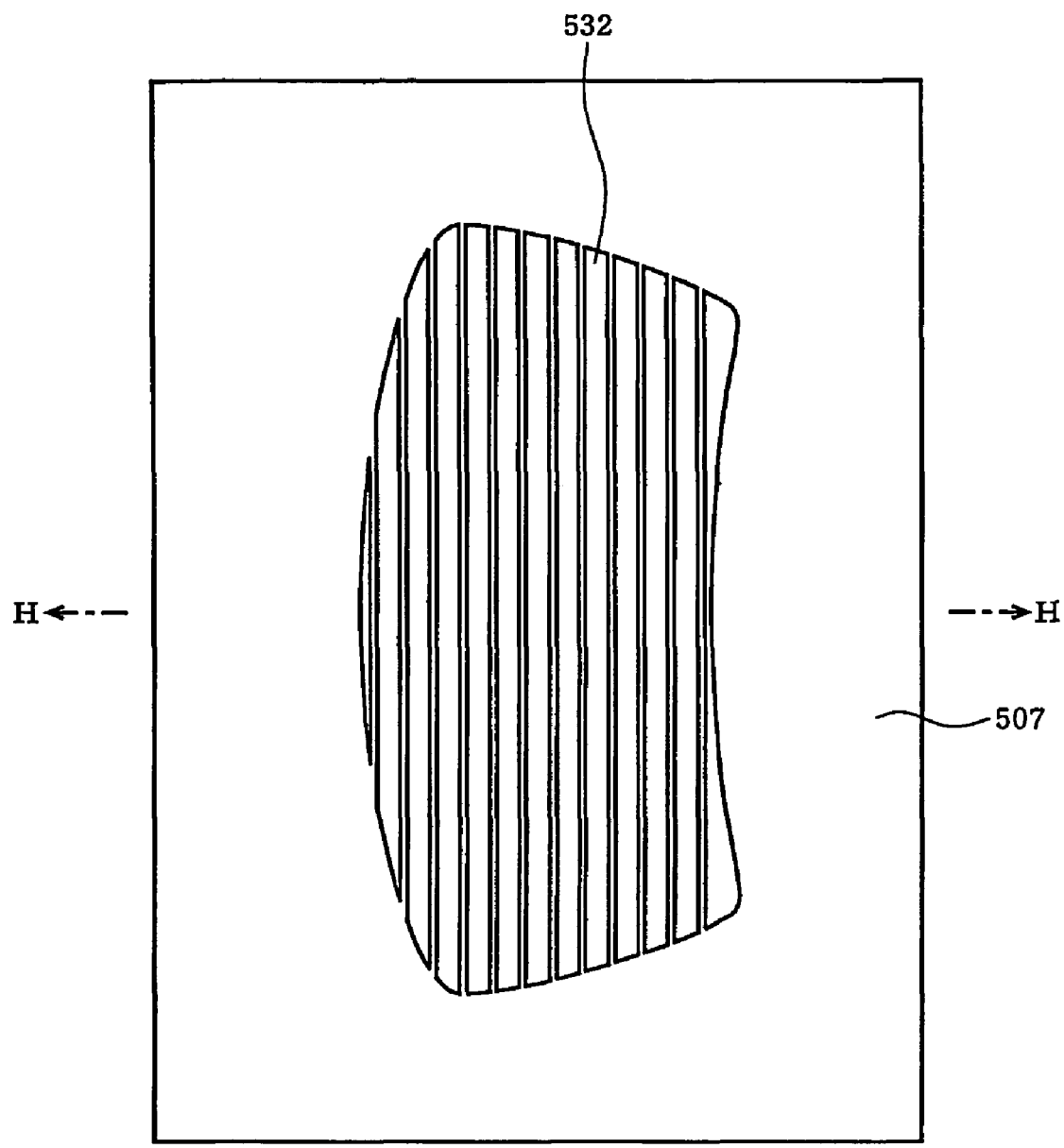
F I G. 4 2

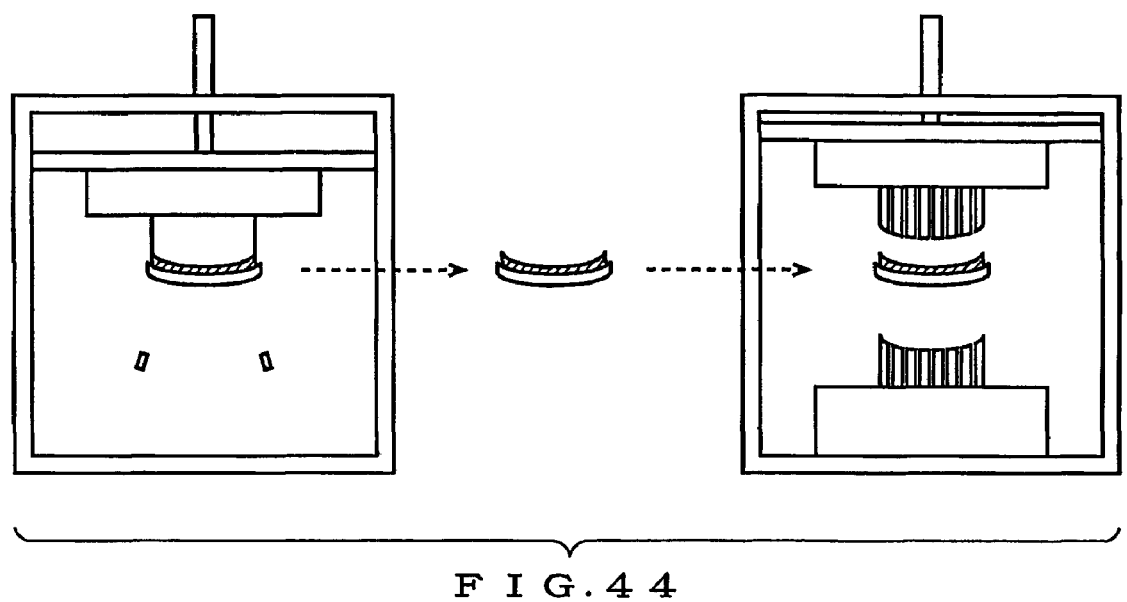
F I G. 4 4

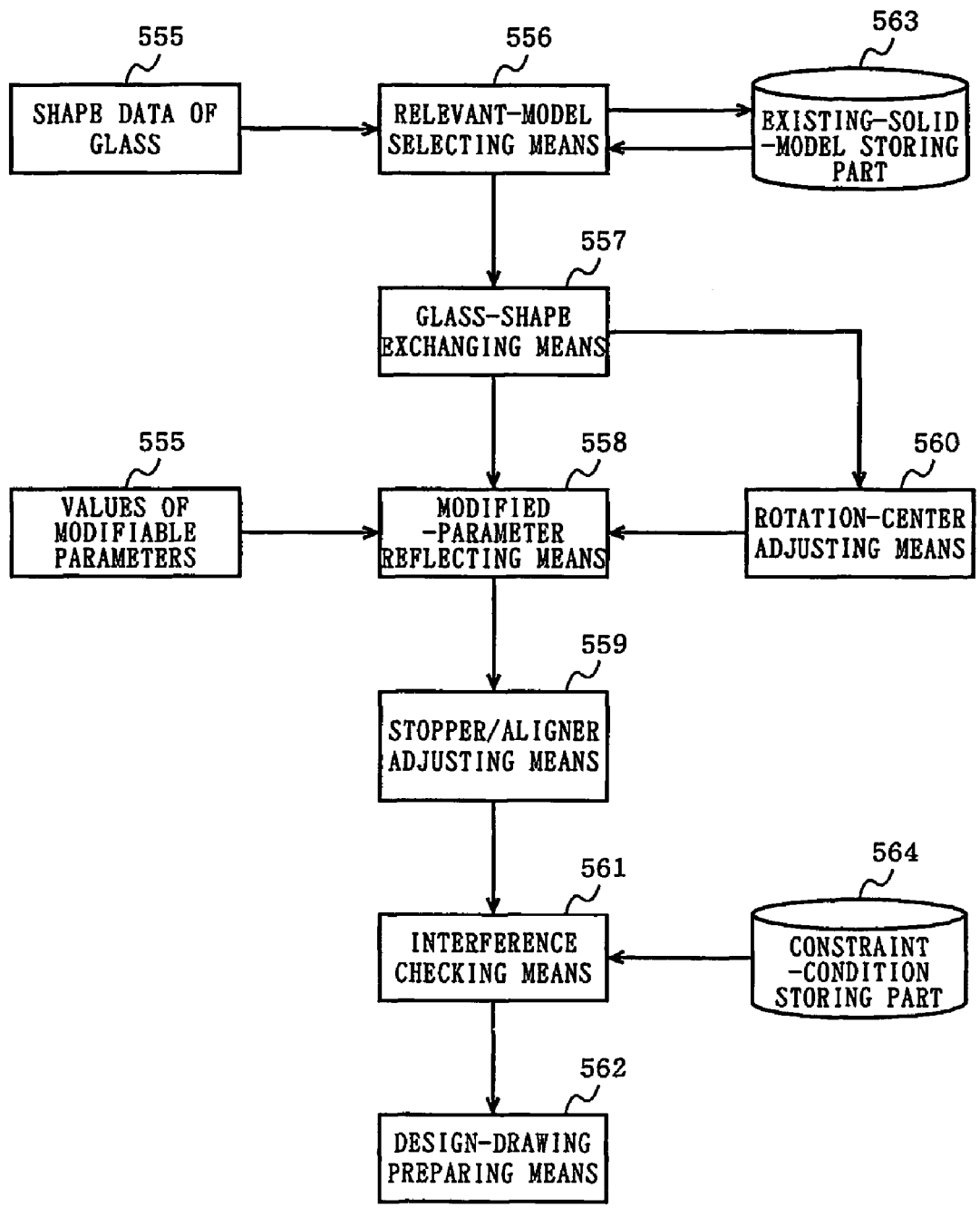
F I G . 4 5

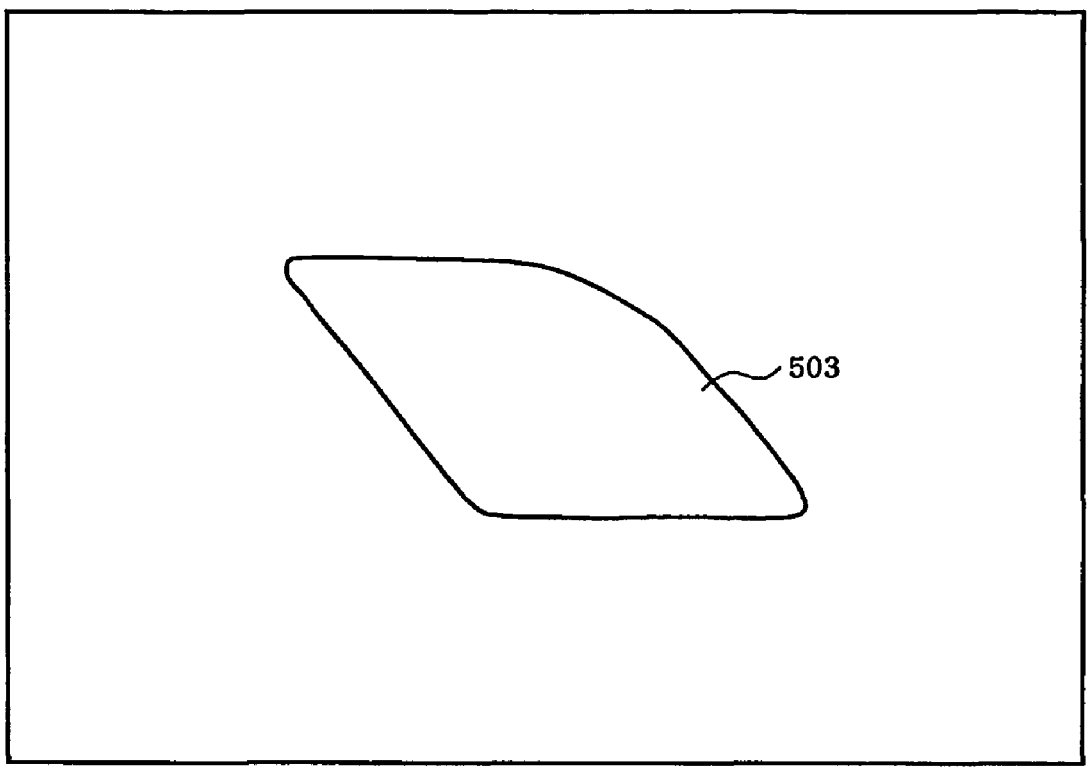
F I G. 5 6

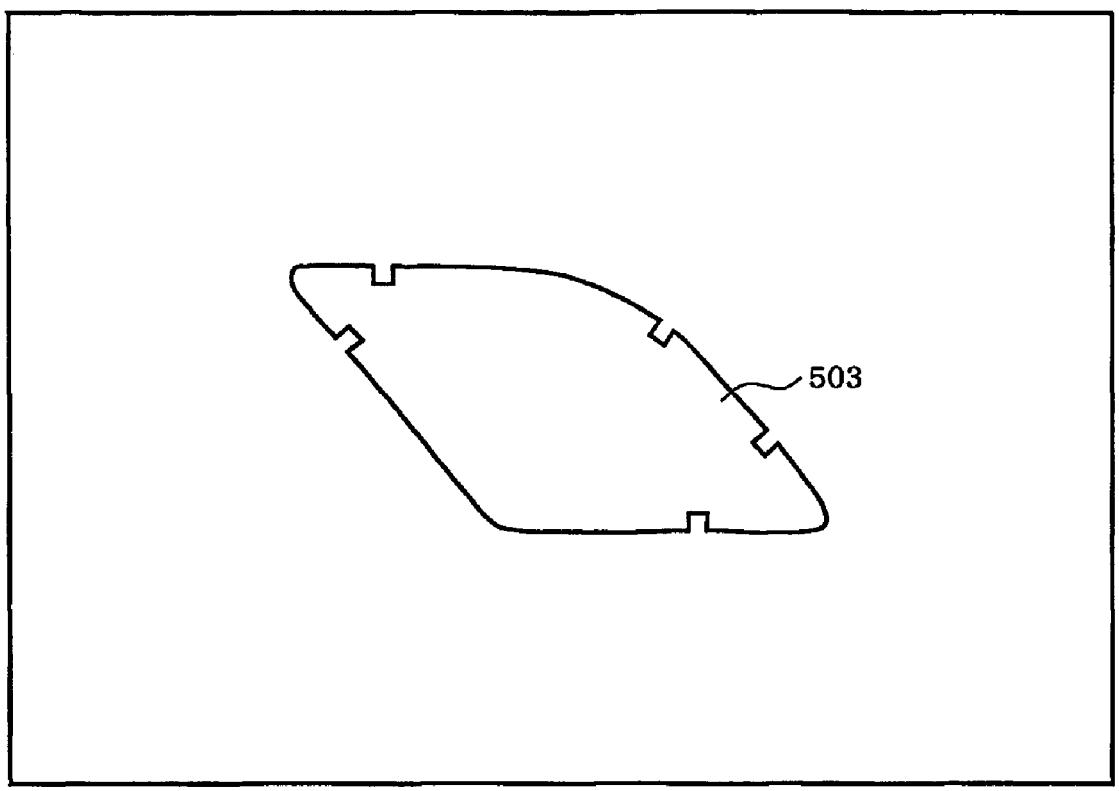
F I G. 5 7

F I G. 6 7
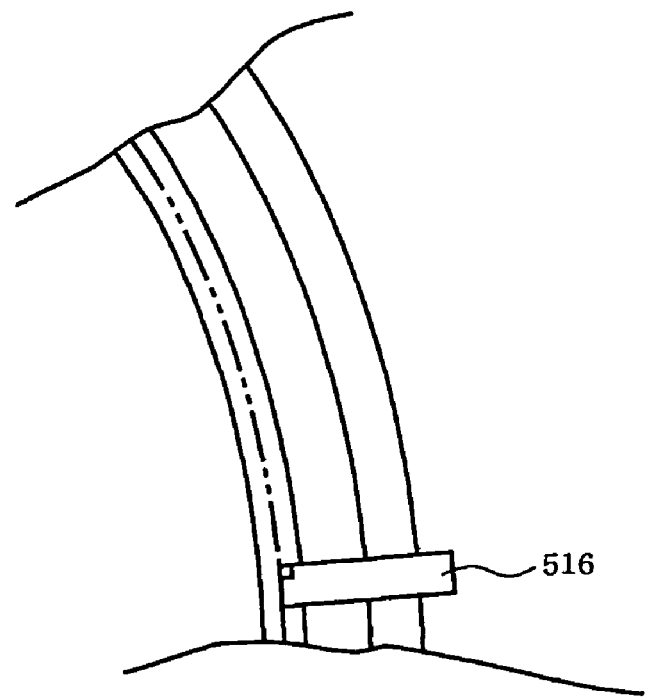
F I G. 6 8
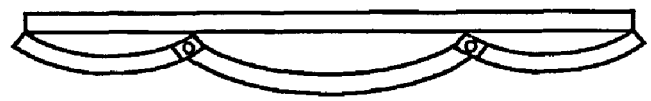

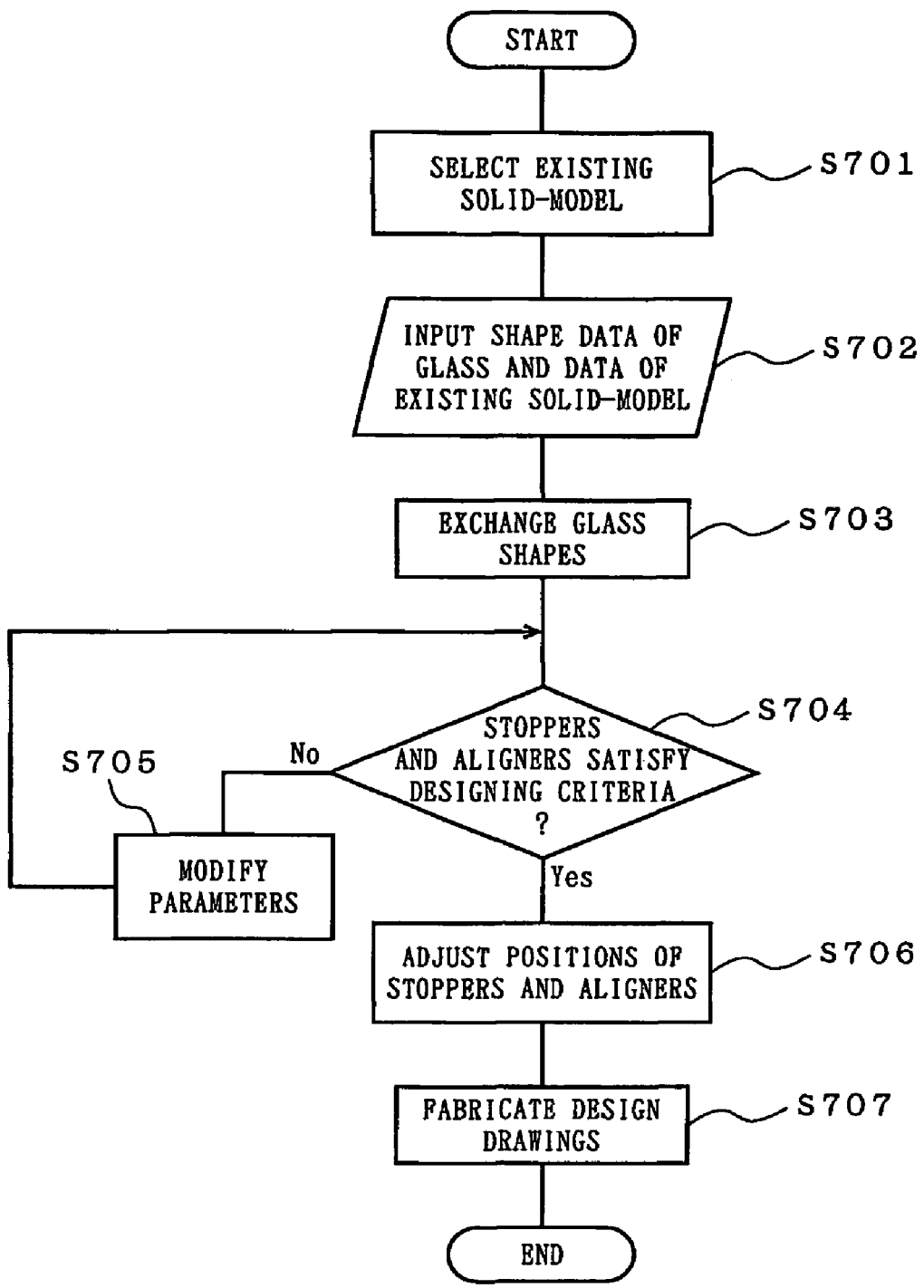
F I G. 6 9

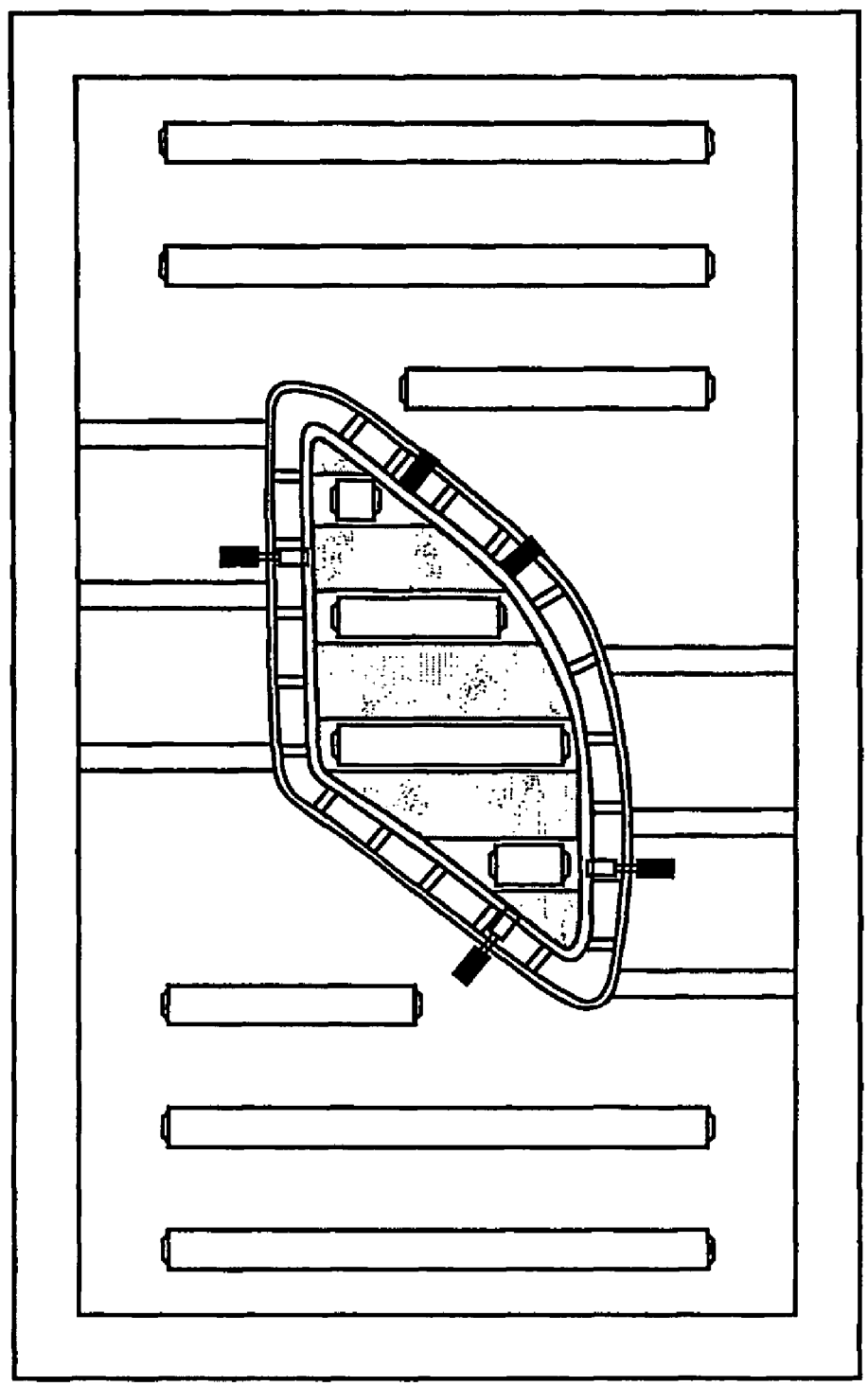
F I G. 7 3

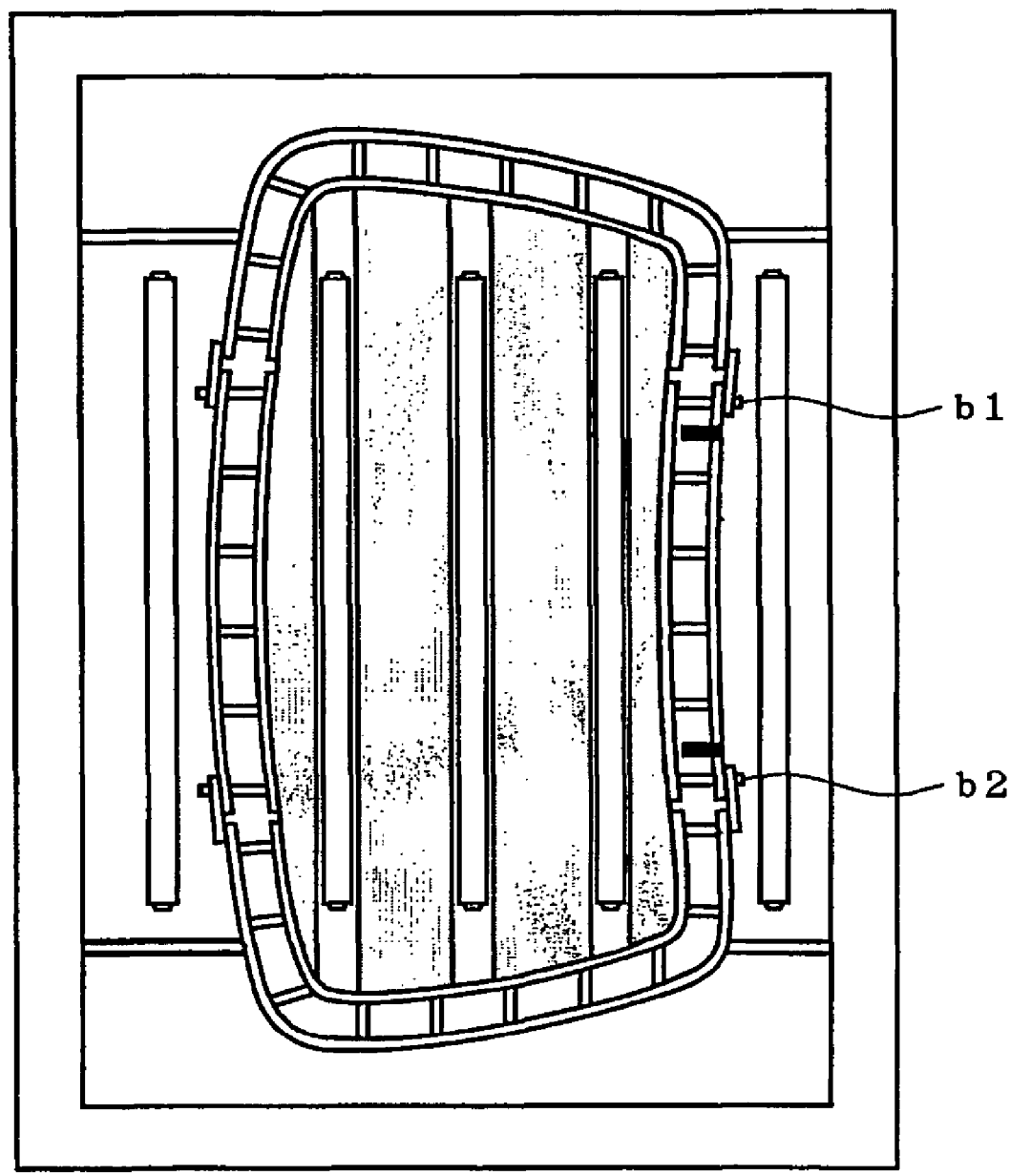
F I G. 7 7

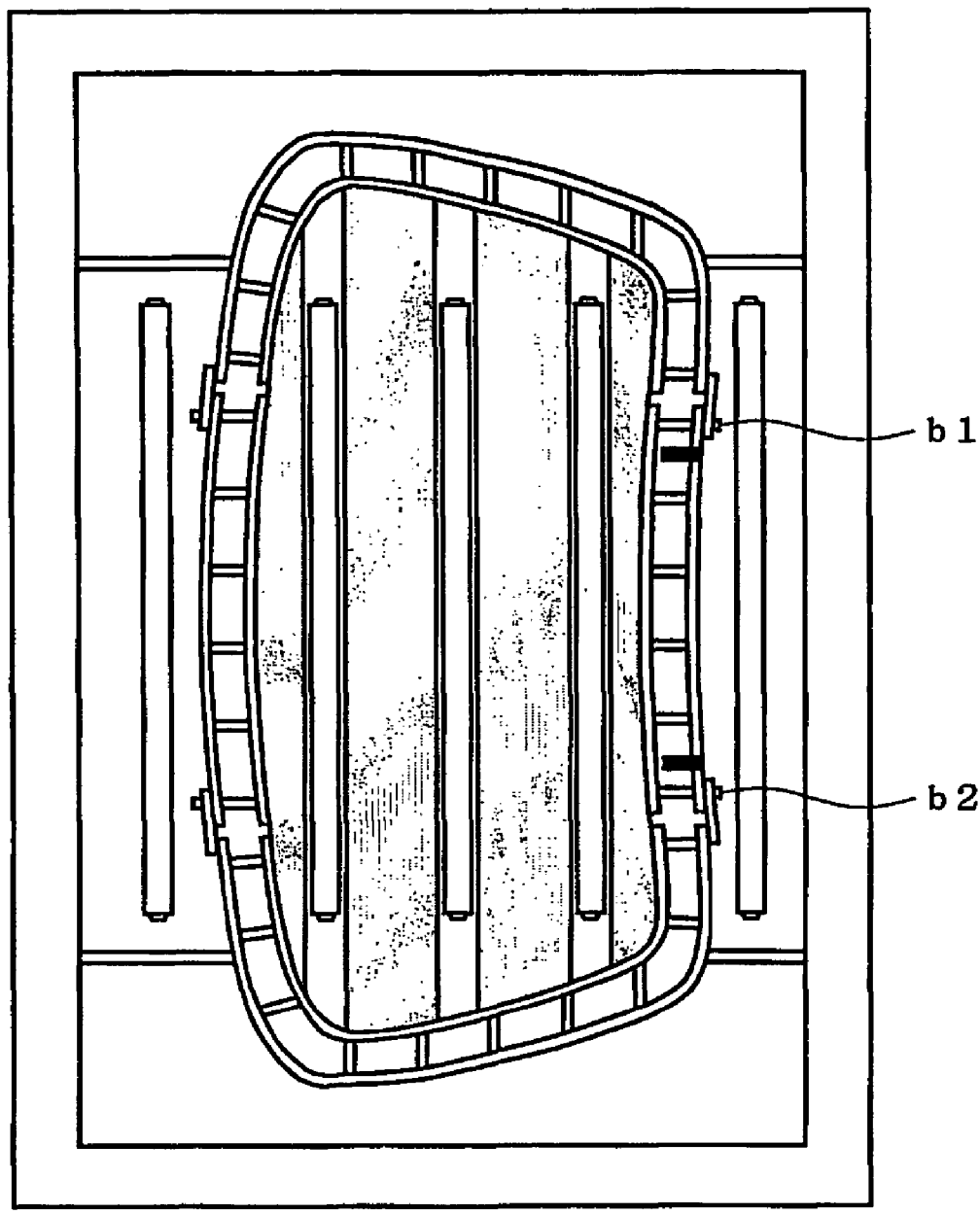
F I G. 7 8

FIG.81
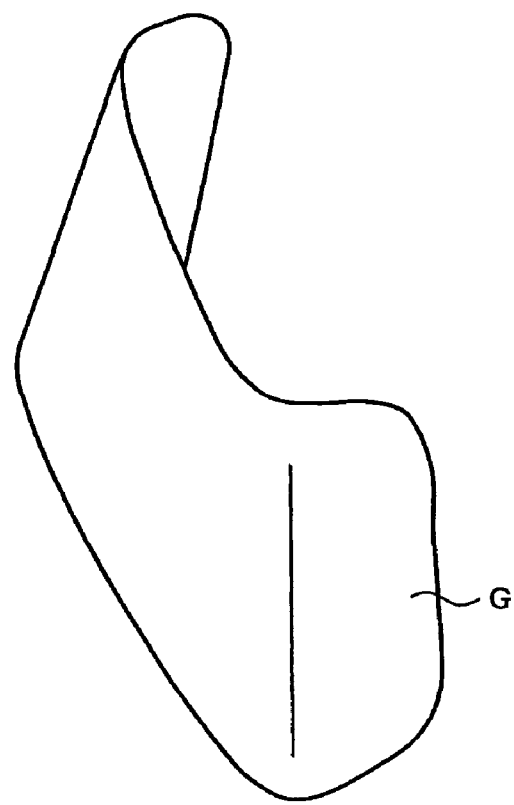
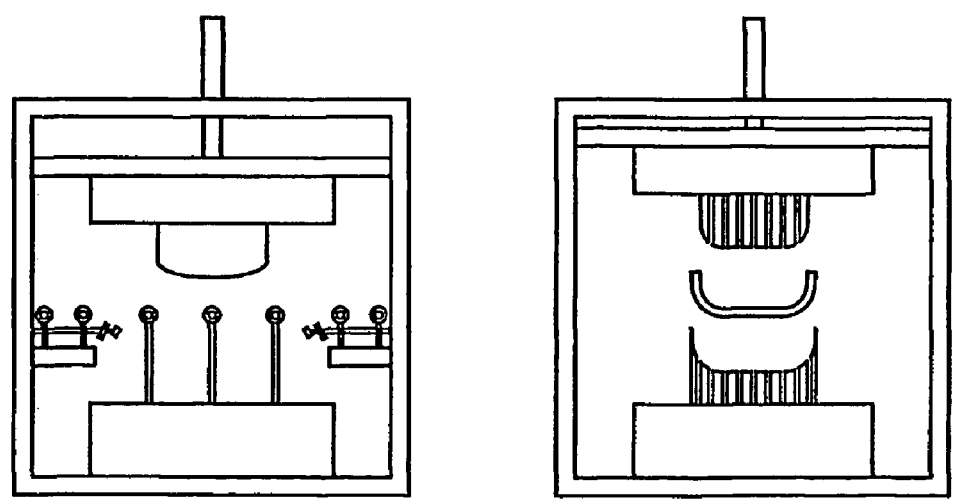
FIG.82

DESIGNING METHOD OF A GLASS-PLATE-AIMED BENDING MOLD MAKING USE OF A 3-DIMENSIONAL CAD APPLICATION FOR SOLID MODELS

TECHNICAL FIELD

The present invention relates to a designing method of a glass-plate-aimed divided-type gravity-sagging/bending mold making use of a 3-dimensional CAD application capable of handling solid models, and particularly to a designing method of a glass-plate-aimed divided-type gravity-sagging/bending mold for designing a new divided-type mold by utilizing a previously designed solid model.

In addition, the present invention relates to a designing method of a glass-plate-aimed press-bending mold making use of a 3-dimensional CAD application capable of handling solid models, and particularly to a designing method and system of a glass-plate-aimed press-bending mold for designing a new press-bending mold by utilizing a previously designed solid model of a press-bending mold.

BACKGROUND ART

There will be described CAD, firstly. CAD (Computer Aided Design) systems are widely used in designing operations. CAD systems are also used for aiding drawing operations, after designing operations. Further, by the development of computers, CAD systems allow more sophisticated operations. Moreover, those situations where the features of CAD systems are maximally utilized include a situation where previously designed shapes are altered and utilized.

Further, 3-dimensional CAD applications are also practiced, in addition to 2-dimensional CAD applications. Geometric models in such 3-dimensional CAD applications include a wireframe model, a surface model and a solid model (see FIGS. 1A, 1B and 1C).

Firstly, the wireframe model relates to a method for expressing a shape, by a 3-dimensional body comprising ridge lines and apexes in a 3-dimensional space. It is also possible to consider that the wireframe model can be handled in a 3-dimensional space by adding Z values to a 2-dimensional geometric figure.

Next, the surface model relates to a method for expressing a shape, by a 3-dimensional body prepared by mutually attaching predetermined "series of ridge lines" each constituting a surface. Namely, this method is to express a 3-dimensional body based on a combination of surfaces, by defining each surface by information of a series of ridge lines constituting the boundaries of the surface.

As a result of containing information of surfaces, the application field of these models are being extremely widespread, such as to allow: application to bent surface processing; and preparation of cross-sectional views.

In the wireframe models and surface models as briefly described above, 3-dimensional bodies are expressed as lines or surfaces, so that those models have no information indicating where the entities are. For example, in those models prepared as surface models, it is impossible to determine whether the contents of the 3-dimensional shapes are hollow or solid.

Contrary, the solid model relates to a method for expressing a shape by a 3-dimensional body filled with contents and the solid model has the information indicating where the entity of the shape is, so that the solid model is capable of completely expressing the 3-dimensional body.

Simply giving data of a relative density to a 3-dimensional shape prepared by using a solid model is extremely effective in various applications, such as: mass property calculation of weight and center of gravity; checking of interference between parts; NC programming; mechanism analysis; shading; hidden-line-deleting display; and preparation of 2-dimensional drawings.

However, the data structure is complicated in solid models, thereby possibly causing practical limitations that the calculation burden of a computer is increased for modifying or displaying the shape, resulting in a prolonged processing time.

Meanwhile, in CAD systems, there has been developed a so-called parametric designing method for designing those parts which are mutually analogous and have different sizes. This is a method for automatically reconstructing geometric figures, by simply modifying dimension values.

Further, designing operations include so many geometric figures and parts to be repeatedly used. These are called "parts" and "figures", for example. In solid modeler, these parts are combined in various windows to thereby perform a final design.

There will be now described windshield glass. Vehicular windshield glass is constituted of laminated glass, so as to ensure a field of view upon breakage of the windshield glass. Such laminated glass is provided by adhering two glass plates 50, 51 to each other via intermediate film 53 comprising thermoplastic resin such as polyvinyl butyral (see FIG. 2).

The two glass plates constituting the laminated glass are required to have substantially the same shapes, for adhering to each other.

As such, the two glass plates are cut out into predetermined dimensions from a flat blank plate manufactured by a float process, and then placed on a ring-like mold and transferred into a heating furnace. These two glass plates are heated in the furnace to the softening point of the glass, so that the two glass plates are deformed by the self-weights or are sagged by gravity, and given with predetermined shapes. At this time, the shapes of the two glass plates become substantially the same with each other, which is preferable for constituting the laminated glass.

Further, those widely used shapes of windshield glass frequently have largely bent right and left ends. In forming a flat glass plate into such a shape, it is frequently insufficient to use a simple ring-like mold. Thus, there has been developed and practiced a ring-like mold having divided right and left ends 61, 62 (see FIG. 3).

Meanwhile, various sizes and types of automobiles have the substantially same shapes of windshield glass. In many cases, only the sizes of windshield glass are analogously changed and/or the dimensions of particular portions are changed.

This allows to fabricate models of new molds by altering previously prepared models, in manufacturing new windshield glass.

There will be then described vehicular door glass and rear glass. Vehicular door glass and rear glass are frequently formed of tempered glass. Such tempered glass is obtained by: heating a glass plate up to temperatures near its softening point; and then quenching the glass plate by blowing air onto both surfaces of the glass plate.

For example, glass plates are: cut out into predetermined dimensions from a flat blank plate manufactured by a float process; transferred into a heating furnace so that the glass plates are heated therein; and taken out of the heating furnace and press-worked by a press-mold, to thereby obtain a predetermined shape. Thereafter, the glass plates are quenched so as to be tempered by a cooling process.

Further, those widely used shapes of rear glass frequently have largely bent right and left ends. In forming a flat glass plate into such a shape, it is frequently insufficient to use a simple ring-like mold. Thus, there has been developed and practiced a ring-like mold having divided right and left ends.

Meanwhile, shapes of vehicular door glass and rear glass can be classified into several representative shapes. Further, shapes themselves of vehicular door glass and rear glass are frequently applicable to anyone of the classified shapes, even when vehicular sizes and/or shapes are varied in themselves. In many cases, only the sizes of door glass and rear glass are analogously changed and/or the dimensions of particular portions thereof are changed, in the applicably classified shapes, respectively.

This allows to fabricate models of new molds by altering previously prepared models, in manufacturing new door glass or rear glass.

On the other hand, in developing vehicles, it has been required to further shorten the development time. Particularly, the development time for those types of vehicles using common platforms (chassis) is further shortened, as compared with those vehicles using newly developed platforms. As such, there has been required a faster response within a further shortened delivery period, also in manufacturing windshield glass, door glass, or rear glass.

To cope with the above, it is effective to alter those existing mold models. However, in altering mold models by utilizing 3-dimensional CAD applications, it will be an extremely inefficient operation to alter and modify individual parts constituting the mold in accordance with the altering conditions, part by part.

Further, it is also required to consider constraint conditions such as mutual interference among parts, thereby frequently making it difficult to conduct the altering and modifying operations therefor within a short time.

Moreover, modifying dimensions of a certain part problematically requires many man-hours, in order to precisely reflect the consequence to other parts, for example. Thus, even when existing mold models have been altered, it has been difficult to evaluate whether such alterations achieve the intended designing purpose or not.

DISCLOSURE OF INVENTION

The present invention has been carried out in view of the aforementioned circumstances, and it is therefore an object of the present invention to provide a designing method of a glass-plate-aimed divided-type gravity-sagging/bending mold utilizing a 3-dimensional CAD application capable of handling solid models, which method is capable of designing molds within a short time by simple operations.

It is also an object of the present invention to provide a designing method and system of a glass-plate-aimed press-bending mold, capable of designing a bending mold in a short time by a simple operation while utilizing a 3-dimensional CAD application capable of handling solid models.

According to the present invention, there is provided a designing method of a glass-plate-aimed bending mold making use of a 3-dimensional CAD application for solid models, said method comprising the steps of:

providing bending-shape data of a first glass plate targeted by a bending mold to be designed;

retrieving an existing solid-model of a bending mold from a solid model database;

replacing, bending-shape data of a second glass plate as a basis for constructing the existing solid-model, with the bending-shape data of the first glass plate;

remodeling the existing solid-model to generate a first solid model of a bending mold for the first glass plate, by automatically modifying designed values required to be modified and by automatically inheriting designed values unrequired to be modified due to the step of replacing the bending-shape-data of the second glass plate with the bending-shape data of the first glass plate, for the designed values possessed by the existing solid-model;

judging whether predetermined design criteria are satisfied by values of predetermined modifiable parameters among the designed values inherited by the first solid model from the existing solid-model, or not;

when the values of the predetermined modifiable parameters do not satisfy the predetermined design criteria; modifying the values of the predetermined modifiable parameters, and automatically modifying other designed values required to be modified due to the modifying the values of the predetermined modifiable parameters; and repeating the modifying the values of the predetermined modifiable parameters until the predetermined design criteria are satisfied; and when the values of the predetermined modifiable parameters satisfy the predetermined design criteria, creating bending-mold fabricating data based on data of the first solid model.

There is also provided a designing method of a glass-plate-aimed divided-type gravity-sagging/bending mold making use of a 3-dimensional CAD application capable of handling solid models, said method comprising the steps of:

providing bending-shape data of a targeted glass plate of a mold intended to be designed;

retrieving an existing solid-model of a divided-type gravity-sagging/bending mold from a solid model database;

replacing: bending-shape data of a certain glass plate for determining at least the dimensions and shape of a ring frame constituting the retrieved existing solid-model; by the provided bending shape data of the targeted glass plate;

remodeling the retrieved existing solid-model by automatically modifying designed values required to be modified and by inheriting designed values unrequired to be modified due to the replacement of the bending-shape data of the certain glass plate, for those designed values possessed by the retrieved existing solid-model; to thereby generate a solid model of a divided-type gravity-sagging/bending mold for the provided glass plate;

judging whether predetermined design criteria are satisfied by values of predetermined modifiable parameters among those designed values inherited by the generated solid model from the retrieved existing solid-model, or not;

when the values of the predetermined parameters do not satisfy the predetermined design criteria; modifying the values of the predetermined parameters, and automatically modifying other designed values required to be modified due to the modification of the values of the predetermined parameters; and repeating the modification of the values of the predetermined parameters until the predetermined design criteria are satisfied; and when the values of the predetermined parameters satisfy the predetermined design criteria; automatically preparing a drawing of the designed divided-type mold based on the data of the remodeledly generated solid model.

There is also provided a designing method of a glass-plate-aimed press-bending mold making use of a 3-dimensional CAD application capable of handling solid models, said method comprising the steps of:

(a) providing bending-shape data of a glass plate targeted by a bending mold to be designed;

(b) retrieving, from a solid model database, an existing solid-model of a press-bending mold for a glass plate having the most analogous shape to the bending shape of the targeted glass plate;

(c) matching, those elements constituting the bending shape of the glass plate as a basis for constructing the retrieved existing solid-model, with those elements constituting the bending shape of the provided glass plate; and for each matched pair of elements, exchanging, those designed values included in the bending-shape data of the glass plate as a basis for constructing the retrieved existing solid-model, for those designed values included in the bending-shape data of the provided glass plate, to thereby replace, the bending-shape data of the glass plate as a basis for constructing the retrieved existing solid-model, by the bending-shape data of the provided glass plate;

(d) remodeling the retrieved existing solid-model into a solid model of the press-bending mold for the provided glass plate; by automatically modifying those designed values required to be modified as a result of the replacement between the bending-shape data of the glass plates, and by automatically inheriting those designed values unrequired to be modified even as a result of the replacement between the bending-shape data of the glass plates; in accordance with predetermined criteria; for those designed values possessed by the constituent parts constituting the retrieved existing solid-model;

(e) judging whether: values of those predetermined modifiable parameters among designed values inherited, by said remodeledly generated solid model, from the retrieved existing solid-model; satisfy predetermined designing criteria or not;

(f) when the values of the predetermined parameters fail to satisfy the predetermined designing criteria, modifying the values of the predetermined parameters, and automatically modifying those other designed values required to be modified by the modification of the values of the predetermined parameters, and repeating the modifying step, until the values of the predetermined parameters satisfy the predetermined designing criteria; and (g) when the values of the predetermined parameters satisfy the predetermined designing criteria, creating press-bending-mold fabricating data based on the data of said remodeledly generated solid model.

Incidentally, the invention of the above method also holds for the invention of a system. Also, the above invention holds for a program for implementing a predetermined function in a computer or a record medium in which the program is recorded.

The designed values noted in the present specification shall mean design information for defining solid models, for example, and apply to such information of dimensions, positions and shapes of constituent parts of solid models.

Further, those means noted in the present specification are realizable, by hardware, software or a combination thereof. The realization by the combination of hardware and software applies to execution of a predetermined program in a computer system, for example.

Further, it is also possible to realize: a function(s) possessed by one means, by two or more pieces of hardware, software, or a combination thereof; and functions of two or more means, by a single piece of hardware, software, or a single combination thereof.

Further objects, advantages and details of the present invention will become more apparent from the following description of preferred embodiments when read in conjunction with the accompanying drawings.

BRIEF DESCRIPTION OF DRAWINGS

FIG. 8 is a front view showing a constitution of a second divided-type gravity-sagging/bending mold;

FIG. 21 is a view explaining a definition example of a base frame of the solid model;

FIG. 22 is a side view in a B-direction of the divided-type mold shown in FIG. 5;

FIG. 24 is a view showing a shape example of a glass plate as a design object;

FIG. 25 is a view showing an exemplary constitution of an existing solid model;

FIG. 29 is a view showing an exemplary constitution of a solid model reflecting those modifications of parameters;

FIG. 30 is a flowchart explaining procedures for optimizing rotation moments;

FIG. 33 is a view in a B—B arrow direction in FIG. 31;

FIG. 36 is a view in a D—D arrow direction in FIG. 34;

FIG. 38 is a view in an E—E arrow direction in FIG. 37;

FIG. 41 is a plan view showing a general constitution of a quenching ring mold;

FIG. 42 is a view in an H—H arrow direction in FIG. 40;

FIG. 44 is an explanatory view of a function of the quenching ring mold;

FIG. 45 is a block diagram showing a constitution of a 3-dimensional CAD system according to the second embodiment of the present invention;

FIGS. 48 through 57 are views showing definition examples of solid models;

FIGS. 65 through 67 are schematic views for explaining adjustment of stoppers and aligners;

FIG. 68 is a view showing a flat-plate placing state of the pressing ring mold;

FIG. 69 is a flowchart for explaining a method for designing a glass-plate-aimed press-bending mold;

FIG. 73 is a view showing an exemplary constitution of a solid model reflecting the modifications of parameters;

FIG. 77 is a view showing an exemplary constitution of an existing solid-model;

FIG. 78 is a view showing an exemplary constitution of a solid model remodeledly generated by the glass-shape exchanging means;

FIG. 81 is a view showing an exemplary shape of a glass plate as a design target; and FIG. 82 is a view showing an exemplary constitution of a solid model remodeledly generated by the glass-shape exchanging means.

BEST MODE FOR CARRYING OUT THE INVENTION

In accordance with the embodiment of the present invention, a designing method of a glass-plate-aimed bending mold making use of a 3-dimensional CAD application for solid models will be described. The method of the invention will be described specifically, by using, in the first embodiment, a divided-type gravity-sagging/bending mold as a example of the glass-plate-aimed bending mold, and by using, in the second embodiment, a press-bending mold as a example of the glass-plate-aimed bending mold.

(First Embodiment)

There will be firstly described hereinafter a glass-plate-aimed divided-type gravity-sagging/bending mold to be designed by a designing method of a divided-type mold according to the present invention, as an embodiment of the present invention. In the following description, there will be described vehicular glass (windshield glass), as an exemplar of a glass plate.

(First Divided-Type Mold)

Figure 1A:
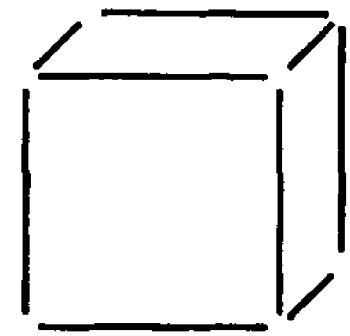
FIGS. 1A, 1B and 1C are views explaining the types of geometric models in 3-dimensional CAD.
Figure 1B:
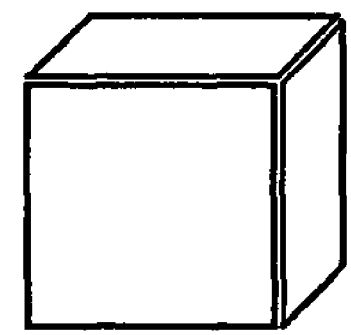
Figure 1C:
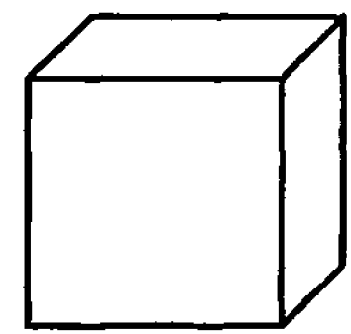
Figure 2:
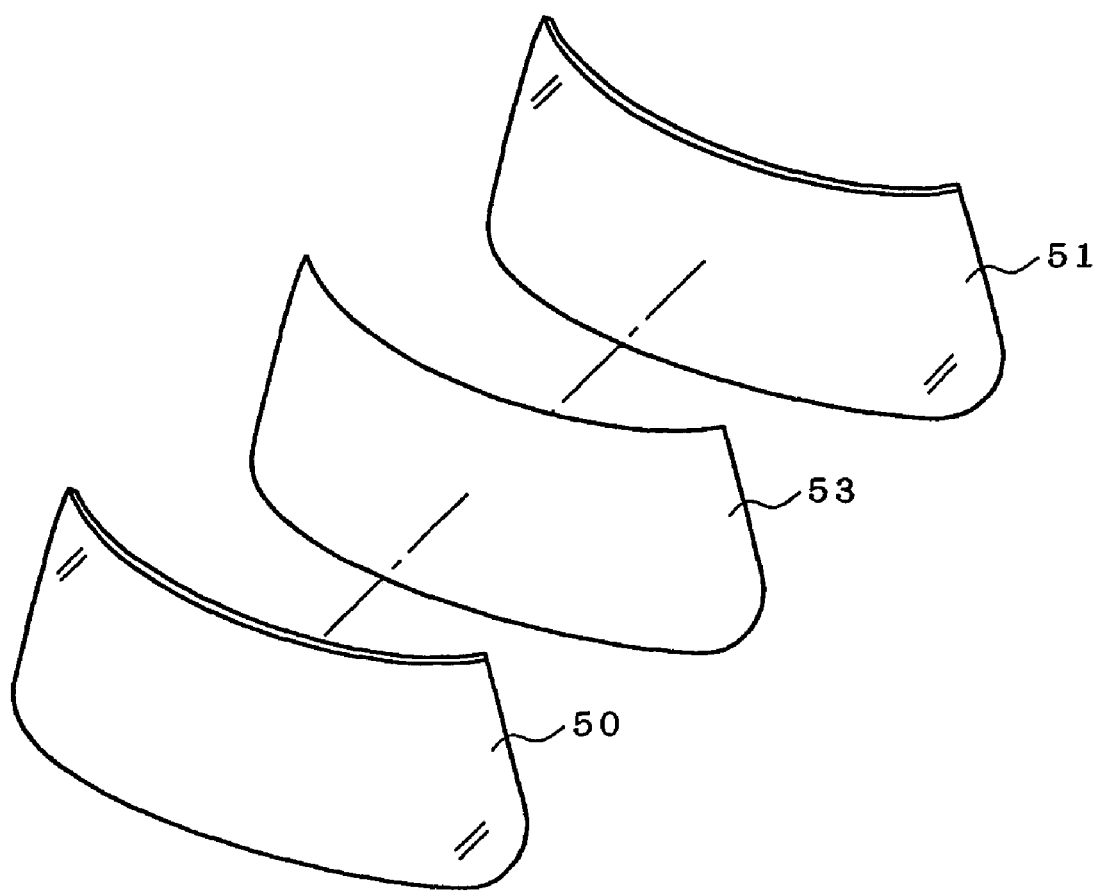
FIG. 2 is a view explaining a constitution of laminated glass.
Figure 3:
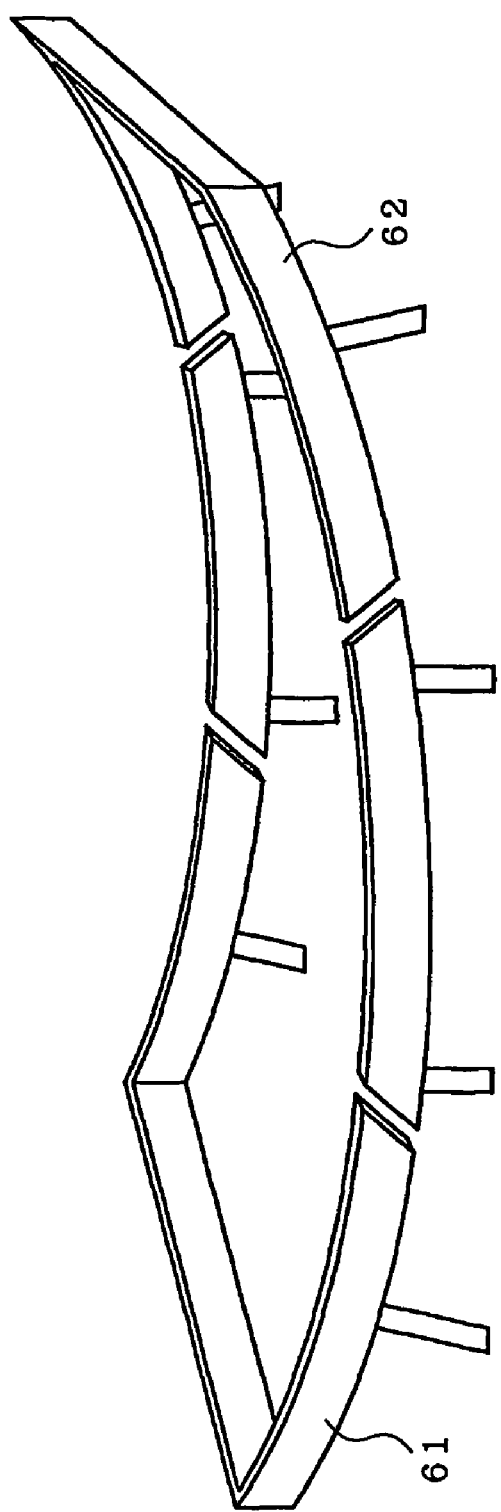
FIG. 3 is a view showing a conventional divided-type mold.
Figure 4:
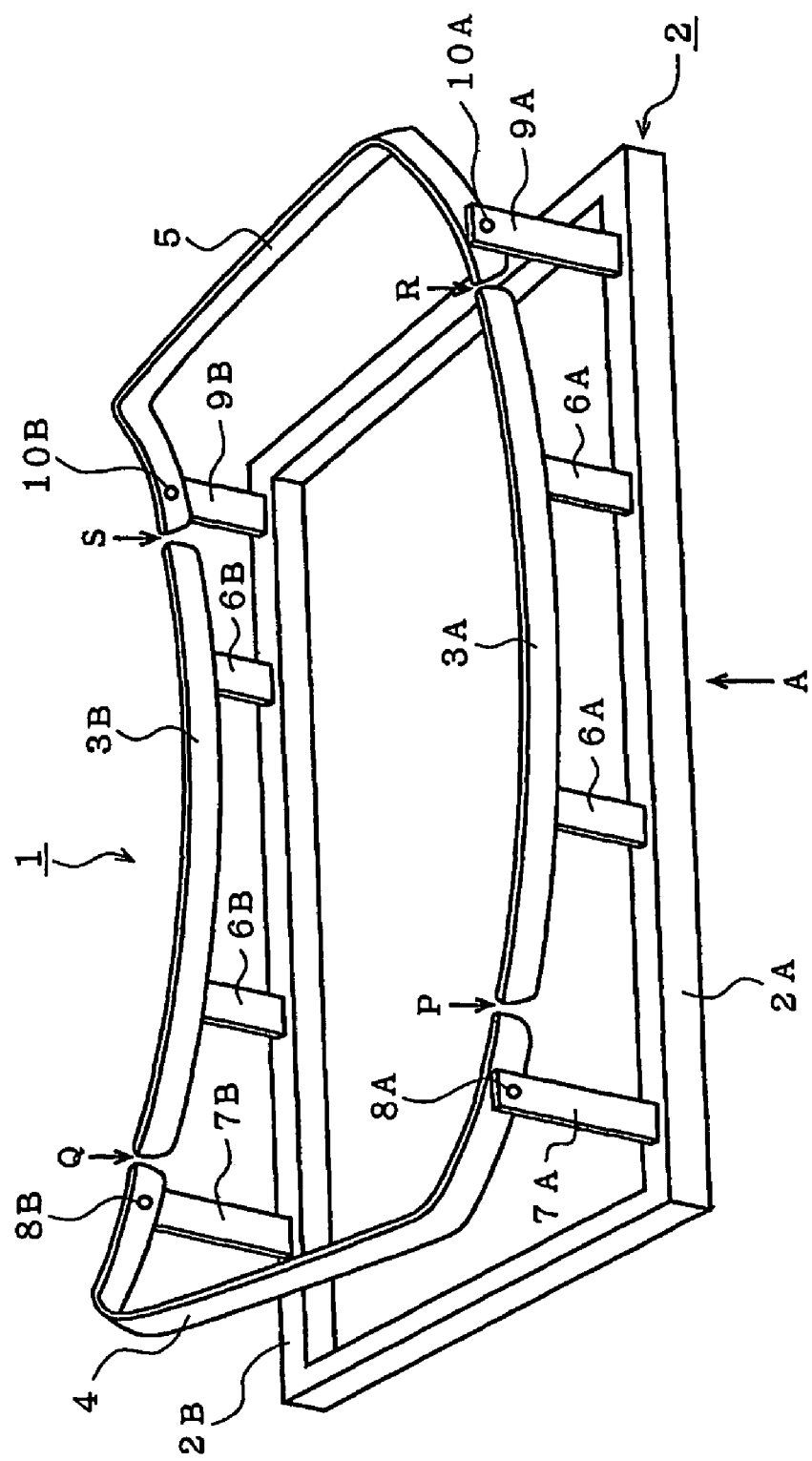
FIG. 4 is a constitutional diagram showing a constitution of a first divided-type gravity-sagging/bending mold.
Figure 5:
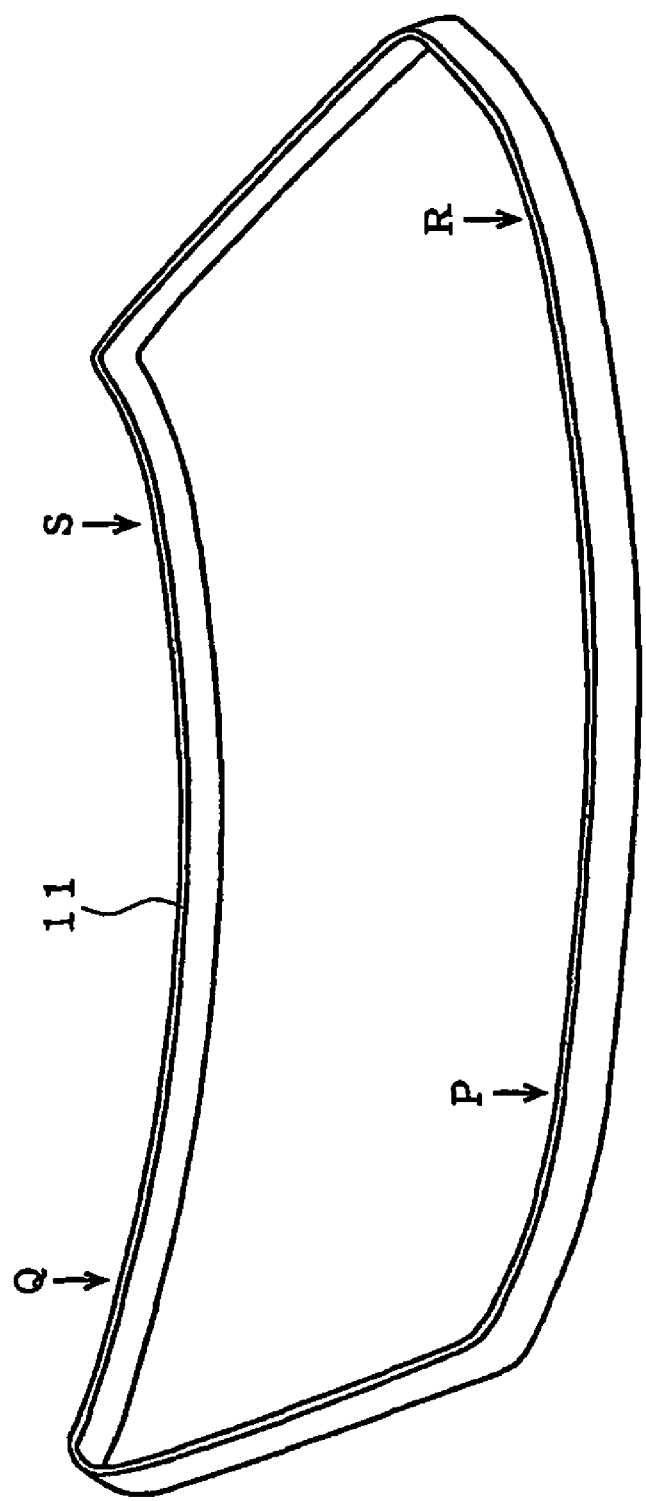
FIG. 5 is a view schematically showing a final shape of a ring frame of the first divided-type gravity-sagging/bending mold.

There will be firstly described a basic constitution and operation of the divided-type gravity-sagging/bending mold, based on a first divided-type mold. FIG. 4 is a constitutional diagram showing a constitution of the first divided-type gravity-sagging/bending mold, and FIG. 5 is a view schematically showing a final shape of a ring frame of the first divided-type gravity-sagging/bending mold. Note, the following description is conducted, assuming that the front side of the divided-type mold shown in FIG. 4 is called a direction A.

As shown in FIG. 4, the first divided-type gravity-sagging/bending mold is constituted of a ring frame 1, and a base frame 2 carrying thereon the ring frame 1.

As shown in FIG. 5, the ring frame 1 has an upper forming surface 11 corresponding to a curved shape (product shape) of a predetermined vehicular glass, and this forming surface 11 supports a peripheral portion of a glass plate placed on the forming surface 11.

The ring frame 1 is divided at predetermined dividing positions P, Q, R, S. Thus, the whole ring frame 1 is constituted of a front-side central frame 3A, a rear-side central frame 3B, and a left-side rotative frame 4 and a right-side rotative frame 5, which rotative frames are arranged at the both ends of the central frames 3A, 3B, as shown in FIG. 4. As shown, each of the left-side rotative frame 4 and right-side rotative frame 5 has an open box shape.

The front-side central frame 3A is supported by columns 6A, 6A provided on the base frame 2, and the rear-side central frame 3B is supported by columns 6B, 6B provided on the base frame 2.

Provided near both ends of a front-side beam part 2A of the base frame 2 are column 7A and column 9A, respectively, and provided near both ends of a rear-side beam part 2B of the base frame 2 are column 7B and column 9B, respectively. The left-side rotative frame 4 is rotatably supported by the columns 7A, 7B, and the right-side rotative frame 5 is rotatably supported by the columns 9A, 9B.

In this embodiment, the left-side rotative frame 4 is rotatable about a rotation axis interconnecting fulcra 8A–8B with each other, and the right-side rotative frame 5 is rotatable about a rotation axis interconnecting fulcra 10A–10B with each other. Concerning the rotating direction, each rotative frame is capable of rotating in the directions toward and away from the central direction or center of the ring frame 1. Hereafter, the rotation of the rotative frames in the direction toward the central direction of the ring frame 1 shall be called "a rotation toward the inside of the ring frame 1", and the rotation of the rotative frames in the direction away from the central direction of the ring frame 1 shall be called "a rotation toward the outside of the ring frame 1".

There will be described hereinafter an operation of the first divided-type gravity-sagging/bending mold. Here, FIG. 6 and FIG. 7 are explanatory views of the operation of the first divided-type gravity-sagging/bending mold.

Figure 6:
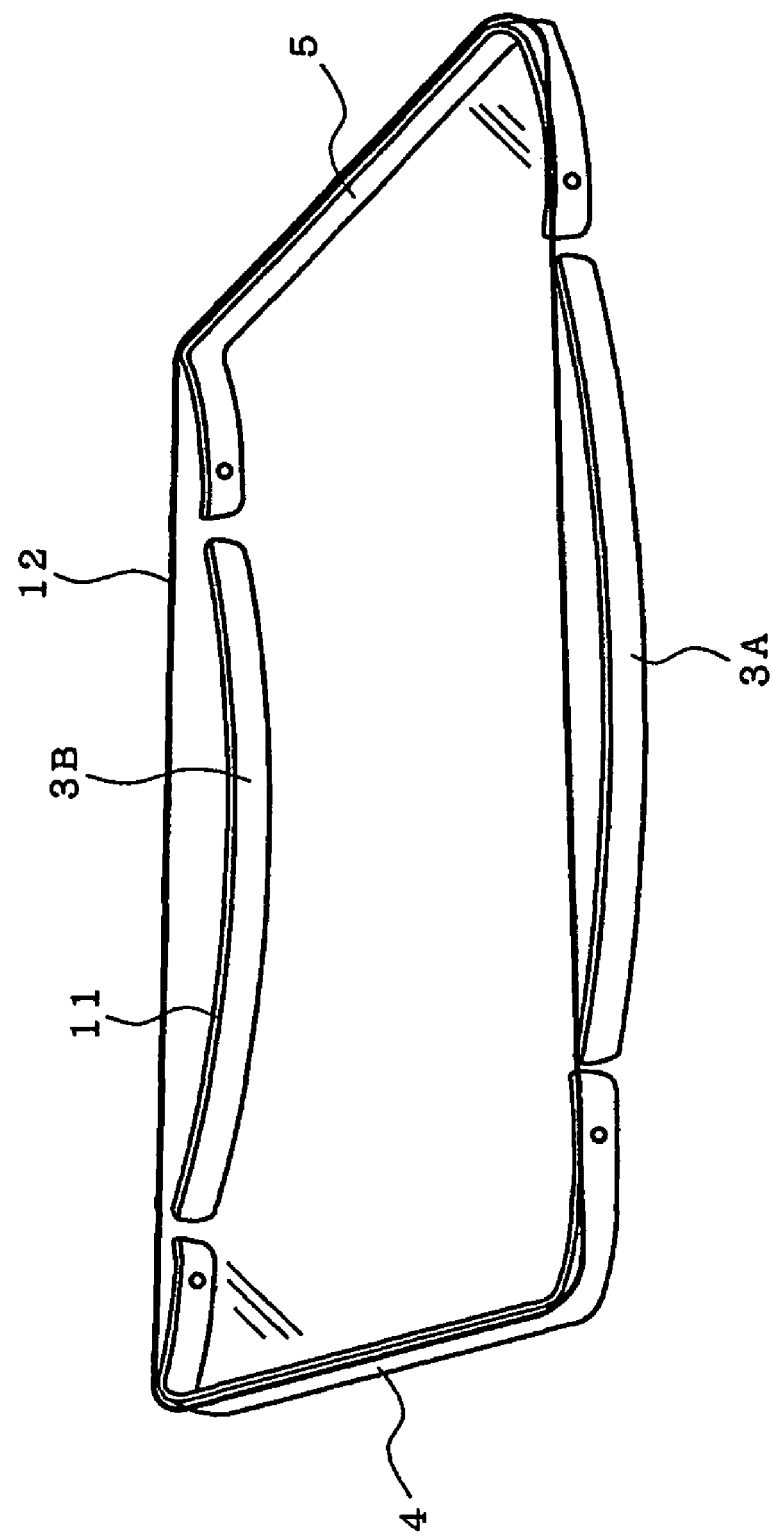
FIG. 6 is an explanatory view of an operation of the first divided-type gravity-sagging/bending mold.
Figure 7:
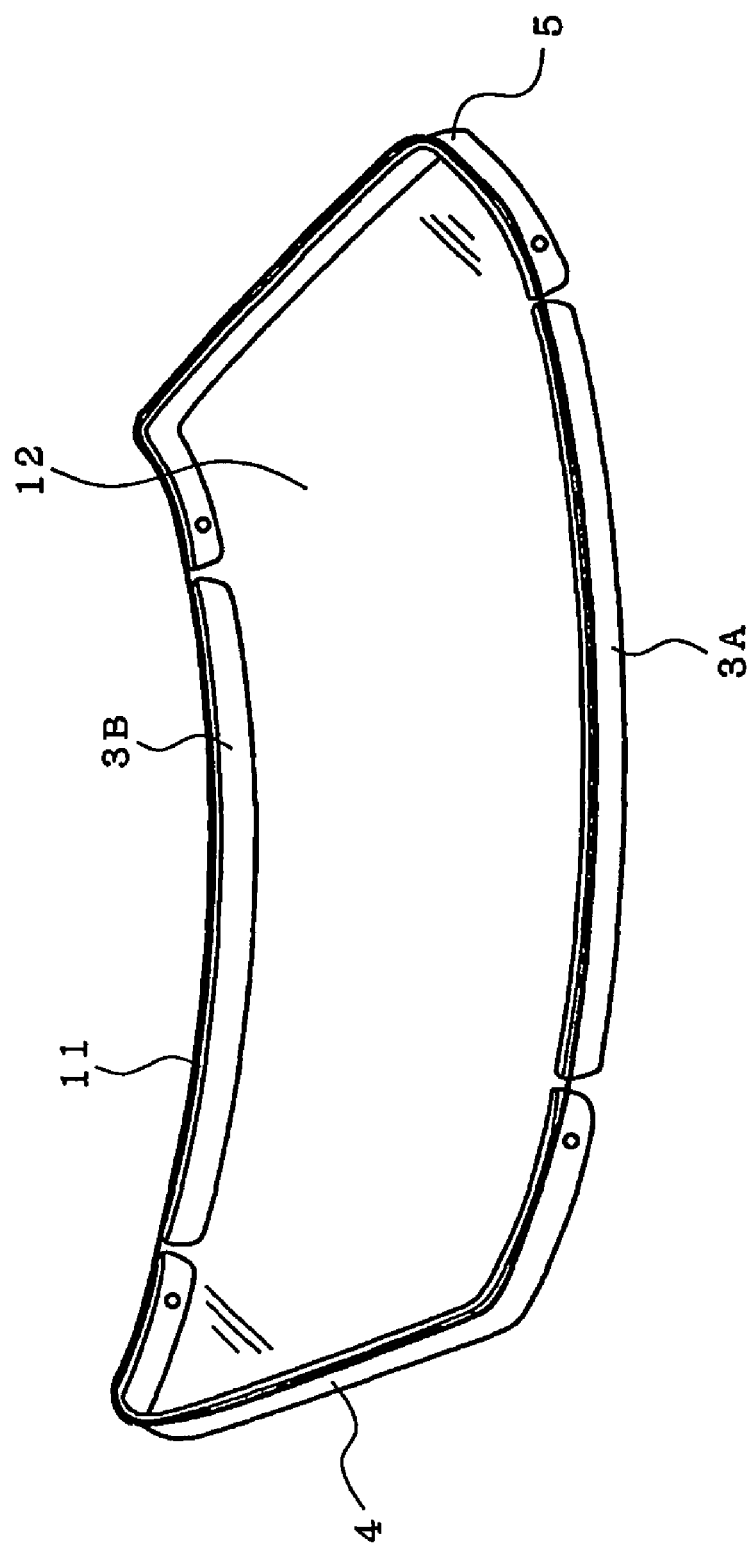
FIG. 7 is an explanatory view of an operation of the first divided-type gravity-sagging/bending mold.

Firstly, the left-side rotative frame 4 and right-side rotative frame 5 are rotated toward the outside of the ring frame 1, to thereby obtain a bent state as shown in FIG. 6 where the ring frame 1 has been bent near the dividing positions. In this state, there is placed a glass plate (flat plate) 12 before bending on the forming surface 11 of the ring frame 1, and the portions of the periphery of the thus placed glass plate 12 contact with the portions of the ring frame 1, so that the glass plate is supported substantially horizontally (this state of the ring frame shall be called a "flat plate placed state").

Next, the divided-type mold supporting thereon the glass plate 12 is transferred into a heating furnace (not shown), so as to heat the glass plate 12 to its softening point. As the glass plate 12 is softened, the left-side rotative frame 4 and right-side rotative frame 5 are rotated toward the inside of the ring frame 1. Finally, as shown in FIG. 7, the forming surface 11 of the ring frame 1 is brought to have a product shape of the glass plate 12 (this shape is indicated by a two-dot chain line in FIG. 10, for example).

The divided-type mold is to form the glass plate 12 by the forming surface 11 having the product shape, to thereby provide the glass plate 12 with a desired product shape.

In this way, the divided-type gravity-sagging/bending mold bends the flat glass plate, to thereby provide the glass plate with a desired curved shape. However, the rotative frames may be inappropriately rotated, due to various factors.

For example, in case of a vehicular glass (windshield glass) having a smaller curvature at the central portion and a sharply increased curvature at each of the right and left peripheral portions, the rotative frames may fail to fully rotate toward the inside of the ring frame 1 even when the glass plate has been sufficiently softened.

In such a situation, it is enough to adjust the rotation moments tending to rotate the rotative frames toward the inside of the ring frame, so as to suitably rotate the rotative frames, to thereby form the glass plate.

(Second Divided-Type Mold)

Figure 9:
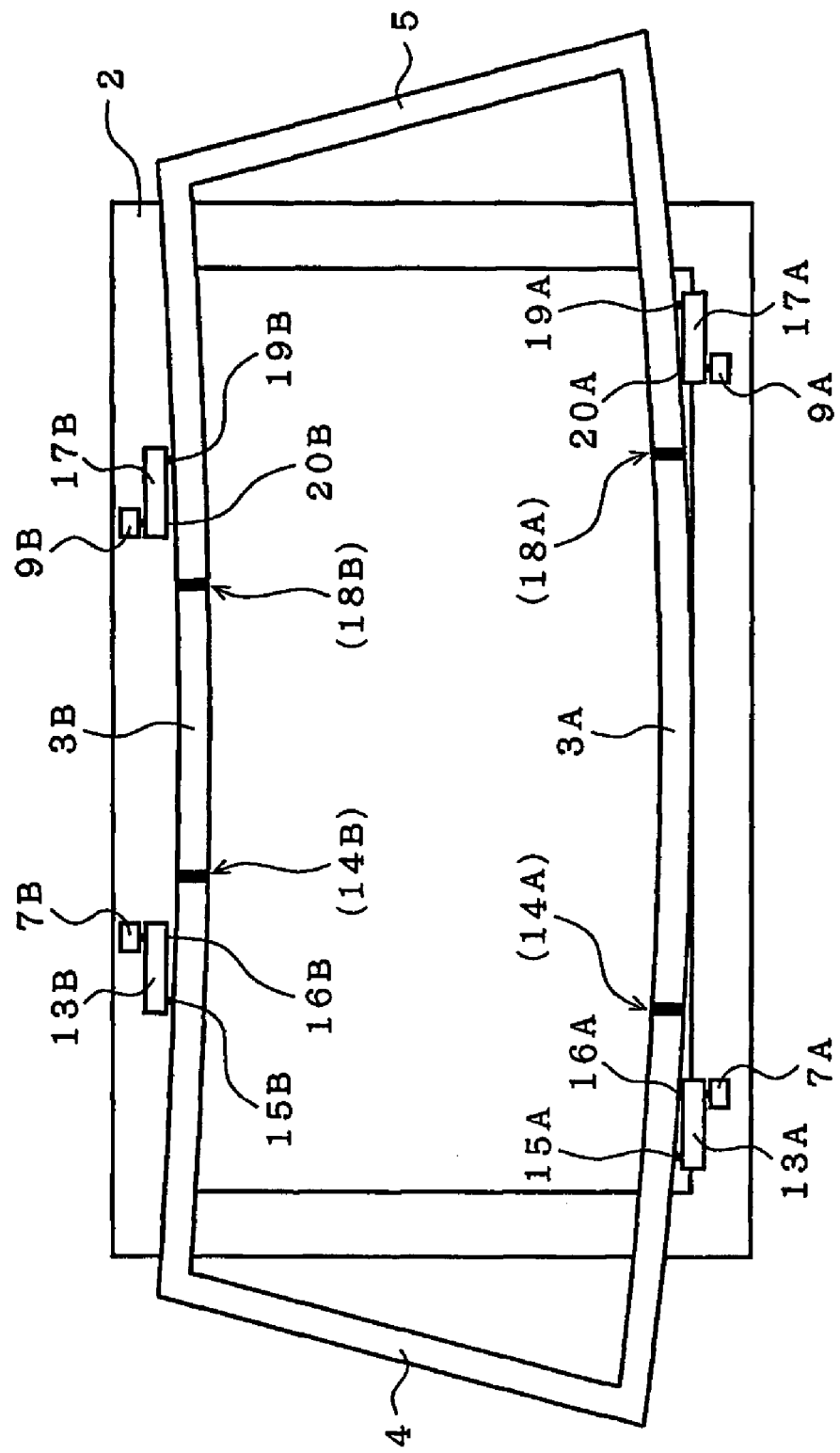
FIG. 9 is a plan view showing the constitution of the second divided-type gravity-sagging/bending mold.

There will be described hereinafter a second divided-type gravity-sagging/bending mold, with reference to FIG. 8 and FIG. 9. FIG. 8 is a constitutional diagram showing a constitution of the second divided-type gravity-sagging/bending mold, and is a front view of the divided-type mold. Further, FIG. 9 is a constitutional diagram showing the constitution of the second divided-type gravity-sagging/bending mold, and is a plan view of the divided-type mold. Like reference numerals as used in the first divided-type gravity-sagging/bending mold are used to denote corresponding or identical elements of the second divided-type gravity-sagging/bending mold.

As shown in FIG. 8 and FIG. 9, the second divided-type gravity-sagging/bending mold comprises, at the front side, a hanging plate 13A provided on the column 7A and a hanging plate 17A provided on the column 9A, and at the rear side, a hanging plate 13B provided on the column 7B and a hanging plate 17B provided on the column 9B.

The hanging plate 13A has one end rotatably connected to the column 7A via rotation shaft. The hanging plate 17A has one end rotatably connected to the column 9A via rotation shaft. Namely, the hanging plate 13A is rotatable about a fulcrum 16A, and the hanging plate 17A is rotatable about a fulcrum 20A.

The hanging plate 13A has its other end mutually rotatably connected to the left-side rotative frame 4 via rotation shaft. The hanging plate 17A has its other end mutually rotatably connected to the right-side rotative frame 5 via rotation shaft. Namely, the hanging plate 13A and left-side rotative frame 4 are mutually rotatable about a fulcrum 15A, and the hanging plate 17A and right-side rotative frame 5 are mutually rotatable about a fulcrum 19A.

The hanging plate 13B has one end rotatably connected to the column 7B via rotation shaft. The hanging plate 17B has one end rotatably connected to the column 9B via rotation shaft. Namely, the hanging plate 13B is rotatable about a fulcrum 16B, and the hanging plate 17B is rotatable about a fulcrum 20B.

The hanging plate 13B has its other end mutually rotatably connected to the left-side rotative frame 4 via rotation shaft. The hanging plate 17B has its other end mutually rotatably connected to the right-side rotative frame 5 via rotation shaft. Namely, the hanging plate 13B and left-side rotative frame 4 are mutually rotatable about a fulcrum 15B, and the hanging plate 17B and right-side rotative frame 5 are mutually rotatable about a fulcrum 19B.

Further, the front side of the left-side rotative frame 4 is mutually rotatably connected to the front-side central frame 3A, via rotation shaft. The rear side of the left-side rotative frame 4 is also mutually rotatably connected to the rear-side central frame 3B, via rotation shaft. Furthermore, the front side of the right-side rotative frame 5 is mutually rotatably connected to the front-side central frame 3A, via rotation shaft. The rear side of the right-side rotative frame 5 is also mutually rotatably connected to the rear-side central frame 3B, via rotation shaft.

Namely, the left-side rotative frame 4 and the central frames 3A, 3B are mutually rotatable, about a rotation axis interconnecting fulcra 14A–14B with each other. Further, the right-side rotative frame 5 and the central frames 3A, 3B are mutually rotatable about a rotation axis interconnecting fulcra 18A–18B with each other.

There will be described hereinafter an operation of the second divided-type gravity-sagging/bending mold. The operation of the second divided-type gravity-sagging/bending mold is basically common to that of the first divided-type gravity-sagging/bending mold.

Namely, the left-side rotative frame 4 and right-side rotative frame 5 are rotated toward the outside of the ring frame 1, to thereby obtain a bent state as shown in FIG. 8. In this state, there is placed a glass plate (flat plate) 12 before bending on the forming surface 11 of the ring frame 1, and the portions of the periphery of the thus placed glass plate 12 contact with the portions of the ring frame 1, so that the glass plate is supported substantially horizontally.

Next, the divided-type mold supporting thereon the glass plate 12 is transferred into a heating furnace (not shown), so as to heat the glass plate 12 to its softening point. As the glass plate 12 is softened, the left-side rotative frame 4 and right-side rotative frame 5 are rotated toward the inside of the ring frame 1. Finally, the forming surface 11 of the ring frame 1 is brought to have a product shape of the glass plate 12.

Note, in the second divided-type gravity-sagging/bending mold, there exist: a rotation moment tending to rotate the left-side rotative frame 4 about the rotation axis interconnecting the fulcra 14A–14B with each other; and another rotation moment tending to rotate the right-side rotative frame 5 about the rotation axis interconnecting the fulcra 18A–18B with each other.

These rotation moments are determined by determinant factors such as positions of the fulcra 14A, 14B, 18A and 18B (hereinafter called "connecting points"), dividing positions (P, Q, R, S), and positions of the fulcra 15A, 15B, 19A and 19B (hereinafter called "hang points").

Thus, modifying the values of these determinant factors allows to adjust the rotation moments.

(Third Divided-Type Mold)

There will be described hereinafter a third divided-type gravity-sagging/bending mold, with reference to FIG. 10.

Figure 10:
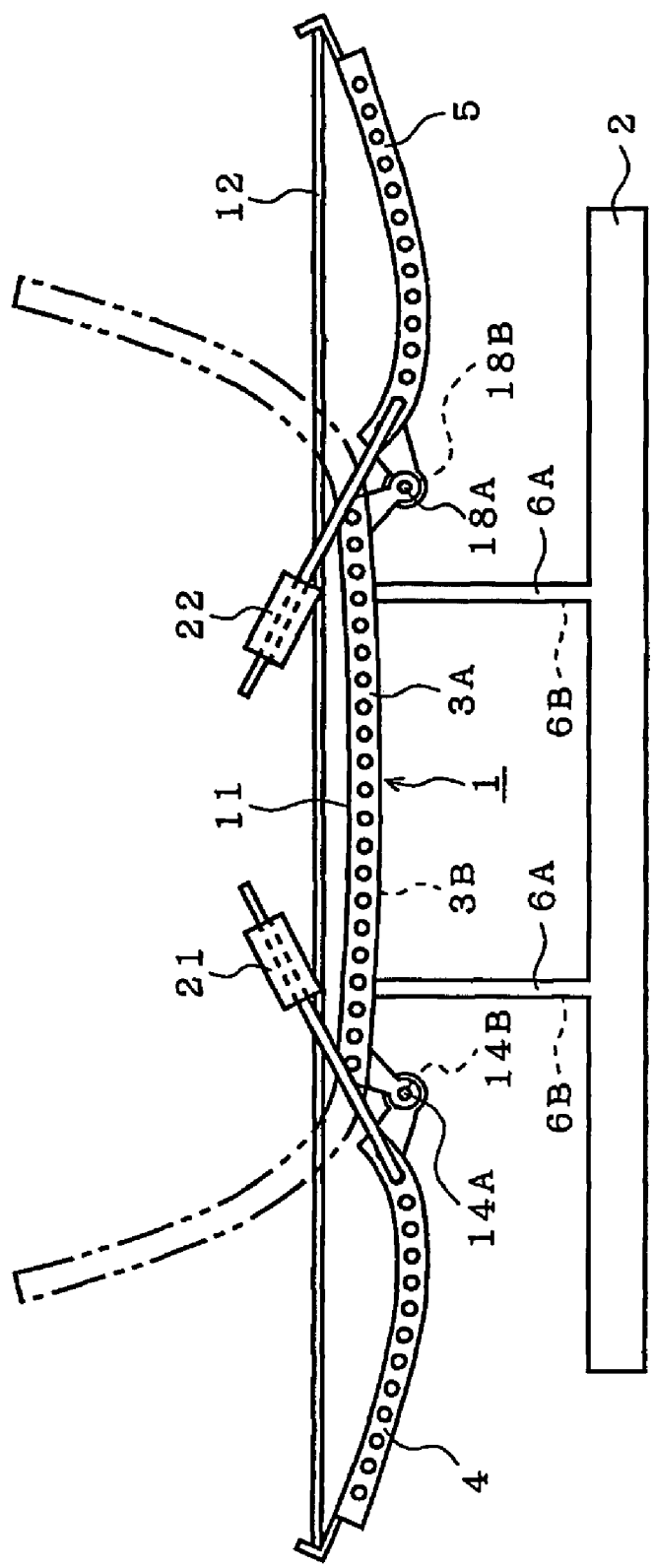
FIG. 10 is a front view showing the constitution of a third divided-type gravity-sagging/bending mold.

FIG. 10 is a constitutional diagram showing a constitution of the third divided-type gravity-sagging/bending mold, and a front view of the divided-type mold. Like reference numerals as used in the first and second divided-type gravity-sagging/bending molds are used to denote corresponding or identical elements of the third divided-type gravity-sagging/bending mold.

In the third divided-type gravity-sagging/bending mold shown in FIG. 10, the front-side central frame 3A is fixed by columns 6A, 6A provided on the base frame 2, and the rear-side central frame 3B is fixed by columns 6B, 6B provided on the base frame 2.

Further, the front side of the left-side rotative frame 4 is rotatably coupled to the front-side central frame 3A via rotation shaft. Also, the rear side of the left-side rotative frame 4 is rotatably coupled to the rear-side central frame 3B via rotation shaft. Furthermore, the front side of the right-side rotative frame 5 is rotatably coupled to the front-side central frame 3A via rotation shaft. Also, the rear side of the right-side rotative frame 5 is rotatably coupled to the rear-side central frame 3B via rotation shaft.

Namely, the left-side rotative frame 4 is rotatable about a rotation axis interconnecting the fulcra 14A–14B with each other. Further, the right-side rotative frame 5 is rotatable about a rotation axis interconnecting the fulcra 18A–18B with each other.

Further, the left-side rotative frame 4 is provided with a counterweight 21 and the right-side rotative frame 5 is provided with a counterweight 22.

There will be described hereinafter an operation of the third divided-type gravity-sagging/bending mold. The operation of the third divided-type gravity-sagging/bending mold is basically common to that of the first divided-type gravity-sagging/bending mold.

Namely, the left-side rotative frame 4 and right-side rotative frame 5 are rotated toward the outside of the ring frame 1, to thereby obtain a bent state as shown in FIG. 10. In this state, there is placed a glass plate (flat plate) 12 before bending on the forming surface 11 of the ring frame 1, and the portions of the periphery of the thus placed glass plate 12 contact with the portions of the ring frame 1, so that the glass plate is supported substantially horizontally.

Next, the divided-type mold supporting thereon the glass plate 12 is transferred into a heating furnace (not shown), so as to heat the glass plate 12 to its softening point. As the glass plate 12 is softened, the left-side rotative frame 4 and right-side rotative frame 5 are rotated toward the inside of the ring frame 1. Finally, the forming surface 11 of the ring frame 1 is brought to have a product shape of the glass plate 12.

Note, in the third divided-type gravity-sagging/bending mold, there exist: a rotation moment tending to rotate the left-side rotative frame 4 about the rotation axis interconnecting the fulcra 14A–14B with each other; and another rotation moment tending to rotate the right-side rotative frame 5 about the rotation axis interconnecting the fulcra 18A–18B with each other.

These rotation moments are determined by determinant factors such as positions of the connecting points 14A, 14B, 18A and 18B, dividing positions (P, Q, R, S), and balances (weights and positions) of the counterweights.

Thus, modifying the values of these determinant factors allows to adjust the rotation moments.

The aforementioned glass-plate-aimed divided-type gravity-sagging/bending molds have been illustrated as examples, and the present invention is not limited thereto.

(Constitution of 3-Dimensional CAD)

Figure 11:
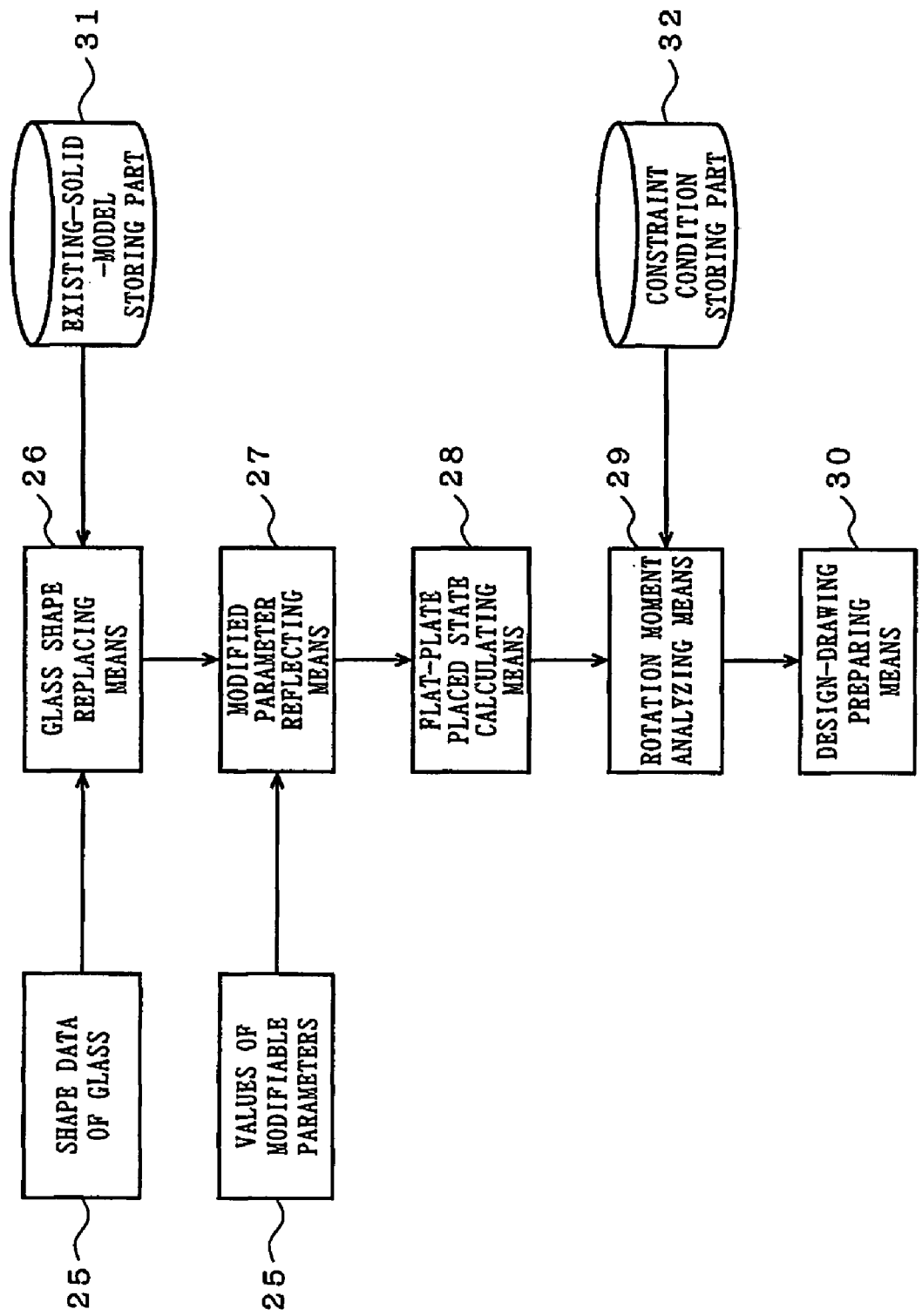
FIG. 11 is a block diagram showing a constitution of a 3-dimensional CAD system according to the first embodiment of the present invention.

There will be described hereinafter a 3-dimensional CAD system to be utilized in a designing method of a glass-plate-aimed divided-type gravity-sagging/bending mold according to the first embodiment of the present invention, with reference to the accompanying drawings. FIG. 11 is a block diagram showing a constitution of the 3-dimensional CAD system according to the first embodiment of the present invention.

As shown in FIG. 11, the 3-dimensional CAD system according to the first embodiment of the present invention comprises input means 25, glass shape replacing means 26, modified parameter reflecting means 27, flat-plate placed state calculating means 28, rotation moment analyzing means 29, design-drawing preparing means 30, existing-solid-model storing part 31 and constraint condition storing part 32.

The input means 25 is realized by: an input device such as a keyboard, mouse, touch panel; or communicating means for receiving data from other computers via predetermined network. The data inputted from the input means 25 are transmitted to a main memory, for example, via input/output interface (not shown).

Further, it is possible to realize the glass shape replacing means 26, modified parameter reflecting means 27, flat-plate placed state calculating means 28, rotation moment analyzing means 29 and design-drawing preparing means 30; such as by executing a predetermined program on a computer.

The existing-solid-model storing part 31 and constraint condition storing part 32 are realizable, by utilizing a storage device such as a main storage device or auxiliary storage device.

The existing-solid-model storing part 31 is stored with solid models of previously designed divided-type molds, as existing-solid-model data.

Figure 12A:
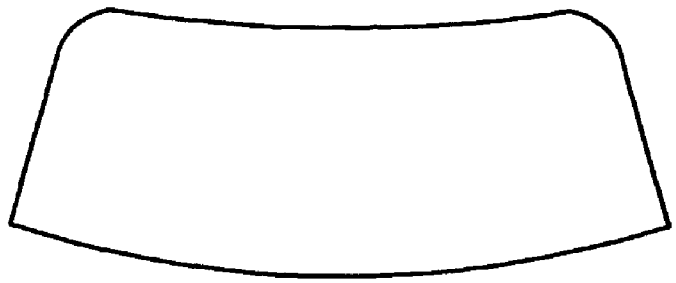
FIGS. 12A, 12B and 12C are views showing representative shapes of windshield glass.
Figure 12B:
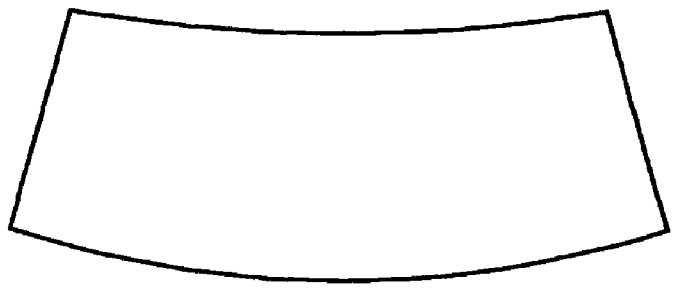
Figure 12C:
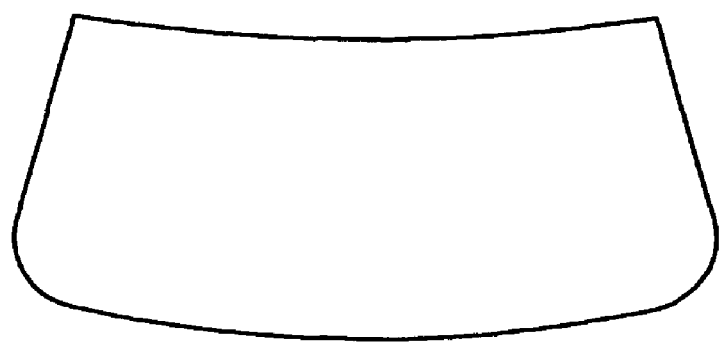

There will be described hereinafter the existing solid-models of divided-type molds to be stored in the existing-solid-model storing part 31, with reference to the pertinent drawings. FIGS. 12A, 12B and 12C are views showing representative shapes of windshield glass to be formed by the divided-type mold.

The existing solid-model to be stored in the existing-solid-model storing part 31 may be singular or plural. In storing a plurality of existing solid-models, it is possible to store existing solid-models of a plurality of molds having basic structures different from one another, for example. It is further possible to store, for each basic structure, existing solid-models of a plurality of molds (to be classified in accordance with features of shapes of targeted glass plates of molds, for example).

Concretely, it is possible to classify basic structures of molds into divided-type molds and undivided-type molds, for example; and to further classify the divided-type molds into functionally 3-piece divided-type molds and functionally 2-piece divided-type molds, for example. It is also possible to classify the existing solid-models, such as by the presence/absence of hanging plates, and the presence/absence of counterweights, for example. Further, it is possible to classify the existing solid-models into those for vehicular glass and those for building-aimed glass. It is further possible to classify the existing solid-models for vehicular glass into those for windshield glass, door glass and rear window glass, for example.

Moreover, it is possible to classify the shape of the targeted glass plates of the molds, based on geometric features such as: ratios among the upper, lower, right and left segments of the glass plates; and curvatures of corner portions of glass plates. For example, windshield glass plates for automobiles can be classified into several representative shapes as shown in FIGS. 12A, 12B and 12C.

Thus, in case of molds for windshield glass, it is possible to adopt a functionally 3-piece divided-type mold as a basic structure, and to store, concerning such a basic structure, existing solid-models of a plurality of divided-type molds to be classified in accordance with types of representative shapes of windshield glass plates.

(Preparation of Solid Model)

Figure 13:
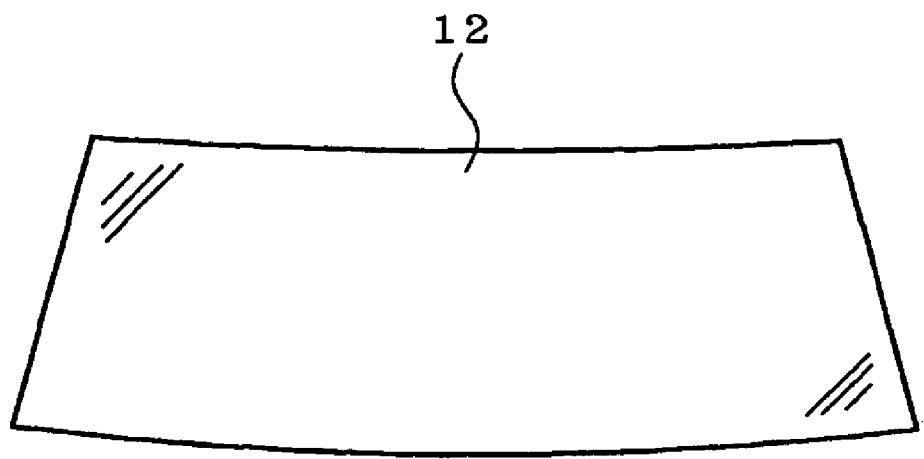
FIG. 13 is a view showing a shape example of vehicular glass.

There will be described hereinafter a method for fabricating solid models of divided-type molds to be stored in the existing-solid-model storing part 31 making use of a 3-dimensional CAD application, with reference to the pertinent drawings. FIG. 13 is a view showing a shape example of vehicular glass (windshield glass), and FIGS. 14 through 21 are views showing definition examples of solid models.

Preparation of solid models is conducted by defining constituent parts constituting the pertinent solid model. Constituent parts are defined by using designed values of shapes, dimensions, positions of the parts, for example.

These designed values are classified, based on attributes thereof, into fixed designed values, modifiable parameters, and subordinate designed values.

The fixed designed values are those invariable designed values of predetermined constituent parts within solid models. For example, the lateral width of a certain base frame is fixed correspondingly to the dimension of a heating furnace into which the divided-type mold is to be transferred. Further, the shape and dimensions of columns correspond to fixed designed values.

Next, modifiable parameters are those designed values of predetermined constituent parts which can be arbitrarily modified. For example, dividing positions of a ring frame are defined as modifiable parameters. This enables to arbitrarily modify dividing positions.

Further, subordinate designed values are those designed values which can be obtained based on a certain designed value (basic designed value) such as by giving the basic designed value to predetermined formulas or functions. For example, subordinate designed values include a position of other constituent part to be determined based on a position of a certain constituent part.

Concretely, shapes and dimensions of ring frames are determined based on bending-shapes and dimensions of glass plates. Further, positions of hanging plates are determined based on positions of hang points.

Note, if an applicable basic designed value is a modifiable parameter, the subordinate designed value(s) of the basic designed value is(are) also modified in accordance with the modification of the parameter.

There will be described hereinafter an exemplary preparing method of a solid model, taking the aforementioned second divided-type gravity-sagging/bending mold for example. Firstly, there is given shape data of a vehicular glass (windshield glass) such as shown in FIG. 13, as shape data of a glass plate as a design target of a divided-type mold.

Figure 14:
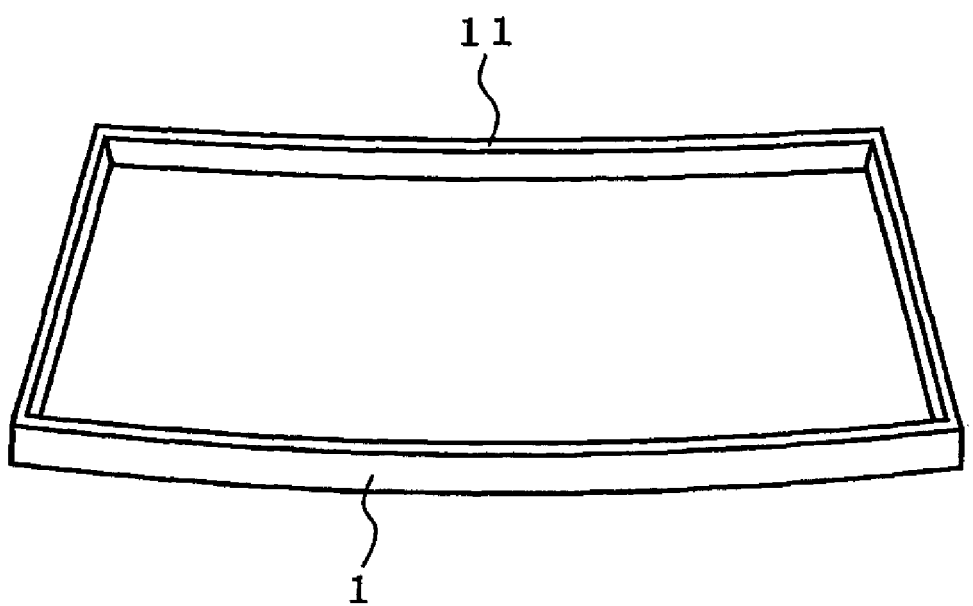
FIG. 14 is a view explaining a definition example of a ring frame of a solid model.

Next, as a constituent part, there is prepared a ring frame 1 conforming to the shape of this vehicular glass. The thus prepared ring frame 1 is to include a forming surface 11 having the same shape as the peripheral portion of the vehicular glass as shown in FIG. 14.

Figure 15:
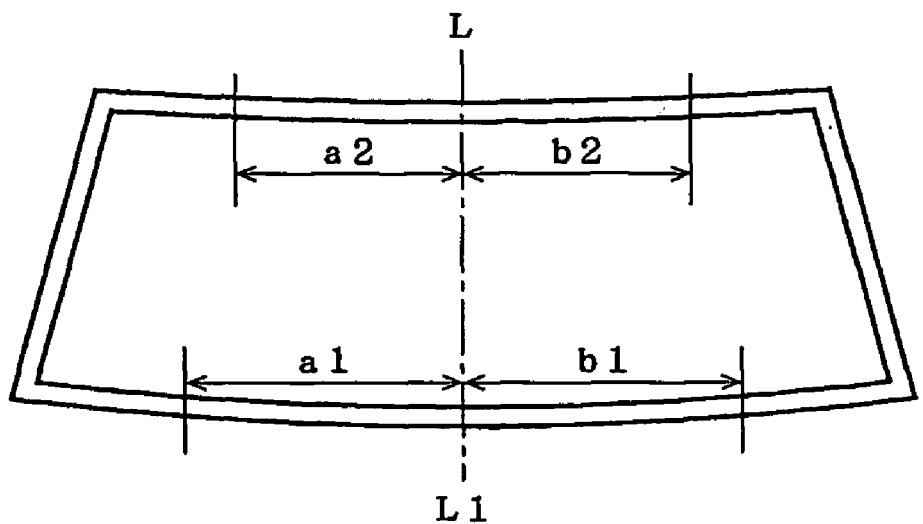
FIG. 15 is a view explaining a definition example of a dividing position of the solid model.

Next, dividing positions P, Q, R, S are determined. These dividing positions are settled at predetermined distances (a1, a2, b1, b2) from a centerline L–L1 drawn in the fore-and-aft direction of the ring frame 1, such as shown in FIG. 15. In FIG. 15, a1=P, a2=Q, b1=R, b2=S.

Note, the values of these distances a1, a2, b1, b2 are settled as modifiable parameters. In this way, modifying the values of distances a1, a2, b1, b2 allows to modify the positions of dividing positions P, Q, R, S, respectively.

Figure 16:
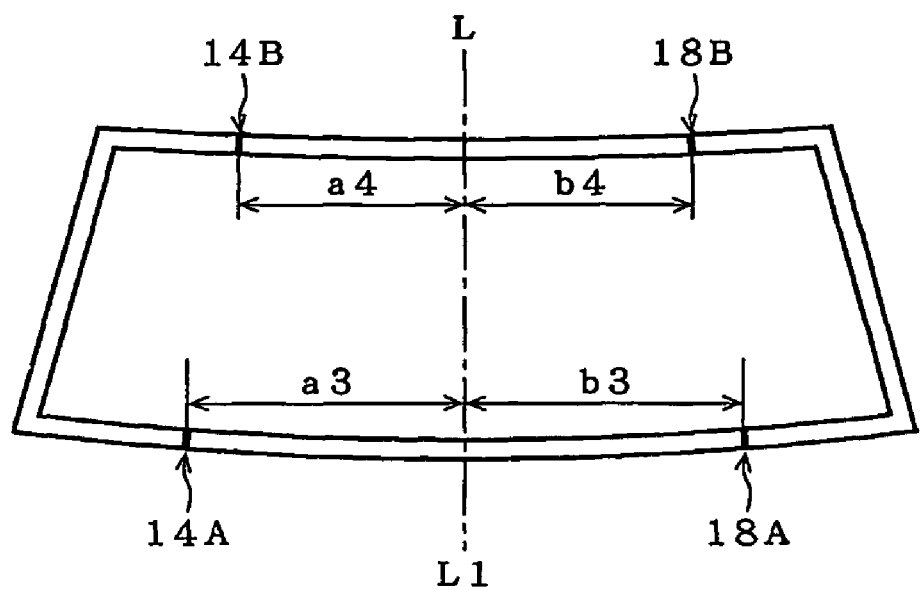
FIG. 16 is a view explaining a definition example of positions of connecting points of the solid model.

Next, positions of connecting points 14A, 14B, 18A and 18B are determined. The positions of the connecting points are settled at predetermined distances (a3, a4, b3, b4) from the centerline L–L1 of the ring frame 1, such as shown in FIG. 16. Further, positions of the connecting points in the height direction are settled such as based on a predetermined position on or along the upper surface of the ring frame 1. In FIG. 16, a3=14A, a4=14B, b3=18A, b4=18B.

Note, the values of these distances a3, a4, b3 and b4 are settled as modifiable parameters. In this way, modifying the values of distances a3, a4, b3 and b4 allows to modify the positions of the connecting points 14A, 14B, 18A and 18B, respectively.

Figure 17:
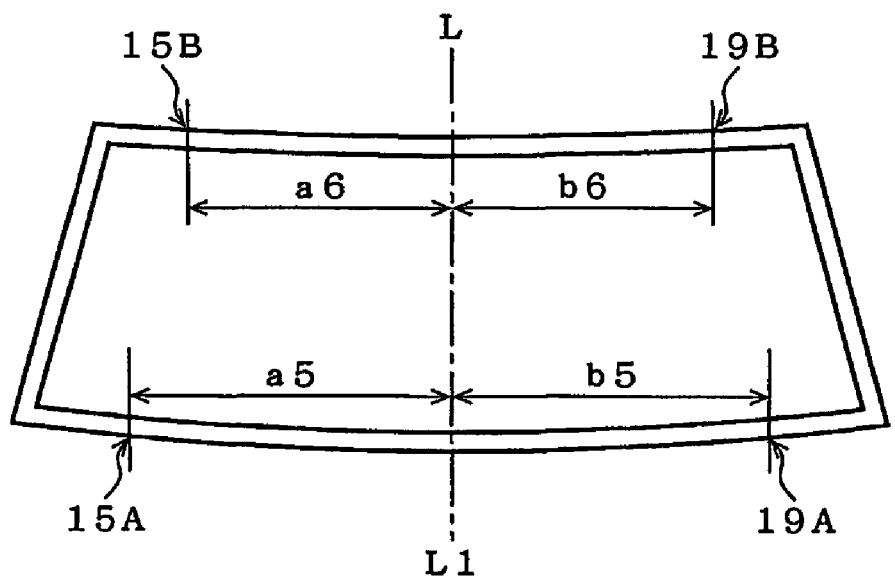
FIG. 17 is a view explaining a definition example of positions of hang points of the solid model.

Next, the positions of hang points 15A, 15B, 19A and 19B are determined. The positions of these hang points are settled at predetermined distances (a5, a6, b5, b6) from the centerline L–L1 of the ring frame 1, respectively, on the outline of the ring frame such as shown in FIG. 17. Further, positions in the height direction are settled such as based on a predetermined position on the lower surface of the ring frame 1. In FIG. 17, a5=15A, a6=15B, b5=19A, b6=19B.

Note, the values of these distances a5, a6, b5 and b6 are settled as modifiable parameters. In this way, modifying the values of distances a5, a6, b5 and b6 allows to modify the positions of hang points 15A, 15B, 19A and 19B, respectively.

Figure 18:
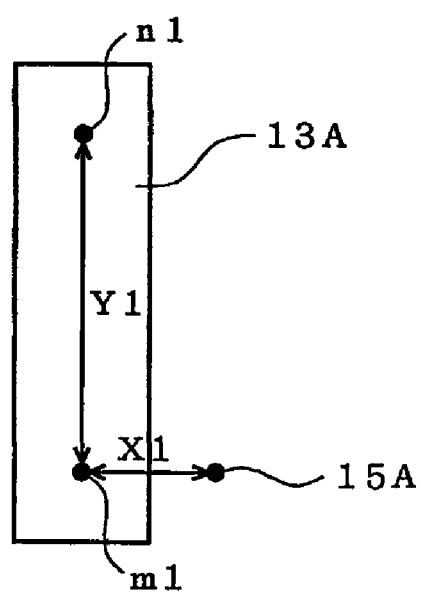
FIG. 18 is a view explaining a definition example of a hanging plate of the solid model.

Next, there are settled hanging plates 13A, 13B, 17A and 17B. Each hanging plate is a rectangular parallelepiped having predetermined dimensions, for example. The positions of hanging plates are determined based on the positions of the associated hang points, respectively. For example, the center of the lower rotation axis of the hanging plate 13A is set at a position m1 which is outside from the hang point 15A by a distance X1, as shown in FIG. 18. Next, the center of the upper rotation axis of the hanging plate 13A is set at a position n1 which is upper than the lower rotation axis m1 by a distance Y1 in the vertical line.

Similarly, other hanging plates 13B, 17A and 17B are settled based on the positions of hang points 15B, 19A and 19B, respectively.

Figure 19:
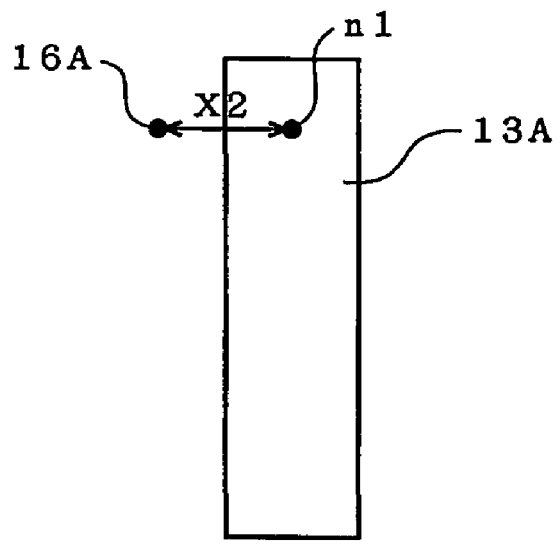
FIG. 19 is a view explaining a definition example of a position of a column connecting point of the solid model.
Figure 20:
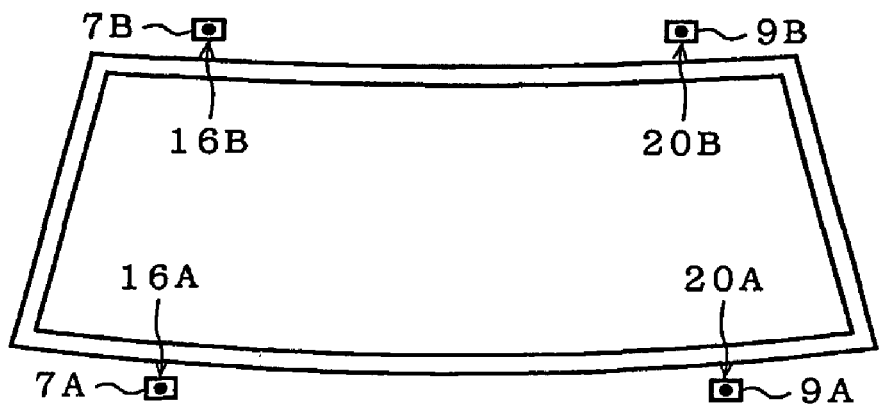
FIG. 20 is a view explaining a definition example of column positions of the solid model.

Next, the positions of fulcra 16A, 16B, 20A and 20B (hereinafter called "column connecting points") are determined. The positions of column connecting points are determined based on the center positions of upper rotation axes of the associated hanging plates, respectively. For example, the position of the column connecting point 16A is settled at a position which is outside the upper rotation axis n1 of the hanging plate 13A by a distance X2, as shown in FIG. 19. The positions of other column connecting points 16B, 20A and 20B are settled in the same manner.

Next, the positions of columns are determined. The positions of columns are determined based on the positions of the associated column connecting points, respectively, such that these column connecting points are included within predetermined regions of the associated columns. For example, columns are settled at positions shown in FIG. 20, such that the associated column connecting points are located at predetermined heights on the vertical centerlines of the columns, respectively.

Next, the dimensions of the base frame 2 are determined. The base frame 2 comprises four beam parts each having a constant width, and exhibits a rectangular shape. The dimensions of the base frame 2 are determined based on the positions of the columns. As shown in FIG. 21, for example, the dimensions of the outer periphery of the base frame 2 are determined such that each of the columns 7A, 7B, 9A and 9B is positioned at predetermined distances (X3 and Y3 in FIG. 21) from the outermost periphery of the base frame 2.

There will be described hereinafter the constraint conditions stored in the constraint condition storing part 32. The constraint conditions are those data required to analyze the dynamic characteristics of a divided-type mold, making use of the solid model of the divided-type mold. Concretely, the constraint conditions: are those conditions which constrain the movements of the constituent parts of the pertinent divided-type mold, such as the rotative frames, central frames and hanging plates; and apply to the boundary conditions among the constituent parts.

In addition, the constraint conditions also apply to: the relative densities and material properties of constituent parts; the coupled conditions among constituent parts; and the directions of movements of constituent parts, for example.

(Glass Shape Replacing Means)

There will be described hereinafter respective means. Firstly, the glass shape replacing means 26 has a function to construct another solid model by modifying the inputted shape data of an existing solid-model. Namely, the glass shape replacing means 26 has a function to construct a new solid model, by replacing: the shape data of the glass plate as a basis for constructing the existing solid-model; by the shape data of a new glass plate inputted from the input means 25.

Concretely, the ring frame of the existing solid-model is remodeled into a ring frame conforming to a shape of a new glass plate, based on the shape data of the new glass plate.

On the other hand, there are inherited those values of the existing solid-model, concerning arbitrary modifiable parameters such as dividing positions, positions of connecting points, and positions of hang points of the existing solid-model.

Then, those subordinate designed values such as depending on the shape of the ring frame are modified based on the shape of the new ring frame. These subordinate designed values include the positions of hanging plates, positions of columns, and dimensions of the base frame, for example.

(Modified Parameter Reflecting Means)

Next, the modified parameter reflecting means 27 has a function to reflect: the values of modifiable parameters inputted from the input means 25; to the new solid model constructed by the glass shape replacing means 26.

Namely, the modifiable parameters (such as dividing positions) within the solid model are modified in accordance with the values of the inputted parameters. Further, there are also modified those subordinate designed values to be settled based on the modified parameters.

Concretely, when the dividing positions have been modified, there are also modified the dividing positions of the central frames and rotative frames in the solid model. Further, when the positions of connecting points have been modified, there are modified the positions of connecting points in the solid model.

Moreover, when the positions of hang points have been modified, there are modified, in the solid model: the positions of hang points; positions of hanging plates depending on the modified hang points, respectively; positions of column connecting points depending on the positions of the hanging plates, respectively; positions of columns depending on the positions of column connecting points, respectively; and dimensions of the base frame depending on the positions of columns, respectively; for example.

Herein, those parameters to be inputted from the input means 25 are not limited to the dividing positions, and positions of connecting points, for example. Such parameters may include those alterable or modifiable designed values which constitute the divided-type mold. For example, such parameters apply to the balances of the counterweights, for example, in the aforementioned third divided-type gravity-sagging/bending mold.

Further, these alterable or modifiable designed values can be appropriately settled such as based on the specifications of the divided-type mold.

(Flat-Plate Placed State Calculating Means)

Next, the flat-plate placed state calculating means 28 has a function to calculate a state (flat plate placed state) where the rotative frames are rotated toward the outside of the ring frame to thereby place a glass plate (flat plate) on the resulting ring frame.

Specifying the dividing positions and the positions of connecting points within the solid model, for example, allows to calculate the positions and inclinations of the rotative frames and central frames in a bent state where the rotative frames have been rotated about the connecting points acting as the rotation axes as shown in FIG. 8.

As concretely shown in FIG. 22, the flat-plate placed state calculating means 28 calculates the positions of predetermined points G, H on the ring frame in the flat plate placed state. Then, there are calculated distances between: the glass plate 12 assumed to be horizontally placed; and these points G, H. For example, the calculated distances of zero shall mean that the glass plate is to be supported horizontally. Note, FIG. 22 is a side view of the divided-type mold shown in FIG. 8 in a B-direction.

(Rotation Moment Analyzing Means)

Next, the rotation moment analyzing means 29 has a function to analyze the dynamic characteristics of the divided-type mold, to thereby calculate rotation moments tending to rotate the rotative frames of the divided-type mold about predetermined rotation axes.

Namely, in the second divided-type gravity-sagging/bending mold, there are calculated: a rotation moment tending to rotate the left-side rotative frame 4 about a rotation axis interconnecting the connecting points 14A–14B with each other; and another rotation moment tending to rotate the right-side rotative frame 5 about a rotation axis interconnecting the connecting points 18A–18B with each other.

Concretely, there is prepared an analysis model, by adding: the constraint conditions taken out or retrieved from the constraint condition storing part 32; to the inputted data of the solid model. Then, by using this analysis model, there is obtained a bent state (of the ring frame) where the rotative frames have been rotated toward the outside of the ring frame as shown in FIG. 8. Next, there are obtained rotation moments tending to rotate the rotative frames toward the inside of the ring frame, in this bent state.

Next, the design-drawing preparing means 30 has a function to prepare a design-drawing(s) based on the inputted data of the solid model of the divided-type mold.

Concretely, the design-drawing preparing means 30 prepares a 2-dimensional design-drawing(s) from the 3-dimensional solid model, based on design information of solid models such as dimensions, shapes, and arrangements.

(Procedures of Designing Method)

Figure 23:
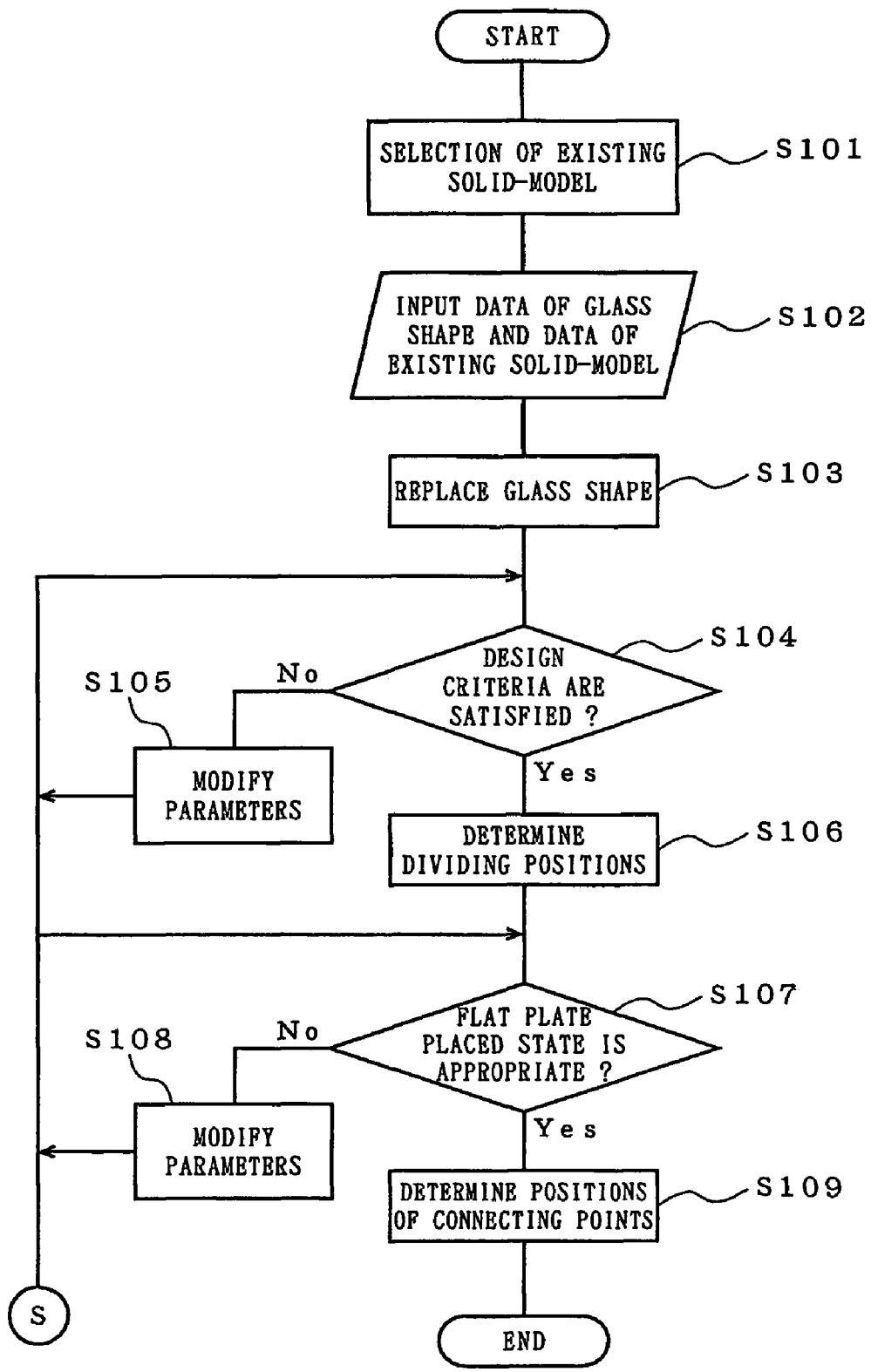
FIG. 23 is a flowchart explaining a designing method of a glass-plate-aimed divided-type gravity-sagging/bending mold.
Figure 26:
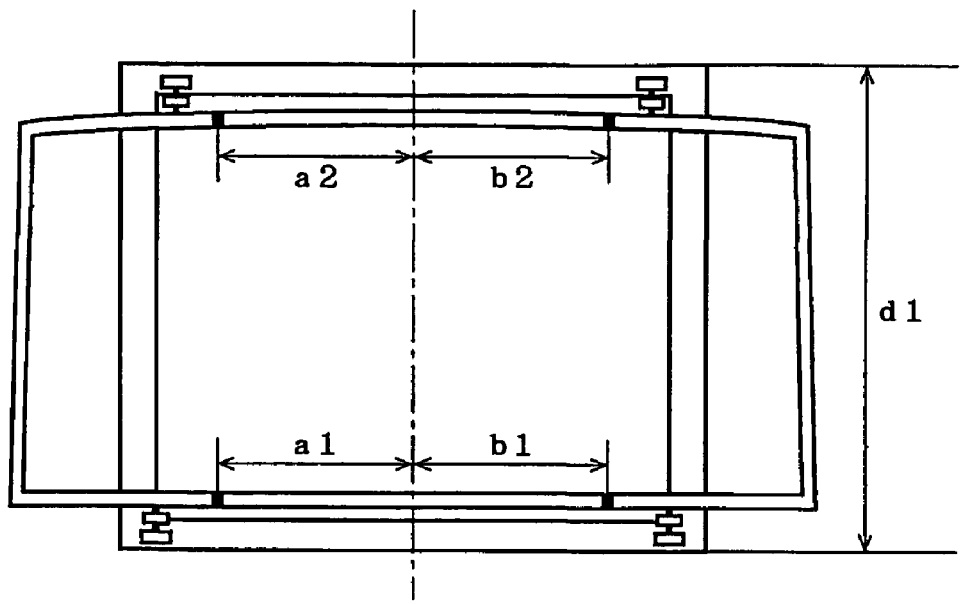
FIG. 26 is a view showing an exemplary constitution of a solid model reconstructed by glass shape replacing means.
Figure 27:
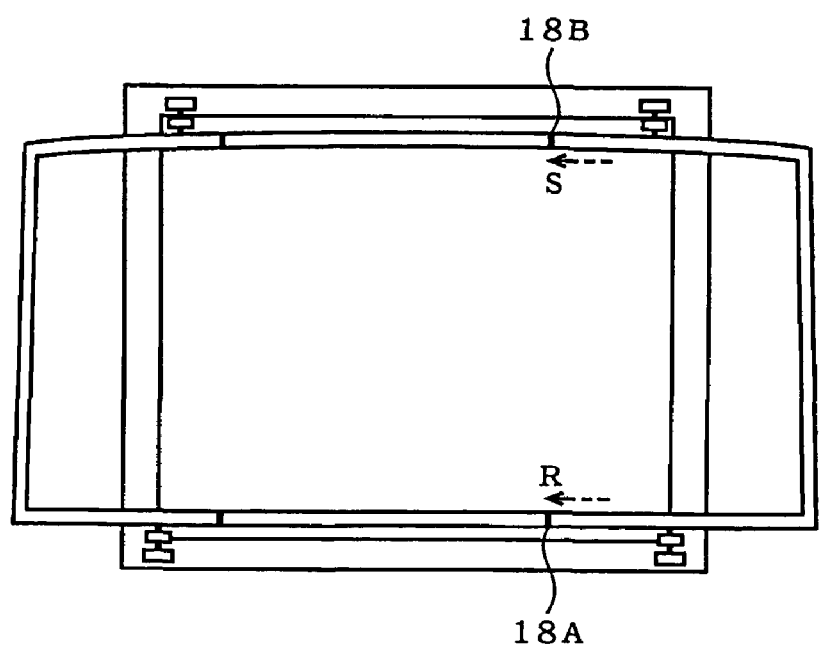
FIG. 27 is a view showing an exemplary constitution of a solid model reflecting those modifications of parameters.

There will be described hereinafter the designing method of a glass-plate-aimed divided-type gravity-sagging/bending mold making use of the aforementioned 3-dimensional CAD system, with reference to the pertinent drawings. FIG. 23 is a flowchart explaining the designing method of the glass-plate-aimed divided-type gravity-sagging/bending mold, FIG. 24 is a view showing a shape example of a glass plate as a design target, FIG. 25 is a view showing an exemplary constitution of an existing solid model, FIG. 26 is a view showing an exemplary constitution of a solid model reconstructed by the glass shape replacing means, and FIG. 27 is a view showing an exemplary constitution of a solid model reflecting those modifications of parameters. Note, there will be described the above second divided-type gravity-sagging/bending mold, as an example.

Firstly, there is provided data of a new glass plate (windshield glass) as a target of mold design, as shown in FIG. 24. The human operator is to look up the existing-solid-model storing part 31, to thereby select and take out a pertinent existing solid-model (step 101).

Concretely, when the existing-solid-model storing part 31 stores therein a plurality of existing solid-models, for example, there is taken out an existing solid-model of that divided-type gravity-sagging/bending mold (3-piece divided-type mold in case of windshield glass) which has the same basic structure as the mold intended to be designed.

Alternatively, in accordance with the shape of a new glass plate, it is also possible to take out an existing solid-model of a divided-type mold for a glass plate in the shape having a higher similarity to the shape of the new glass plate.

Next, the glass shape replacing means 26 is inputted with: the shape data of the new glass plate; and the data of the existing solid-model taken out from the existing-solid-model storing part 31 as shown in FIG. 25 (step 102). Here, reference characters a1, a2, b1 and b2 in FIG. 25 indicate dividing positions, respectively, and reference character d indicates a fore-and-aft dimension of the base frame.

Further, upon this input, the shape data of the glass plate as a basis for constructing the existing solid-model are collated with the shape data of the new glass plate. Concretely, the upper, lower, right and left segments of the glass plate defined in the existing solid-model are collated with the four segments constituting the outer periphery of the new glass plate. Further, there are settled that surface of the new glass plate which contacts with the ring frame, to thereby settle reference points common to them.

Based on the shape data of the new glass plate, the glass shape replacing means 26 remodels the ring frame of the existing solid-model into a ring frame conforming to the new glass plate. Then, there are inherited the values of the existing solid-model, concerning the arbitrarily modifiable parameters such as dividing positions, positions of connecting points, and positions of hang points. For example, the dividing positions are kept at the predetermined distances (a1, a2, b1, b2) from the fore-and-aft centerline of the ring frame.

Further, based on the shape data of the new glass plate, there are modified such as the positions of hanging plates, positions of column connecting points, positions of columns, and dimensions of the base frame (for example, the fore-and-aft dimension of the base frame is modified from d to d1 (d<d1)), to thereby construct a new solid model as shown in FIG. 26 (step 103).

In this way, it becomes possible to readily reflect: the shape of the glass plate as a target of the mold design; to the existing solid-model. It becomes also possible to remodel an existing solid-model, in a short time.

Next, the human operator is to judge whether the modifiable parameters within the new solid model satisfy the predetermined design criteria (step 104) or not. Concretely, it is judged whether the dividing positions are suitable or not, based on the design criteria, for example.

If the dividing positions are inappropriate, the human operator is to input new dividing positions(values), by the input means 25 (step 105).

When the dividing positions have been modified, the modified parameter reflecting means 27 modifies the dividing positions of the central frame and rotative frames within the new solid model, in accordance with the inputted values.

When the dividing positions are appropriate, the dividing positions are determined or adopted(step 106).

Next, the flat-plate placed state calculating means 28 calculates the flat plate placed state of the new solid model. Based on the calculated flat plate placed state, the human operator is to judge whether the flat plate placed state is appropriate or not (step 107).

Concretely, the flat-plate placed state calculating means 28 calculates distances between: predetermined points on the ring frame in the bent state; and the glass plate assumed to be horizontally placed on the ring frame. The human operator is to judge whether the calculated distances between the predetermined points and the glass plate are within the ranges of the predetermined design criteria or not.

When these distances are inappropriate, there are modified the parameters (such as positions of connecting points) as determinant factors for determining the flat plate placed state. The human operator is to input values of the positions of new connecting points, by the input means 25 (step 108). Further, when it is impossible to suitably optimize the flat plate placed state only by modifying the positions of connecting points, there are modified other parameters (such as dividing positions) as determinant factors. When the dividing positions have been modified, the flow goes back to the step 104 after reflecting the modified values to the model.

When the positions of connecting points have been modified, the modified parameter reflecting means 27 modifies the positions of the connecting points of the central frames and rotative frames within the new solid model in accordance with the inputted values.

When the flat plate placed state is appropriate, the positions of connecting points are determined (step 109).

By such steps, when the parameters of the dividing positions and the positions of connecting points have been modified toward the inside of the ring frame, for example, there are modified the dividing positions R, S and the positions of connecting points 18A, 18B of the solid model as shown in FIG. 27.

In this way, it becomes possible to readily utilize existing solid-models. Also, it becomes possible to readily reflect the design modification onto the solid model, to thereby confirm the result of the modification in a short time. This enables to obtain those values of parameters satisfying the desired design criteria, with simple procedures.

(Analysis of Rotation Moment)

Figure 28:
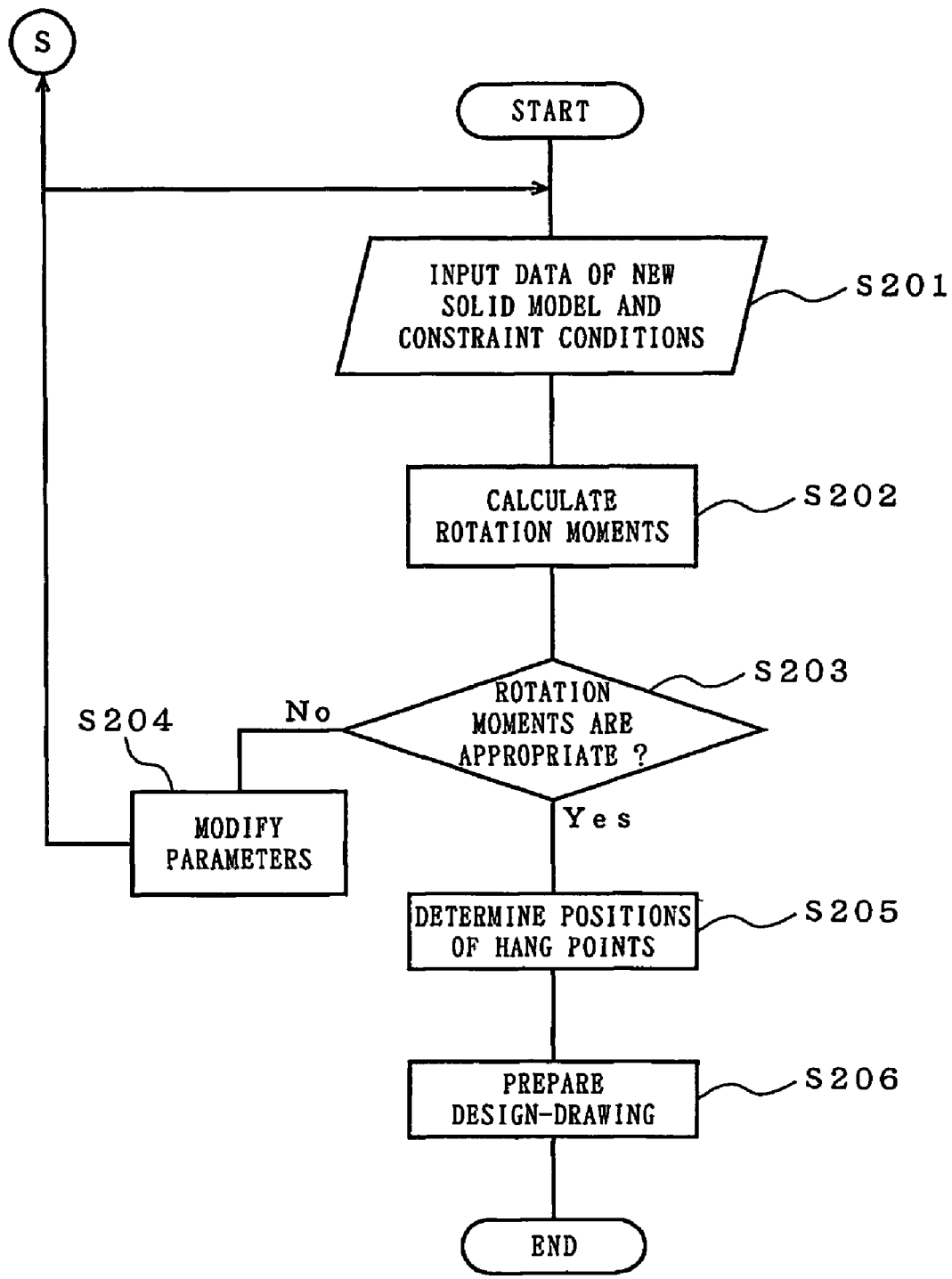
FIG. 28 is a flowchart explaining procedures for optimizing rotation moments.

There will be described hereinafter a method for optimizing rotation moments, with reference to FIG. 28 and FIG. 29. FIG. 28 is a flowchart explaining procedures for optimizing rotation moments, and FIG. 29 is a view showing an exemplary constitution of a solid model reflecting those modifications of parameters.

As shown in FIG. 28, the rotation moment analyzing means 29 is firstly inputted with: the data of a new solid model; and the constraint conditions stored in the constraint condition storing part 32 (step 201).

The rotation moment analyzing means 29 adds the constraint conditions to the inputted data of the solid model, to thereby prepare an analysis model. Then, the rotation moment analyzing means 29 analyzes the movements of the divided-type mold by utilizing the analysis model, to thereby calculate a bent state of the divided-type mold where the rotative frames are opened toward the outside, for example. Further, the rotation moment analyzing means 29 calculates rotation moments tending to rotate the rotative frames toward the inside of the ring frame, in this bent state (step 202).

The "rotation moment" can be expressed as a force tending to close each rotative frame toward the inside of the ring frame, in the bent state where the rotative frames have been opened to the outside of the ring frame.

More concretely, each rotation moment adopting a pertinent analysis model can be calculated as a reaction force at a predetermined spot of a pertinent rotative frame in the analysis model, when a load tending to rotate the rotative frame toward the outside of the ring frame is applied to the predetermined spot.

The human operator is to judge whether the calculated rotation moments are appropriate or not, concretely, whether within the range of the predetermined design criterion or not(step 203).

When the rotation moments are inappropriate, there are modified those parameters (such as positions of hang points) acting as the determinant factors for determining the rotation moments. The human operator is to input values of positions of new hang points, by using the input means 25 (step 204). When it is impossible to suitably optimize the rotation moments only by modifying the positions of hang points, there are modified other parameters (such as dividing positions, and positions of connecting points) as determinant factors and then the flow goes back to the aforementioned step 104 or 107.

When the positions of hang points have been modified, the modified parameter reflecting means 27 modifies the positions of hang points within the new solid model, in accordance with the inputted values. Further, there are modified, for example: positions of hanging plates depending on the modified hang points, respectively; positions of column connecting points depending on the positions of the hanging plates, respectively; positions of columns depending on the positions of column connecting points, respectively.

By such steps, when the positions of hang points have been modified, for example, there are modified the positions of hang points 19A, 19B, positions of hanging plates 17A, 17B, positions of column connecting points, and positions of columns 9A, 9B of the solid model as shown in FIG. 29.

Meanwhile, when the rotation moments are appropriate, there are determined the positions of hang points (step 205). Further, the design-drawing preparing means 30 prepares a design-drawing(s), based on the inputted data of the solid model of the divided-type mold (step 206).

In this way, it becomes possible to calculate precise values of the rotation moments of the divided-type mold, without conducting a test based on a prototype, for example. This enables to obtain those values of parameters satisfying the desired rotation moments, with simple procedures.

(Procedures of Designing Method Adopting Third Divided-Type Mold)

There will be described hereinafter the designing method of the present invention, by adopting the aforementioned third divided-type gravity-sagging/bending mold. Note, the aforementioned step 101 through step 109 are the same as those in the situation of the second divided-type mold, so that the description thereof shall be omitted. There will be described the analysis of the rotation moments with reference to FIG. 30.

FIG. 30 is a flowchart explaining procedures for optimizing rotation moments. As shown in FIG. 30, the rotation moment analyzing means 29 is firstly inputted with: the data of a new solid model; and the constraint conditions stored in the constraint condition storing part 32 (step 301).

The rotation moment analyzing means 29 adds the constraint conditions to the inputted data of the solid model, to thereby prepare an analysis model. Then, the rotation moment analyzing means 29 analyzes the movements of the divided-type mold by utilizing the analysis model, to thereby calculate a bent state of the divided-type mold where the rotative frames are opened toward the outside, for example. Further, the rotation moment analyzing means 29 calculates rotation moments tending to rotate the rotative frames toward the inside of the ring frame, in this state (step 302).

The human operator is to judge whether the calculated rotation moments are appropriate or not, concretely, whether within the range of the predetermined design criterion or not(step 303).

When the rotation moments are inappropriate, there are modified those parameters (such as balances of counterweights) acting as the determinant factors for determining the rotation moments. The human operator is to input values of new balances of counterweights, by using the input means 25 (step 304). When it is impossible to suitably optimize the rotation moments only by modifying the balances of counterweights, there are modified other parameters (such as dividing positions, and positions of connecting points) as determinant factors and then the flow goes back to the aforementioned step 104 or 107.

When the balances of counterweights have been modified, the modified parameter reflecting means 27 modifies the balances of counterweights within the new solid model, in accordance with the inputted values.

Meanwhile, when the rotation moments are appropriate, there are determined the balances of counterweights (step 305). Further, the design-drawing preparing means 30 prepares a design-drawing(s), based on the inputted data of the solid model of the divided-type mold (step 306).

In the aforementioned description, it has been constitutionally settled that the human operator is to conduct: the judgment for selecting a solid model of a mold having the same basic structure as the mold intended to be designed, or for selecting a solid model of a mold for a glass plate in the shape having a higher similarity to the shape of the new glass plate; the judgment whether the modifiable parameters within the solid model satisfies the predetermined design criteria or not; the judgment whether the flat plate placed state is appropriate or not; and the judgment whether the rotation moments are appropriate or not.

However, the present invention is not limited thereto. It is also possible to modify the above constitution such that these judgments are partly or wholly conducted by predetermined deciding means to be realized by a computer. Such a modification is included within the scope of the present invention.

The present invention has been described based on a vehicular windshield glass constituted of laminated glass. However, the present invention is not limited thereto. It is possible to adopt tempered glass, for example, in addition to the laminated glass. Further, door glass and rear window glass will do, for example, in addition to windshield glass. Moreover, the present invention can be of course applied to the design of divided-type molds for glass plates (such as window glass of buildings) other than vehicular glass.

Further, the present invention has been described based on the divided-type mold having a functionally 3-piece divided-type ring frame (i.e., functional three pieces comprising central frames and right and left rotative frames). However, the dividing configuration of the mold is not limited thereto. For example, the technical idea of the present invention is applicable to a design of a divided-type mold having a 2-piece divided-type ring frame, and such an adaptation is included within the scope of the present invention.

The present invention has been described based on the divided-type gravity-sagging/bending molds. However, the technical idea of the present invention is also applicable to a design of an undivided-type gravity-sagging/bending mold. Further, such an adaptation of the method according to the present invention to an undivided-type gravity-sagging/bending mold is also included within the scope of the present invention.

(Second Embodiment)

Next, the second embodiment of the present invention will be described.

There will be firstly described a press-bending mold to be designed by a designing method of a glass-plate-aimed press-bending mold according to the present invention, as the second embodiment of the present invention. In the following description, vehicular glass is explained as an exemplar of glass plate.

(First Press-Bending Mold)

Figure 31:
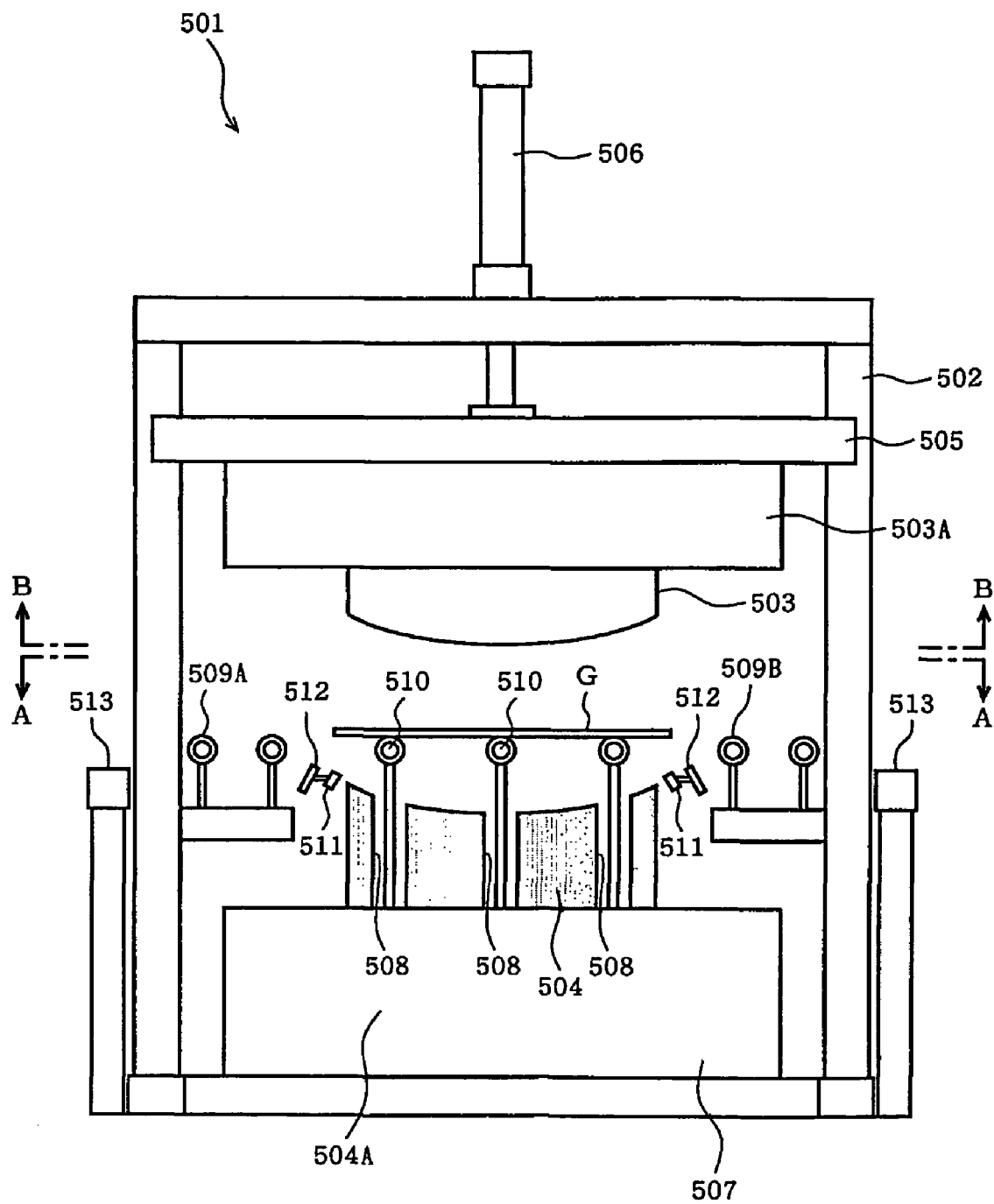
FIG. 31 is a front view showing a general constitution of a first press-bending mold according to the second embodiment of the present invention.
Figure 32:
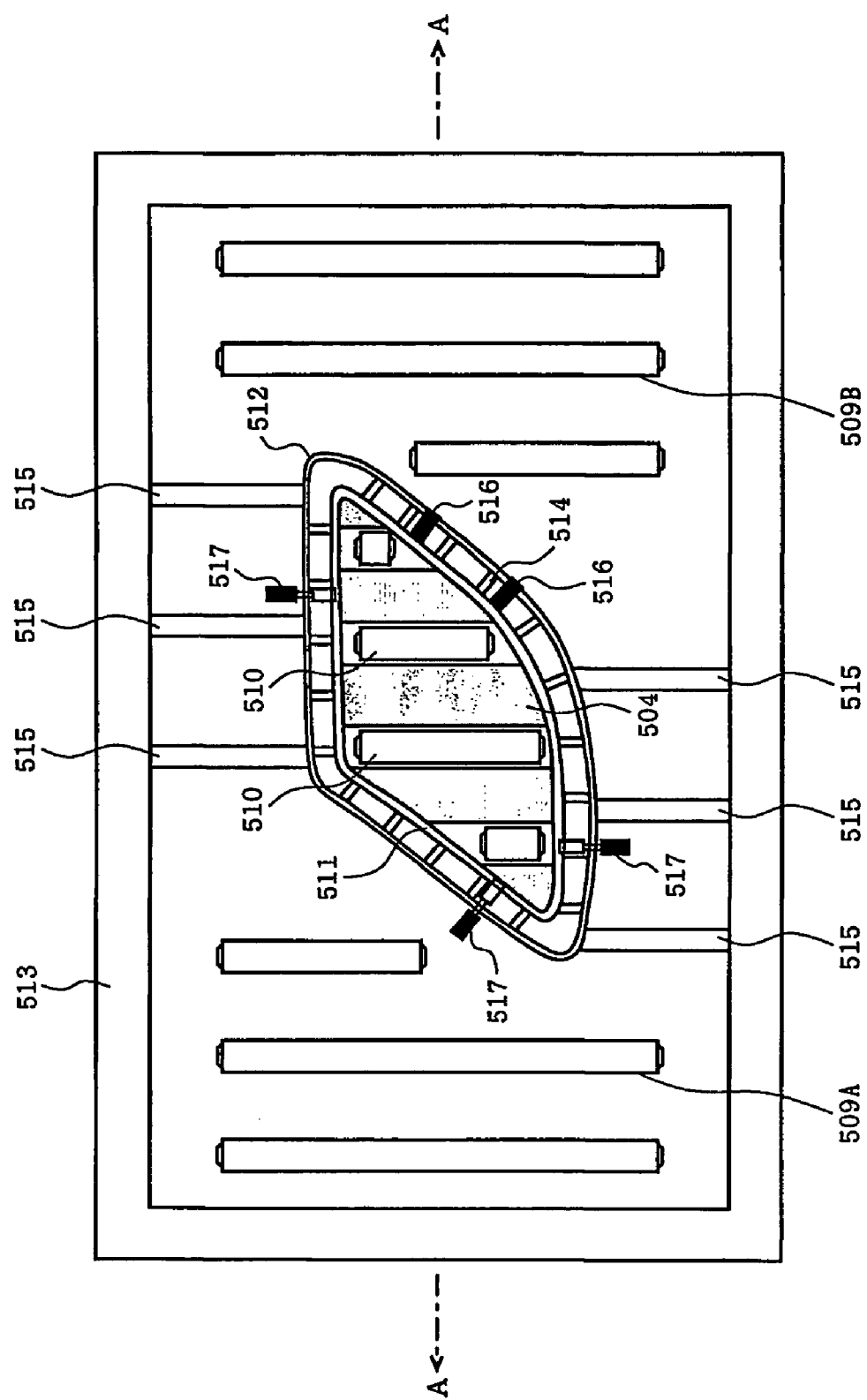
FIG. 32 is a view in an A—A arrow direction in FIG. 31.

FIG. 31 is a front view showing a general constitution of a first press-bending mold 501 according to a second embodiment of the present invention; FIG. 32 is a view in an A—A arrow direction in FIG. 31; and FIG. 33 is a view in a B—B arrow direction in FIG. 31. As shown in FIGS. 31, 32 and 33, the first press-bending mold 501 is constituted to include a frame body 502, and an upper mold 503 and a lower mold 504 within the frame body 502.

The upper mold 503 is mounted on a supporting plate 505 and connected to upper-mold cooling means 503A. This supporting plate 505 is raised and lowered by an operation of a cylinder unit 506. The lower mold 504 is provided on a base 507, and connected to lower-mold cooling means 504A provided within the base 507.

The frame body 502 is provided with transfer rollers 509A and 509B. These transfer rollers 509A deliver a glass plate heated to its softening point. Conversely, the transfer rollers 509B take out the press-bent glass plate.

Provided above the lower mold 504 are raising/lowering rollers 510. These raising/lowering rollers 510 are allowed to be raised and lowered such as by a cylinder device. Here, the positions of the raising/lowering rollers 510 are located above elongated through-holes 508 formed in the lower mold 504, respectively. Concretely, by such positions, the raising/lowering rollers 510 are allowed to buried into through-holes 508, respectively, such as by operating a cylinder device, to thereby bring the upper surface (forming surface) of the lower mold 504 to a position above the raising/lowering rollers 510.

Provided above the lower mold 504 is a pressing ring mold 511 having such a shape for surrounding the lower mold 504. The pressing ring mold 511 is mounted, via adjusting members 514, to an outer frame 512 surrounding this pressing ring mold 511. The outer frame 512 is mounted on a supporting frame 513 via joints (joining members) 515.

The outer frame 512 is provided with stoppers 516 and aligners 517. Here, the stoppers are those members provided to be struck by a glass plate transferred by the rollers, to thereby stop the glass plate at a predetermined position. Further, the aligners constitute a mechanism for adjusting the position of such a glass plate on the pressing ring mold 511.

There will be described an operation of the aforementioned first press-bending mold 501. Firstly, to be transferred from the transfer rollers 509A onto the raising/lowering rollers 510 is a glass plate heated to a temperature near the softening point thereof by a heating furnace arranged upstream of the press-bending mold 501, such that the glass plate is transferred to a forming position between the upper mold 503 and lower mold 504. At this time, the upper mold 503 and lower mold 504 are positioned above and below the raising/lowering rollers 510, respectively. The glass plate strikes the stoppers 516 and is stopped at the forming position. Next, the glass plate position is adjusted by the aligners 517.

Upon transferring the glass plate to the forming position, the cylinder device is operated to lower the raising/lowering rollers 510. The lower mold 504 is formed with the through-holes 508 just below the raising/lowering rollers 510, respectively, so that the raising/lowering rollers 510 are brought into the through-holes 508, respectively, to thereby place the upper surface of the lower mold 504 at a position above the raising/lowering rollers 510.

This transfers the glass plate placed on the raising/lowering rollers 510, onto the forming surface of the lower mold 504. Further, the peripheral portion of the glass plate is placed onto the pressing ring mold 511.

The cylinder unit 506 is then operated to lower the upper mold 503 such that the upper mold 503 and lower mold 504 are closed to each other. In this way, the glass plate is bent along the mold shape, by the own weight of the glass plate and by the pressing force of the upper mold 503.

Upon completion of the bending, the glass plate is blown with cooled air to be supplied from the upper-mold cooling means 503A and lower-mold cooling means 504A via air spouts (not shown) provided to the upper mold 503 and the lower mold 504, so that the glass plate is cooled and tempered.

Thereafter, the cylinder unit 506 is again operated to raise the upper mold 503, and the cylinder device is operated to raise the raising/lowering rollers 510, so as to remove the glass plate from the pressing ring mold 511 to thereby transfer the glass plate onto the raising/lowering rollers 510. The glass plate is then passed from the raising/lowering rollers 510 onto the transfer rollers 509B, and then transferred to a next process by the latter.

(Second Press-Bending Mold)

Figure 34:
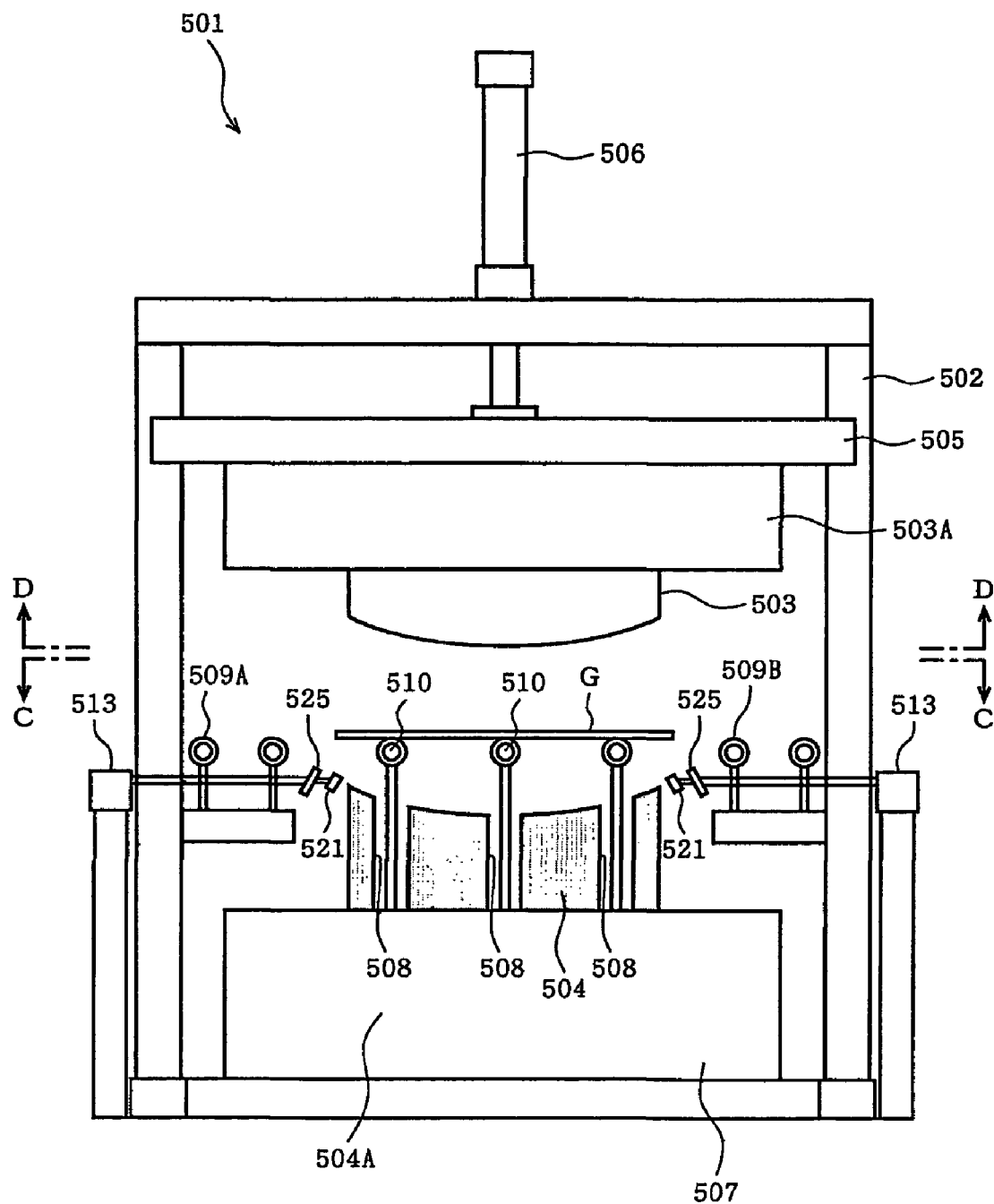
FIG. 34 is a front view showing a general constitution of a second press-bending mold according to the second embodiment of the present invention.
Figure 35:
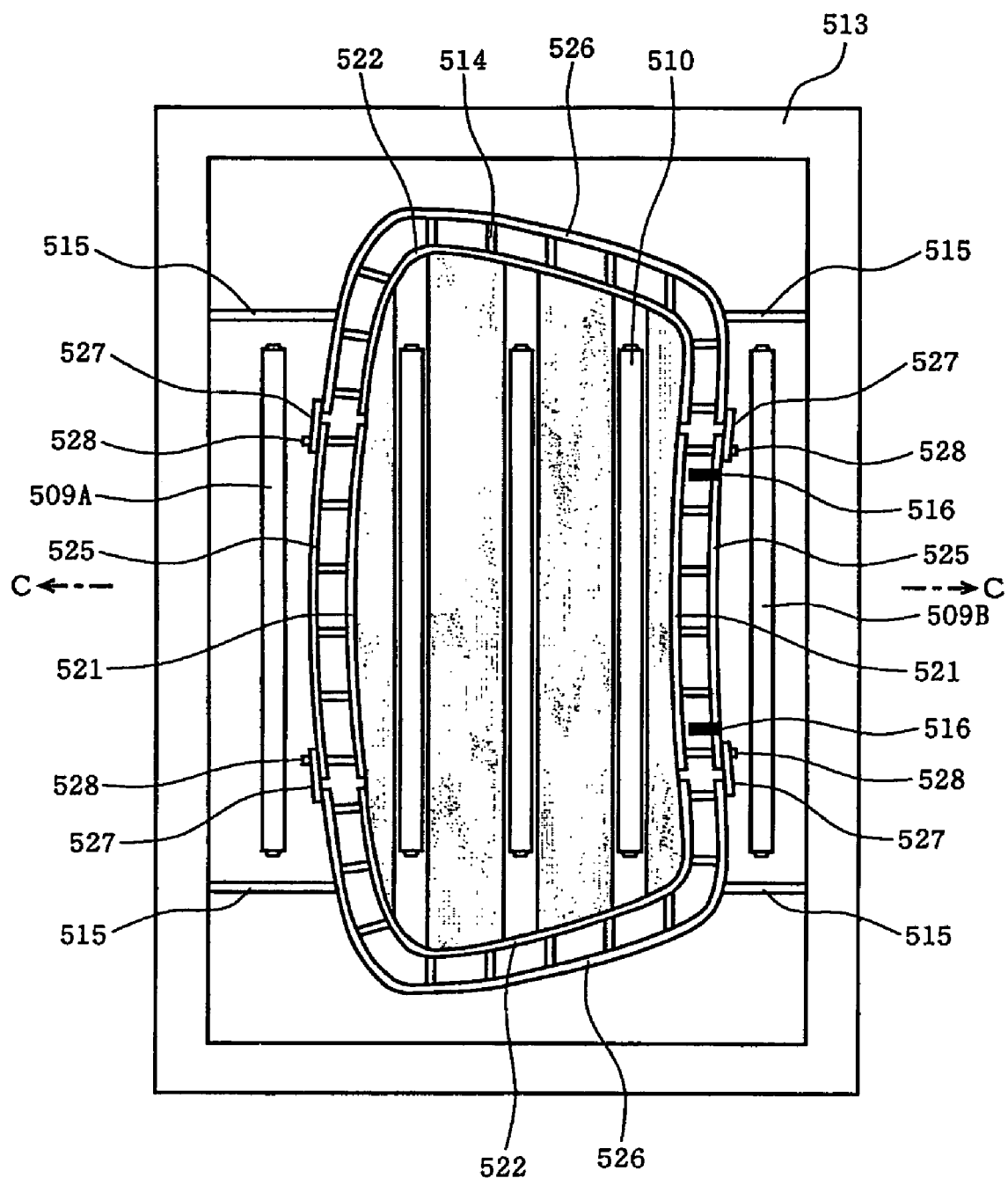
FIG. 35 is a view in a C—C arrow direction in FIG. 34.

There will be described hereinafter a second press-bending mold. Here, FIG. 34 is a front view showing a general constitution of a second press-bending mold according to a second embodiment of the present invention; FIG. 35 is a view in a C—C arrow direction in FIG. 34; and FIG. 36 is a view in a D—D arrow direction in FIG. 34. Note, like reference numerals as used in the first press-bending mold are used to denote corresponding or identical elements in the second press-bending mold to avoid their otherwise redundant description.

The second press-bending mold is different from the first press-bending mold, in that the former has a divided type pressing ring mold. Namely, the pressing ring mold is divided into three pieces consisting of central segment 521 and side segments 522, 522. Accordingly, the outer frame is also divided into central segment 525 and side segments 526, 526, based on the dividing positions of the pressing ring mold.

The side segments 526, 526 of the outer frame are rotatably supported by the joints (joining members) 515. Further, the central segment 525 and side segments 526, 526 are connected to each other via hinge plates 527 and rotation axes 528, in a relatively rotatable manner. Moreover, the pressing ring mold itself is mounted to the outer frame via adjusting members 514. In the above, the central segment 525 of the outer frame is allowed to be raised and lowered, such as by a cylinder device.

Raising and lowering the central segment 525 of the outer frame allows the central segment 525 and side segments 526, 526 of the outer frame to be vertically swung about the rotation axes 528, respectively. Further, raising and lowering the central segment 525 of the outer frame also raises and lowers the central segment 521 of the pressing ring mold mounted to the outer frame, so that the central segment 521 and side segments 522, 522 of the pressing ring mold are allowed to be vertically swung about the rotation axes 528, respectively.

There will be described hereinafter an operation of the aforementioned second press-bending mold. Such an operation is the same as the aforementioned first press-bending mold, to such an extent that a heated glass plate is transferred into a forming position. However, the pressing ring mold and the outer frame of this second press-bending mold are to be placed into a bent state where the central segment 521 and central segment 525 have been raised.

Next, the raising/lowering rollers 510 are lowered so that the peripheral portion of the glass plate is placed onto and supported by predetermined portions of the pressing ring mold in the bent state.

The cylinder unit 506 is then operated to lower the upper mold 503 such that the upper mold 503 and lower mold 504 are closed to each other. At this time, the pressing ring mold is gradually released from its bent state into a targeted bending shape. Further, the glass plate is bent along such a mold shape, by the own weight of the glass plate and by the pressing force of the upper mold 503. The glass plate is then cooled and tempered.

Thereafter, the raising/lowering rollers 510 are raised, so that the glass plate is passed from the pressing ring mold 521, 522 onto the raising/lowering rollers 510, and then duly transferred to a next process.

(Third Press-Bending Mold)

Figure 37:
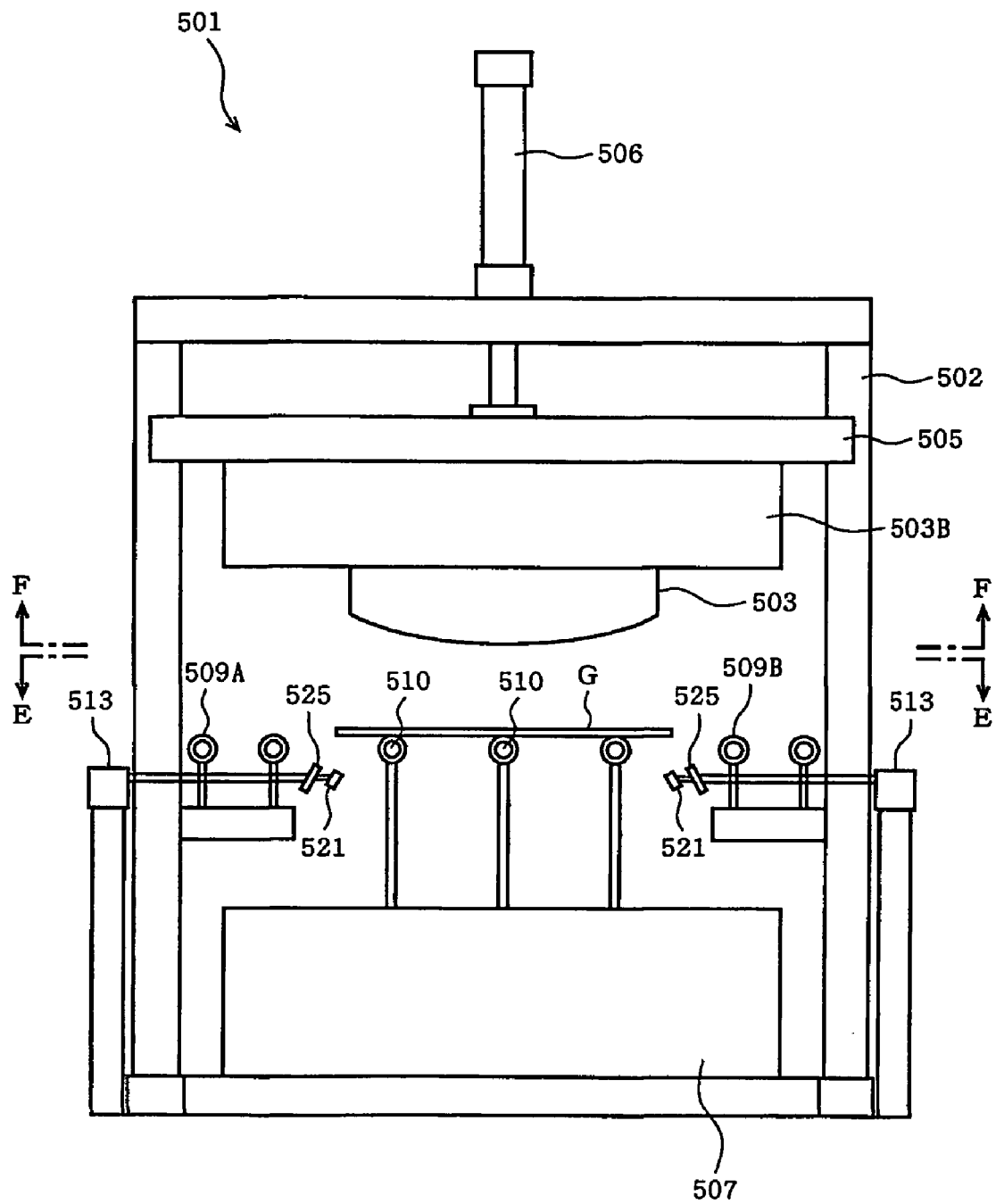
FIG. 37 is a front view showing a general constitution of a press-bending portion of a third press-bending mold according to the second embodiment of the present invention.
Figure 39:
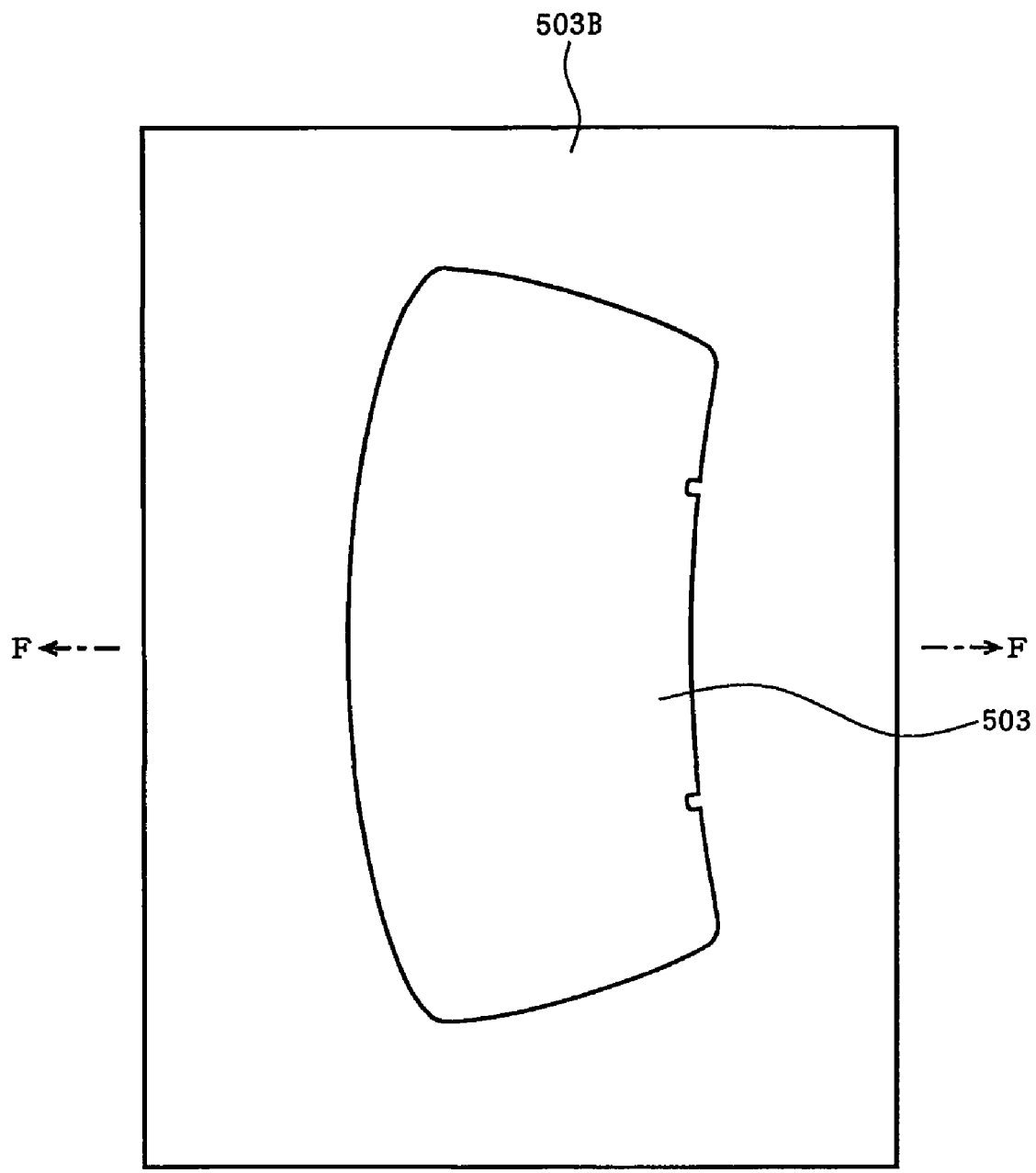
FIG. 39 is a view in an F—F arrow direction in FIG. 37.
Figure 40:
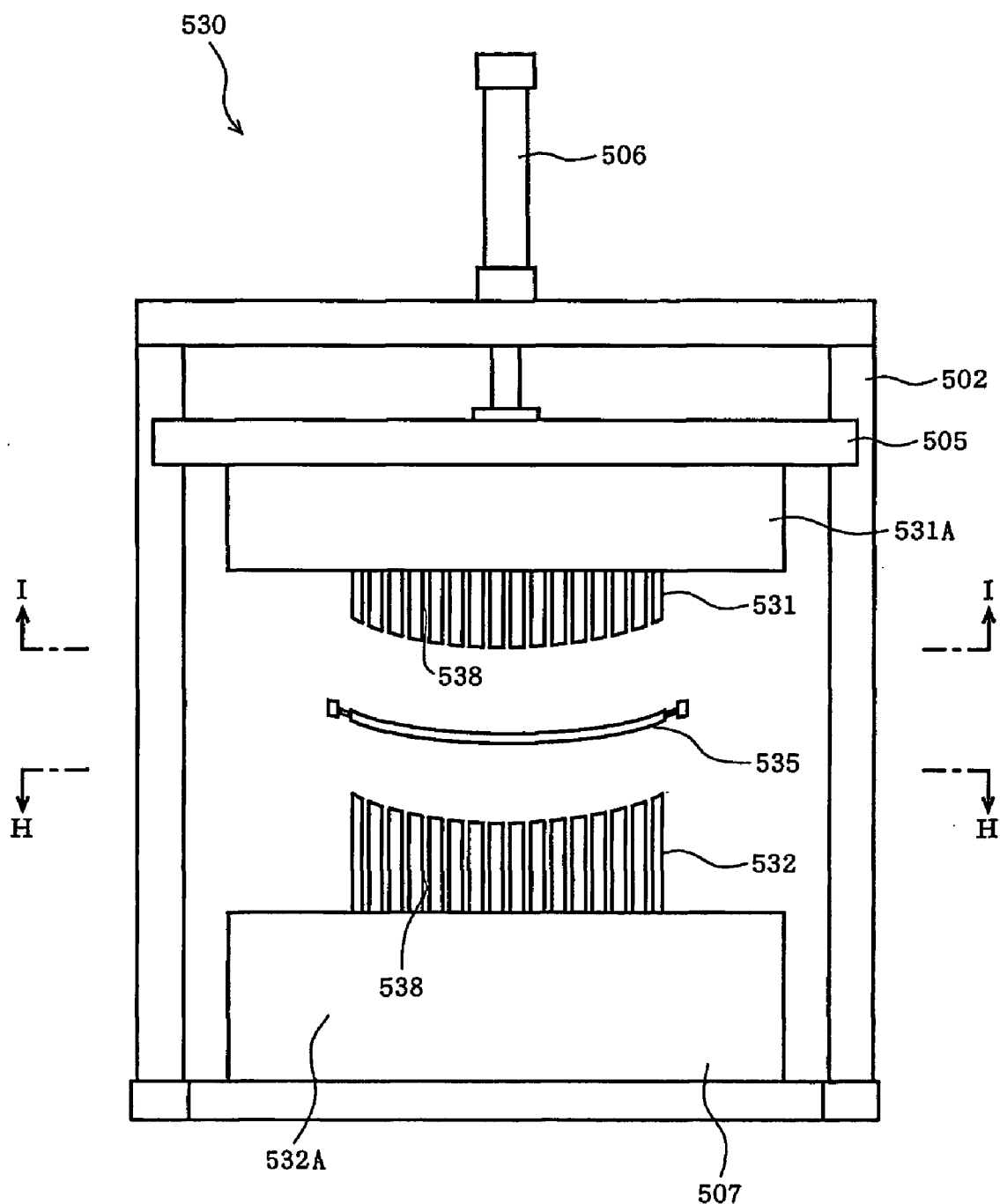
FIG. 40 is a front view showing a general constitution of a quenching device of the third press-bending mold according to the second embodiment of the present invention.
Figure 43:
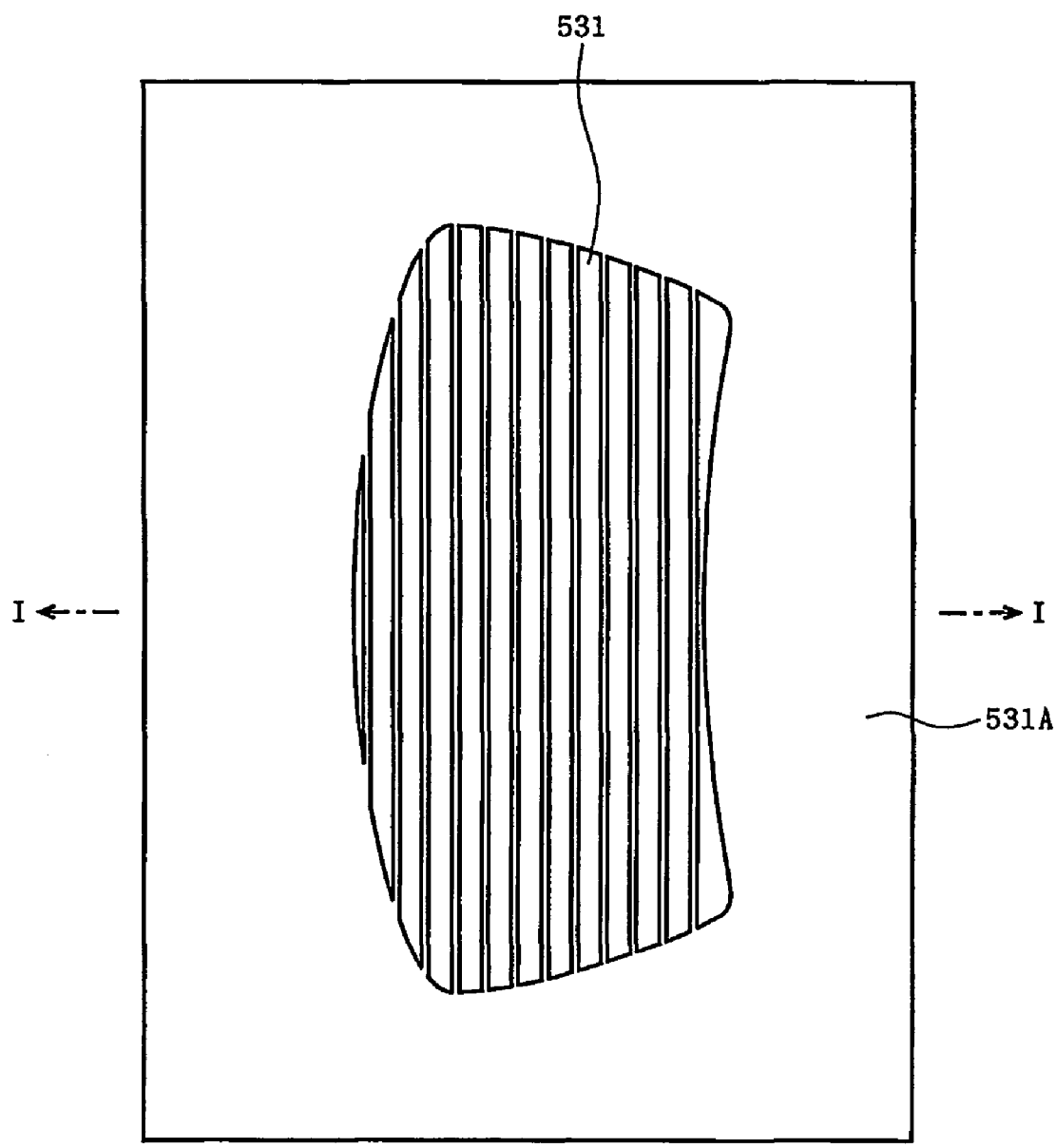
FIG. 43 is a view in an I—I arrow direction in FIG. 40.

There will be described hereinafter a third press-bending mold. This third press-bending mold is to include a press-bending portion having basically the same structure as the second press-bending mold. However, the third press-bending mold is largely different from the second press-bending mold, in that the former is provided with a quenching device to be used in a downstream process. Here, FIG. 37 is a front view showing a general constitution of a press-bending portion of a third press-bending mold according to a second embodiment of the present invention; FIG. 38 is a view in an E—E arrow direction in FIG. 37; FIG. 39 is a view in an F—F arrow direction in FIG. 37; FIG. 40 is a front view showing a general constitution of a quenching device of the third press-bending mold according to the second embodiment of the present invention; FIG. 41 is a plan view showing a general constitution of a quenching ring mold; FIG. 42 is a view in an H—H arrow direction in FIG. 40; FIG. 43 is a view in an I—I arrow direction in FIG. 40; and FIG. 44 is an explanatory view of a function of the quenching ring mold. Like reference numerals as used in the first and second press-bending molds are used to denote corresponding or identical elements in the third press bending mold to avoid their otherwise redundant description.

Firstly, the third press-bending mold according to the second embodiment of the present invention is to include its press-bending portion having basically the same structure as the second press-bending mold. However, the third press-bending mold is different from the second press-bending mold, in that the third press-bending mold is: omitted with the lower mold 504; omitted with the upper-mold cooling means 503A; while provided with means (vacuum-sucking means) 503B for vacuum-sucking an as-bent glass plate via sucking holes (not shown) provided on the upper mold 503, vacuum-sucking means is connected to the upper mold 503.

Further, the third press-bending mold according to the second embodiment of the present invention includes a quenching device 530 provided with an upper quenching portion 531, a lower quenching portion 532 and a quenching ring mold 535. The upper quenching portion 531 is connected to upper cooling means 531A, while the lower quenching portion 532 is connected to lower cooling means 532A provided within the base 507. Further, the upper quenching portion 531 and lower quenching portion 532 are formed with through-holes 538 for blasting cooled air from the cooling means 531A and 532A.

As shown in FIG. 41, the quenching ring mold 535 is provided with: a ring member 536; an outer frame 537; and adjusting members 514 for mutually connecting the ring member 536 and outer frame 537. As shown in FIG. 44, the quenching ring mold 535 is horizontally moved between the press-bending portion and the quenching device 530, so as to transport the glass plate bent in the press-bending portion to the quenching device 530.

There will be described hereinafter an operation of the third press-bending mold. The glass plate, which has been bent at the press-bending portion along a mold shape by the own weight of the glass plate and by the pressing force of the upper mold 503, is vacuum-sucked by the vacuum-sucking means 503B and the upper mold 503. Further, the glass plate is upwardly moved together with the upper mold 503 when the upper mold 503 is raised. In this state, the quenching ring mold 535 is horizontally moved and positioned just below the upper mold 503. Then, the upper mold 503 is lowered so as to place the glass plate onto the ring member 536 of the quenching ring mold 535, and so as to thereafter terminate the vacuum suction. This transfers the glass plate onto the quenching ring mold 535.

Thereafter, the quenching ring mold 535 is horizontally moved into the quenching device 530, and stopped at a state where the quenching ring mold 535 is positioned just below the upper quenching portion 531. At this time, the upper quenching portion 531 of the quenching device 530 is positioned above. Then, the upper quenching portion 531 is lowered, and thereafter the streams of cooled air to be supplied from the cooling means 531A and 532A are blasted onto the glass plate via upper quenching portion 531 and lower quenching portion 532, respectively, to thereby cool the glass plate.

(Constitution of 3-Dimensional CAD System)

There will be described hereinafter a 3-dimensional CAD system to be used in a designing method of a glass-plate-aimed press-bending mold according to the second embodiment of the present invention, with reference to the accompanying drawings. Here, FIG. 45 is a block diagram showing a constitution of a 3-dimensional CAD system according to the second embodiment of the present invention.

As shown in FIG. 45, the 3-dimensional CAD system according to the second embodiment of the present invention comprises: input means 555, relevant-model selecting means 556, glass-shape exchanging means 557, modified-parameter reflecting means 558, stopper/aligner adjusting means 559, rotation-center adjusting means 560, interference checking means 561, design-drawing preparing means 562, an existing-solid-model storing part 563 and a constraint-condition storing part 564.

The input means 555 is realized by: an input device such as a keyboard, mouse, touch panel; or communicating means for receiving data from other computers via predetermined network. The data inputted from the input means 555 are transmitted to a main memory, for example, via input/output interface (not shown).

Further, it is possible to realize the relevant-model selecting means 556, glass-shape exchanging means 557, modified-parameter reflecting means 558, stopper/aligner adjusting means 559, rotation-center adjusting means 560, interference checking means 561 and design-drawing preparing means 562; such as by executing a predetermined program on a computer.

The existing-solid-model storing part 563 and constraint condition storing part 564 are realizable, by utilizing a storage device such as a main storage device or auxiliary storage device.

The existing-solid-model storing part 563 is stored with solid models of previously designed press-bending molds, as existing-solid-model data.

Figure 46:
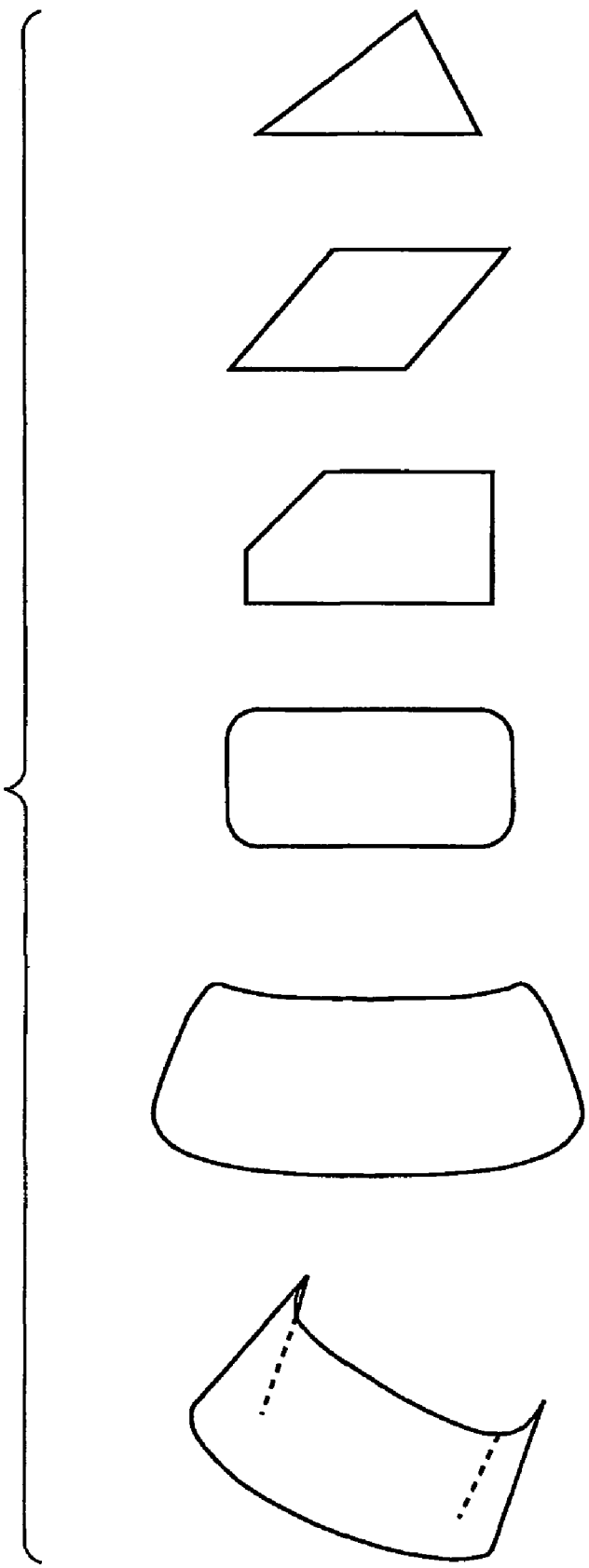
FIG. 46 is a view showing representative shapes of vehicular glass to be formed by press-bending molds.

There will be described hereinafter existing solid-models of press-bending molds to be stored in the existing-solid-model storing part 563, with reference to the pertinent drawings. Here, FIG. 46 is a view showing representative shapes of vehicular glass to be formed by press-bending molds.

The existing solid-model to be stored in the existing-solid-model storing part 563 may be singular or plural. In storing a plurality of existing solid-models, it is possible to store existing solid-models of a plurality of bending molds related to basic structures different from one another, for example.

For example, the basic structures are classified in accordance with the aforementioned first press-bending mold, second press-bending mold and third press-bending mold. Concretely, the basic structures may be classified into: a press-bending mold having an undivided pressing ring mold; a press-bending mold having a divided pressing ring mold; and a press-bending mold having a quenching device.

It is further possible to sub-classify each basic structure. Concretely, each basic structure is sub-classified such as in accordance with: geometric features of glass plates targeted by bending molds; and the numbers of raising/lowering rollers to be arranged in a pertinent pressing ring mold.

More specifically, shapes of glass plates targeted by bending molds can be classified based on geometric features such as: kinds of shapes including triangle, parallelogram, trapezoid; ratios among lengths of upper, lower, right and left edges; and curvatures at corner portions. For example, shapes of vehicular door glass and rear glass can be classified into several representative shapes such as shown in FIG. 46.

Thus, in case of press-bending molds for door glass, there is adopted an undivided press-bending mold as a basic structure, for example. This basic structure is to be sub-classified such as in accordance with: representative shapes of door glass; and the numbers of raising/lowering rollers to be arranged in a pertinent pressing ring mold. The existing-solid-model storing part 563 stores therein existing solid-models of the thus classified multiple press-bending molds.

There will be described hereinafter the constraint conditions stored in the constraint-condition storing part 564. The constraint conditions are those data required to conduct a simulation of an operation of a quenching ring mold, making use of a pertinent solid model of a pertinent press-bending mold. Concretely, the constraint conditions: are those conditions which constrain the movements of the constituent parts of the pertinent press-bending mold, such as quenching ring mold and upper mold; and apply to the boundary conditions among the constituent parts, and to directions of movements.

(Preparation of Solid Model)

Figure 47:
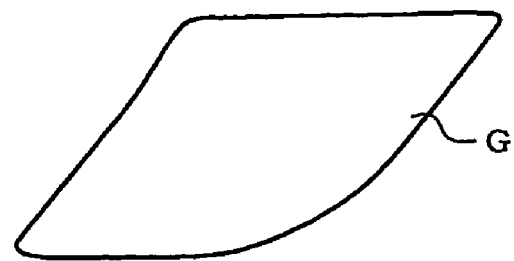
FIG. 47 is a view showing a exemplary shape of vehicular glass (door glass)

There will be described hereinafter a method for fabricating solid models of press-bending molds to be stored in the existing-solid-model storing part 563 making use of a 3-dimensional CAD application, with reference to the pertinent drawings. FIG. 47 is a view showing an exemplary shape of vehicular glass (door glass); and FIGS. 48 through 57 are views showing definition examples of solid models.

Preparation of solid models is conducted by defining constituent parts constituting the pertinent solid model. Constituent parts are defined by using designed values of shapes, dimensions, positions of the constituent parts, for example.

Each designed value is added with an attribution which is information for specifying that element of a constituent part, which element is defined by this designed value. For example, each quadrilateral pressing ring mold includes four elements, including upper, lower, right and left edges. In this case, the upper edge, lower edge, left edge and right edge are specified as attributions of associated designed values, respectively, and each element is defined by such associated designed values identified by these attributions, respectively.

These designed values are classified, based on variable properties thereof, into fixed designed values, modifiable parameters, and subordinate designed values.

The fixed designed values are those invariable designed values of predetermined constituent parts within solid models. For example, the pitches of transfer rollers and raising/lowering rollers are fixed to predetermined spacing. Further, the dimensions of frame body, supporting plate and base apply to the fixed designed values.

Next, modifiable parameters are those designed values of predetermined constituent parts which can be arbitrarily modified. For example, setting positions of stoppers and aligners are defined as modifiable parameters. This enables to arbitrarily modify setting positions of stoppers and aligners.

Further, subordinate designed values are those designed values which can be obtained based on a certain designed value (basic designed value) such as by giving the basic designed value to predetermined formulas or functions. For example, subordinate designed values include a position of other constituent part to be determined based on a position of a certain constituent part.

Concretely concerning subordinate designed values, shapes and dimensions of pressing ring molds are determined based on bending-shapes and dimensions of glass plates. Further, horizontal lengths of raising/lowering rollers to be arranged within a pertinent pressing ring mold are determined based on the shape of the pressing ring mold, such that the raising/lowering rollers are confined within the pressing ring mold.

Note, if an applicable basic designed value is a modifiable parameter, the subordinate designed value(s) of the basic designed value is(are) also modified in accordance with the modification of the parameter.

(Preparation of Solid Model of First Press-Bending Mold)

There will be described hereinafter an exemplary preparing method of a solid model, taking the aforementioned first press-bending mold for example. Firstly, there is provided shape data of a vehicular glass (door glass) G such as shown in FIG. 47, as shape data of a glass plate as a design target of a press-bending mold.

This vehicular glass has an substantially quadrilateral outer shape including elements of upper, lower, left and right edges. Thus, this outer shape is defined by designed values to be identified based on attributions for the respective elements of upper, lower, left and right edges.

Figure 48:
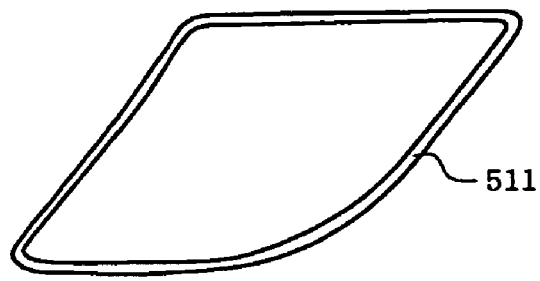

Next, as a constituent part, there is prepared a pressing ring mold conforming to the shape of this vehicular glass. The shape of the pressing ring mold is defined as a subordinate designed value depending on the shape of the glass plate. Concretely, the outer shape of the pressing ring mold in a plan view is defined as subordinate designed values depending on the outer shape of the glass plate, and the upper surface of the pressing ring mold (forming surface) is defined as subordinate designed values depending on the curved-surface shape of the glass plate. As shown in FIG. 48, the thus prepared pressing ring mold 511 is to include a peripheral portion having the same shape as that of the vehicular glass.

Figure 49:
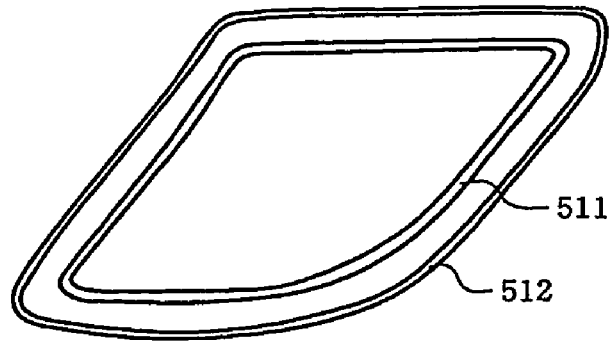

There will be then fabricated an outer frame. The shape of the outer frame is defined as subordinate designed values depending on the shape of the pressing ring mold, and placed outwardly of the pressing ring mold at a predetermined distance from the outer periphery of the pressing ring mold. Thus, there is formed the outer frame 512 which encloses the pressing ring mold 511, such as shown in FIG. 49.

Figure 50:
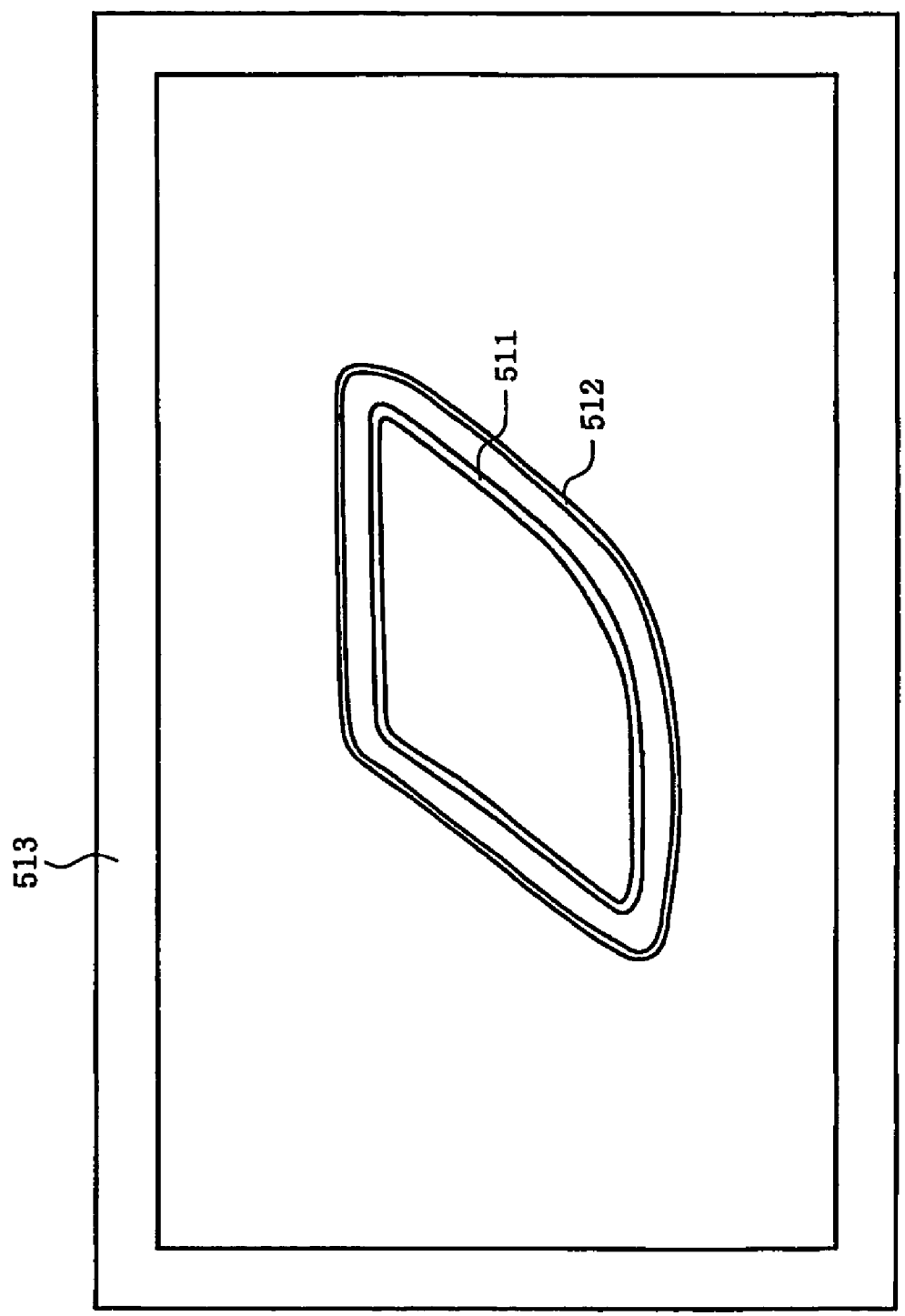

Then, there are determined the positions of these pressing ring mold and outer frame. These positions are determined such as based on a center of gravity of a glass plate to be placed on the pressing ring mold, so that the center of gravity of the glass plate coincides with the center of the supporting frame. Thus, the pressing ring mold 511 and outer frame 512 are arranged at predetermined positions within the supporting frame 513, such as shown in FIG. 50.

Note, the dimensions of the supporting frame are defined as fixed designed values, and the positions of the pressing ring mold and outer frame are defined as modifiable parameters. This allows to arbitrarily modify the positions of the pressing ring mold and outer frame.

Figure 51:
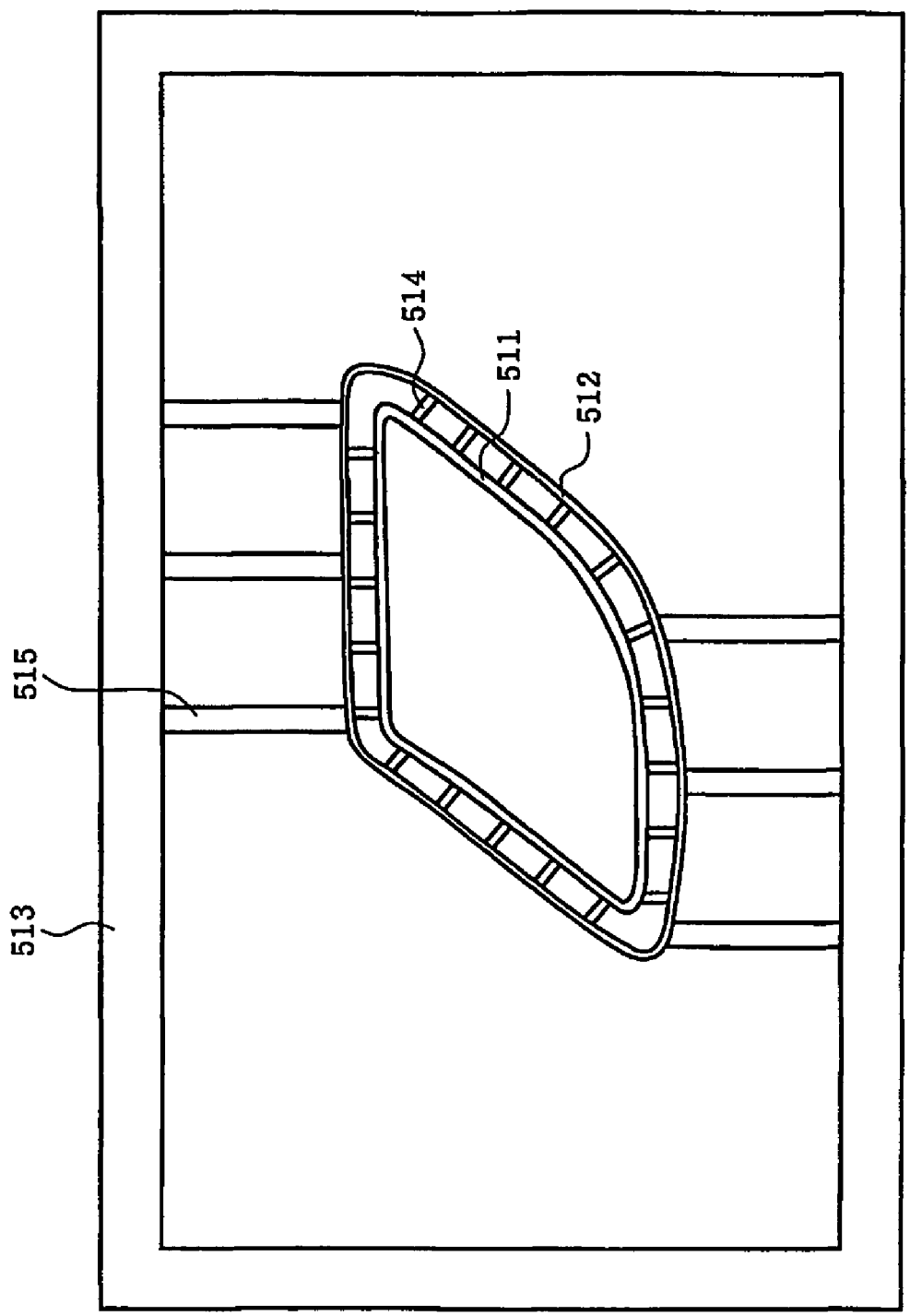

Next, there are settled joints (joining members) between the outer frame and supporting frame. The widths of the joints (joining members) are treated as fixed designed values, while the lengths of joints are treated as subordinate designed values depending on the respective distances between the outer frame and supporting frame. Thus, there are prepared joints (joining members) 515 between the outer frame 512 and supporting frame 513, such as shown in FIG. 51.

Note, the joining positions between the joints (joining members) and outer frame are settled as arbitrarily modifiable parameters. This enables to arbitrarily modify the positions of the joints (joining members).

Next, there are settled adjusting members between the pressing ring mold and outer frame. The widths of the adjusting members are treated as fixed designed values, while the lengths of the adjusting members are treated as subordinate designed values depending on the respective distances between the pressing ring mold and outer frame. Thus, there are prepared adjusting members 514 between the pressing ring mold 511 and outer frame 512, such as shown in FIG. 51.

Note, the number of adjusting members and the setting positions of adjusting members are defined as modifiable parameters, respectively. This allows to arbitrarily modify the number of adjusting members and the setting positions of adjusting members.

Next, there are settled stoppers and aligners. The sizes, shapes and the like of the stoppers and aligners are to be defined as fixed designed values, respectively. Further, there are defined conditions such that the positions of the stoppers and aligners are always arranged on the outer frame, and these positions are defined as arbitrarily modifiable parameters on the outer frame.

The directions of the stoppers and aligners are defined as subordinate designed values depending on the outline of the glass. Concretely, these directions are defined such that each of stoppers and aligners is positioned in a direction perpendicular to the outline of the glass. Note, the directions of the stoppers and aligners are adjusted to become perpendicular to the outline of the glass by the stopper/aligner adjusting means to be described later.

Figure 52:
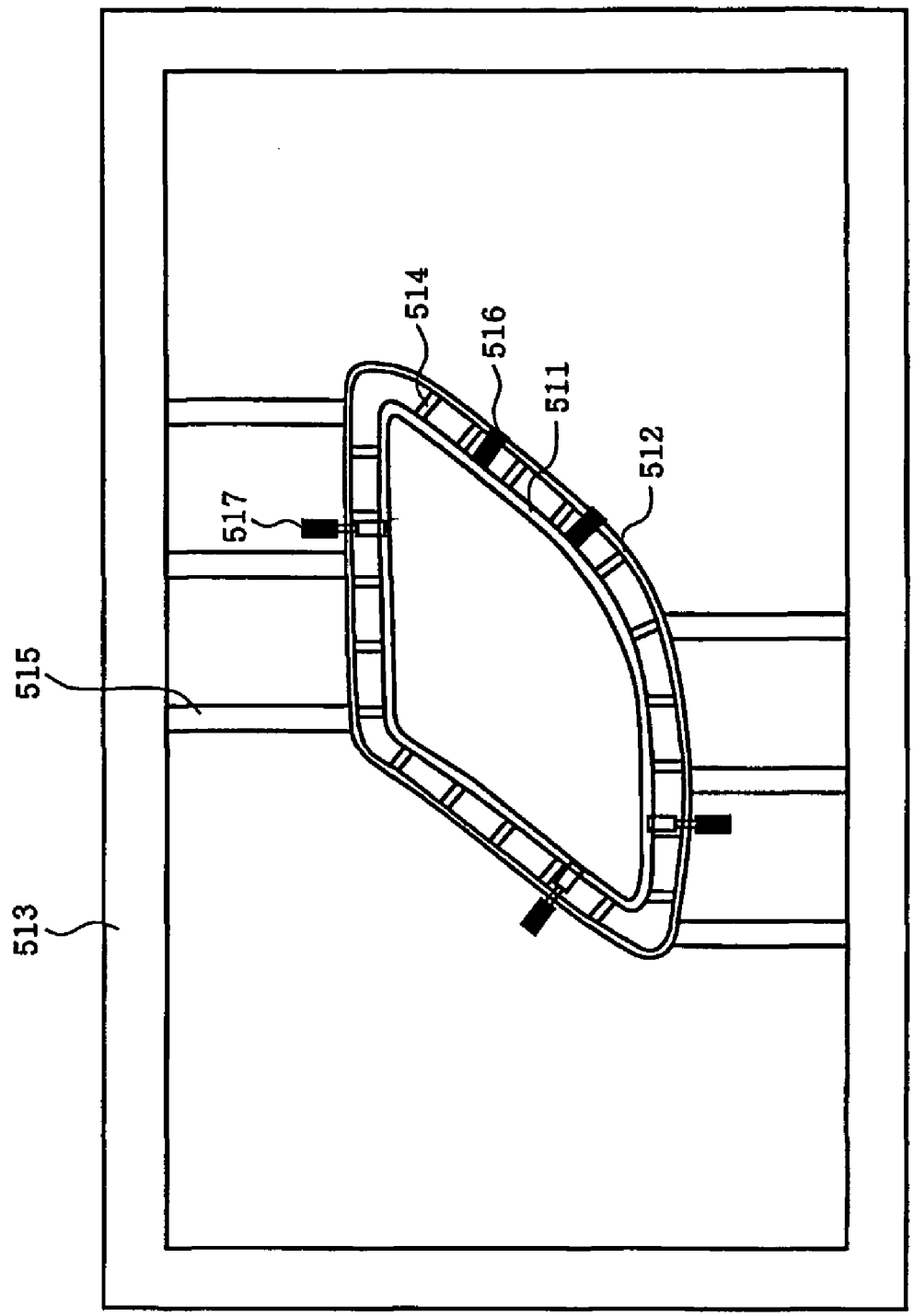

In this way, there are prepared stoppers 516 and aligners 517 on the outer frame 512, such as shown in FIG. 52.

Next, there are settled various rollers. The horizontal positions, heightwise positions, pitches, horizontal widths and horizontal lengths of the transfer rollers are defined as fixed designed values. The horizontal position, heightwise position, pitch and horizontal widths of the raising/lowering rollers are defined as fixed designed values, and the horizontal lengths of the raising/lowering rollers are defined as subordinate designed values depending on the shape of the inner periphery of the pressing ring mold. Concretely, the horizontal lengths of the raising/lowering rollers are settled such that these rollers are spaced from the inner edge of the pressing ring mold by predetermined distances, respectively.

Figure 53:
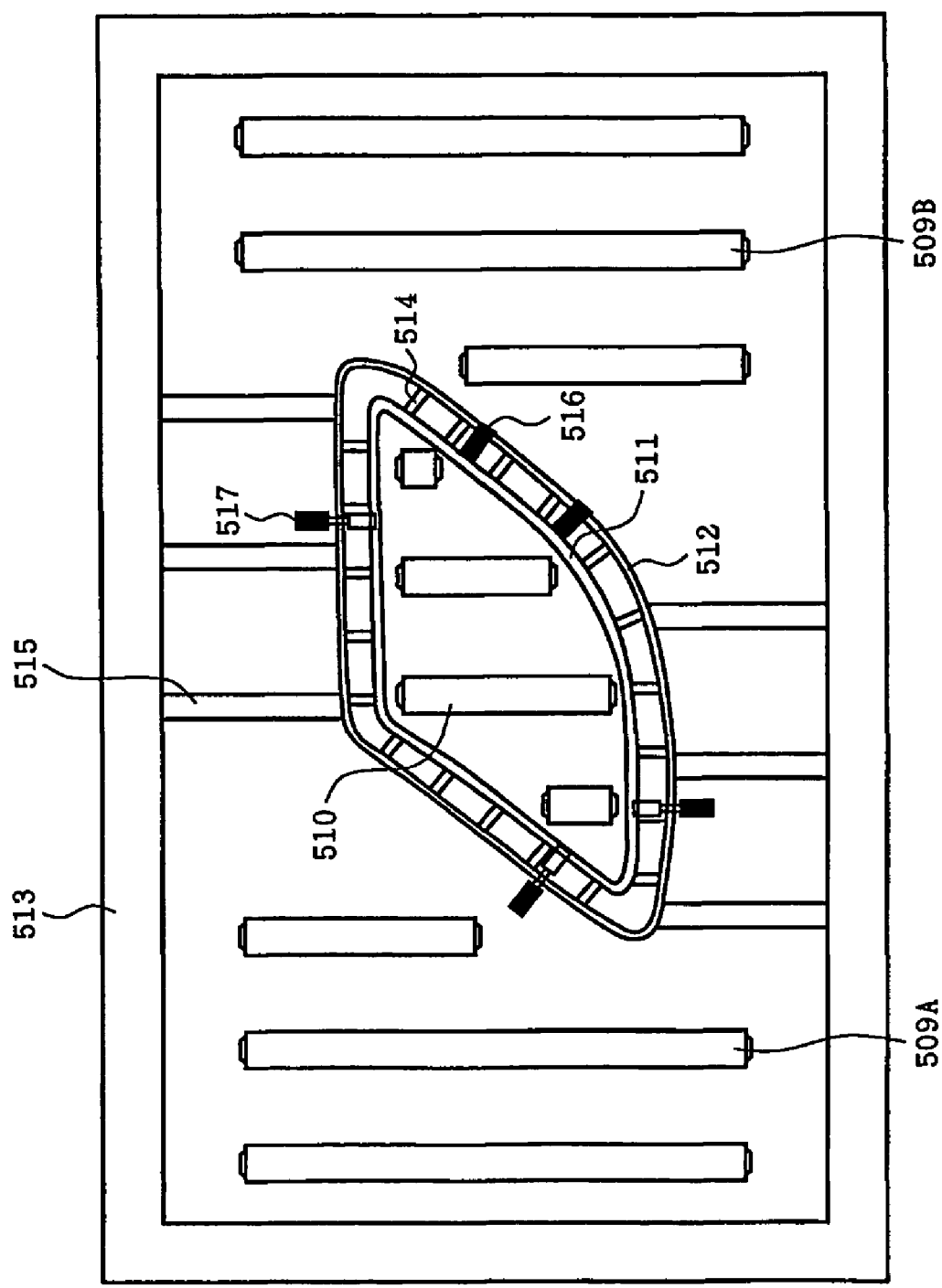

In this way, there are provided transfer rollers 509A, 509B as shown in FIG. 53, as well as raising/lowering rollers 510 within the pressing ring mold 511.

Figure 54:
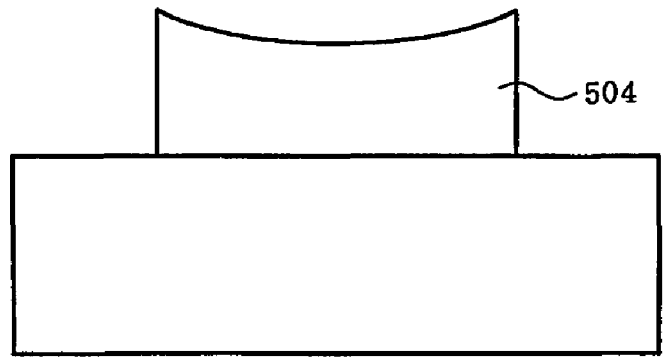

Next, there is prepared a lower mold. The outer shape of the lower mold in a plan view is defined as subordinate designed values depending on the shape conforming to the inner periphery of the pressing ring mold, and the upper surface (forming surface) of the lower mold is defined as subordinate designed values depending on the curved-surface shape of the glass plate. Thus, there is prepared a lower mold 504 such as shown in FIG. 54.

Figure 55:
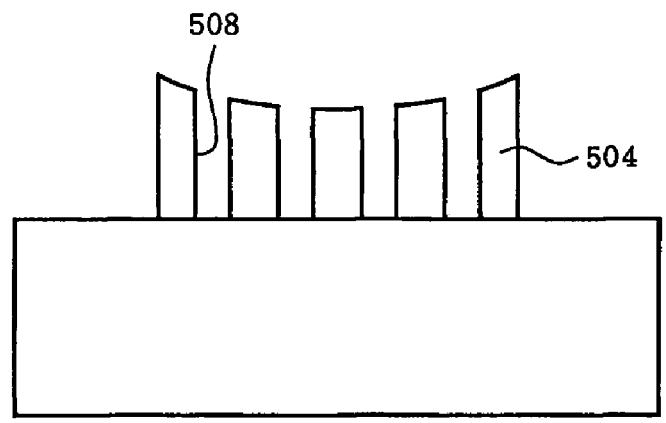

Further, the horizontal positions, widths and horizontal lengths of the through-holes of the lower mold are defined as subordinate designed values depending on the raising/lowering rollers. Thus, there is prepared the lower mold 504 formed with the through-holes 508 as shown in FIG. 55.

Next, there is prepared an upper mold. The outer shape of the upper mold in a bottom view is defined as subordinate designed values depending on the outer shape of the pressing ring mold, and the lower surface (forming surface) of the upper mold is defined as subordinate designed values depending on the curved-surface shape of the glass plate. Thus, there is fabricated the upper mold 503 as shown in FIG. 56.

Further, notches to be provided in the upper mold are defined as subordinate designed values depending on the positions and shapes of the stoppers and aligners on the outer frame. Thus, there is prepared the upper mold 503 as shown in FIG. 57. In this way, there is eventually prepared a solid model of the press-bending mold as shown in FIG. 31.

(Preparation of Solid Model of Second Press-Bending Mold)

Figure 59:
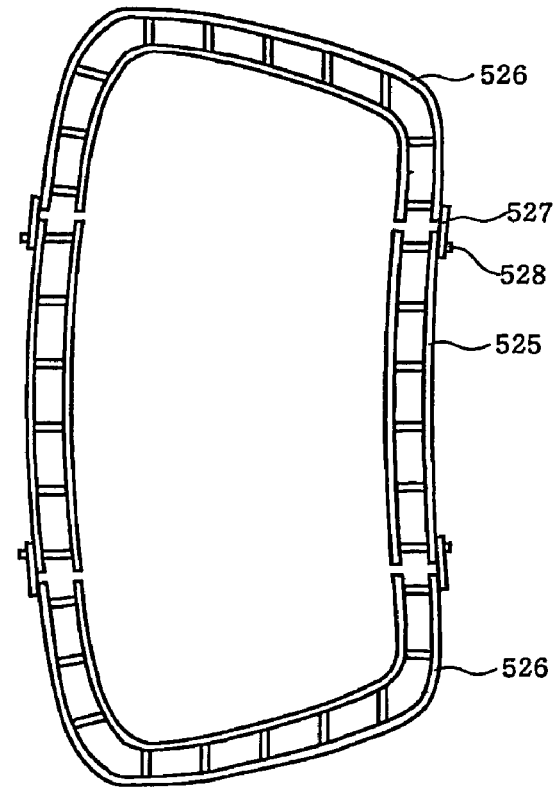
FIGS. 59, 60 are explanatory views of definition examples of a solid model.
Figure 60:
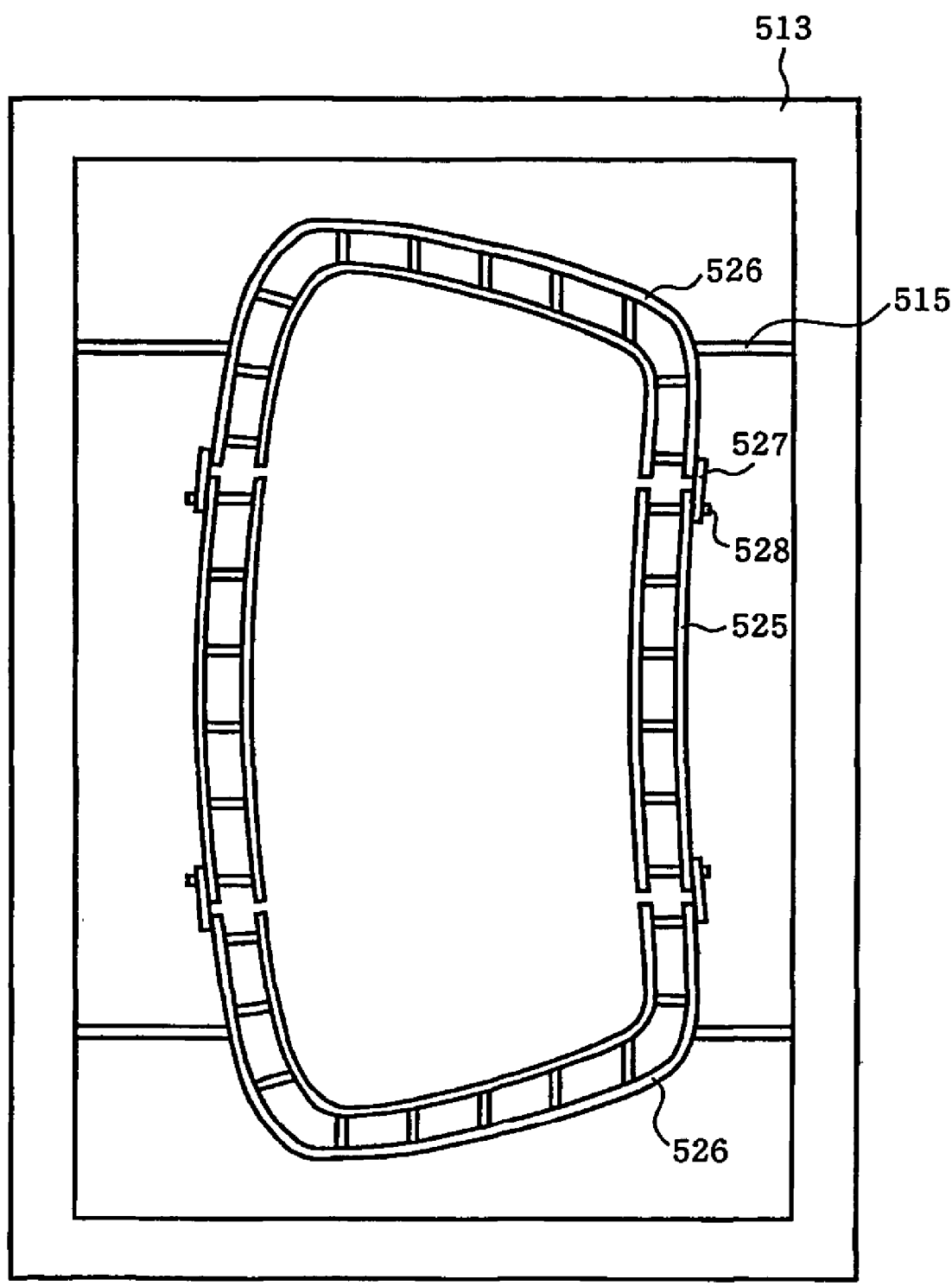

There will be described hereinafter a preparing method of a solid model of the aforementioned second press-bending mold. There shall be omitted the explanation of those portions basically common to the preparing method of the solid model of the first press-bending mold. Here, FIG. 58 is a view showing an exemplary shape of vehicular glass (rear glass), and FIGS. 59, 60 are explanatory views of definition examples of a solid model.

Figure 58:
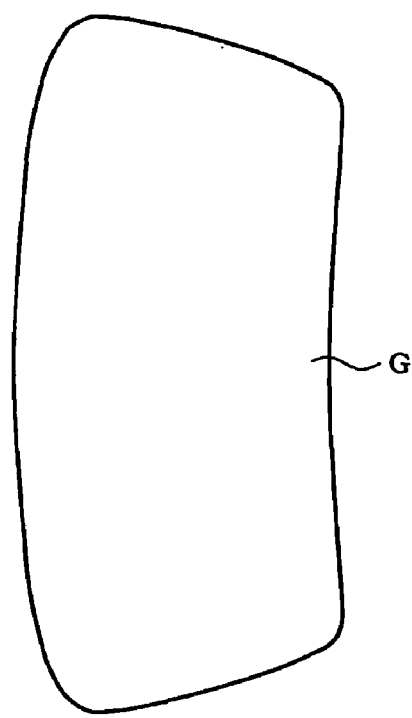
FIG. 58 is a view showing an exemplary shape of vehicular glass (rear glass)

Firstly, there is given shape data of a vehicular glass (rear glass) G such as shown in FIG. 58, as shape data of a glass plate as a design target of a press-bending mold.

Identically to the first press-bending mold, there shall be prepared the pressing ring mold and outer frame based on the shape of the glass plate. However, since each of the pressing ring mold and outer frame of the second press-bending mold is divided into three pieces, there shall be defined the dividing positions as modifiable parameters. Concretely, the dividing positions are defined as predetermined distances from the center line of the pressing ring mold and outer frame, in the longitudinal direction. Further, each of the hinge plates 527 connecting the central segment 525 and side segment 526 of the outer frame is to have: a fixed end portion at the associated side segment; and an opposite end portion at the central segment such that this opposite end portion is formed with a hole for allowing a rotation axis 528 to pass through the hole; in which the fixed position of the side-segment-side end portion and the hole position of the central-segment-side end portion of each hinge plate 527 are defined as fixed designed values, while the length of each hinge plate 527 is defined as a subordinate designed value depending on the position of the associated rotation axis 528. Thus, the length of each hinge plate 527 itself is varied in accordance with the position of the associated rotation axis 528.

Further, defined as modifiable parameters are the positions of the rotation axes 528 which act as rotation centers for allowing the pressing ring mold and outer frame to swing in the vertical direction. These positions of rotation axes 528 are to be modified by the rotation-center adjusting means 560, as described later. In this way, there are formed the pressing ring mold and outer frame as shown in FIG. 59.

Next, there are mutually connected a supporting frame and the outer frame, via joints (joining members). In this second press-bending mold, the dimensions of the supporting frame are defined as subordinate designed values depending on the dimensions of the outer frame. Thus, the dimensions of the supporting frame are determined in accordance with the outer-shape dimensions of the outer frame.

The mounting positions of the joints (joining members) onto the outer frame are defined as subordinate designed values depending on the dimensions of the outer frame. For example, the mounting positions are defined as the positions separated by predetermined distances from respective end portions of the upper and lower edges (in FIG. 60, right and left edges) of the outer frame, respectively. Further, the lengths of the joints (joining members) are subordinate designed values depending on the distances: from the mounting positions of the joints (joining members) on the outer frame; to the inner periphery of the supporting frame. In this way, there are formed the supporting frame 513 and joints (joining members) 515 as shown in FIG. 60, resulting in that the outer frame is mounted at a predetermined position within the supporting frame 513.

(Preparation of Solid Model of Third Press-Bending Mold)

Figure 61:
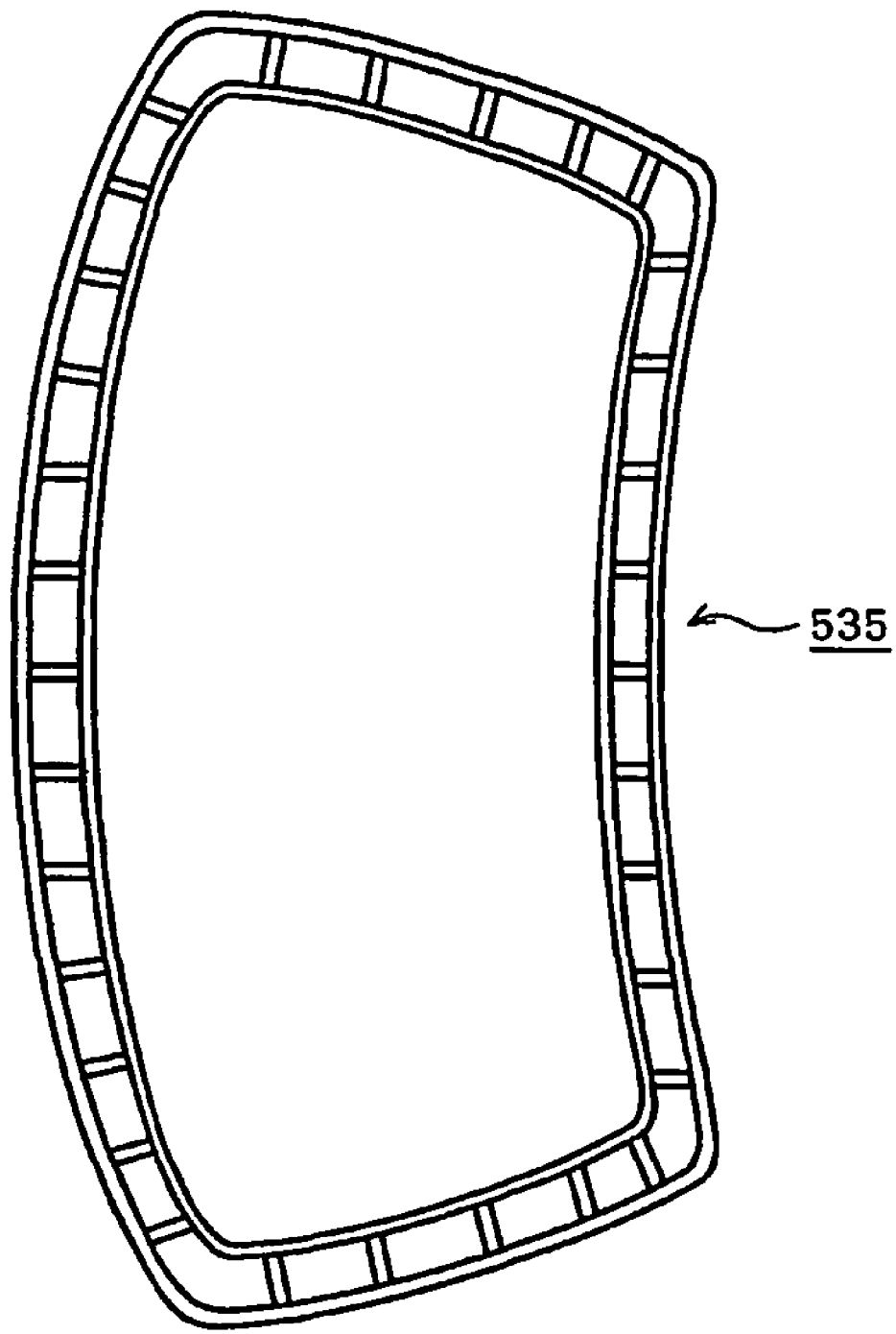
FIGS. 61 through 63 are explanatory views of a definition example of a solid model.
Figure 62:
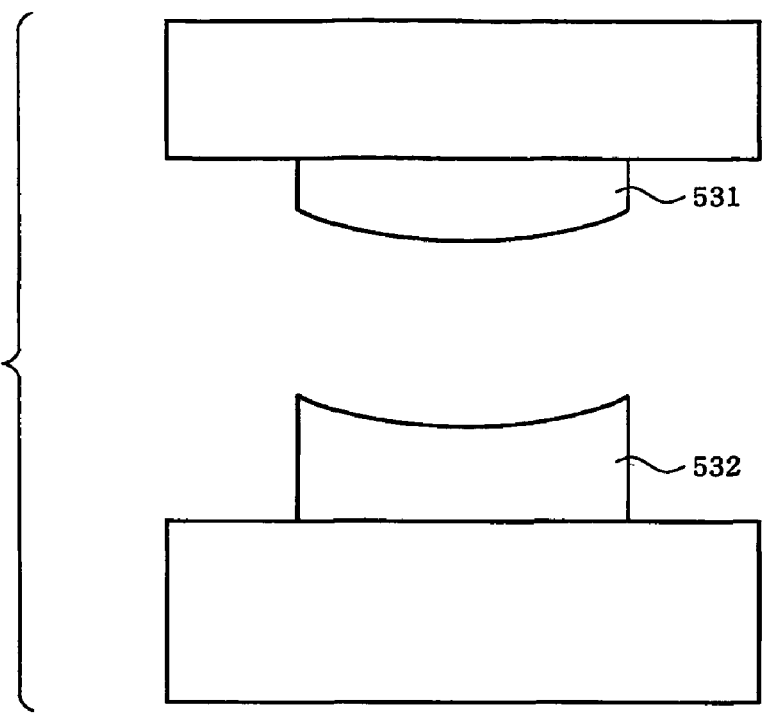
Figure 63:
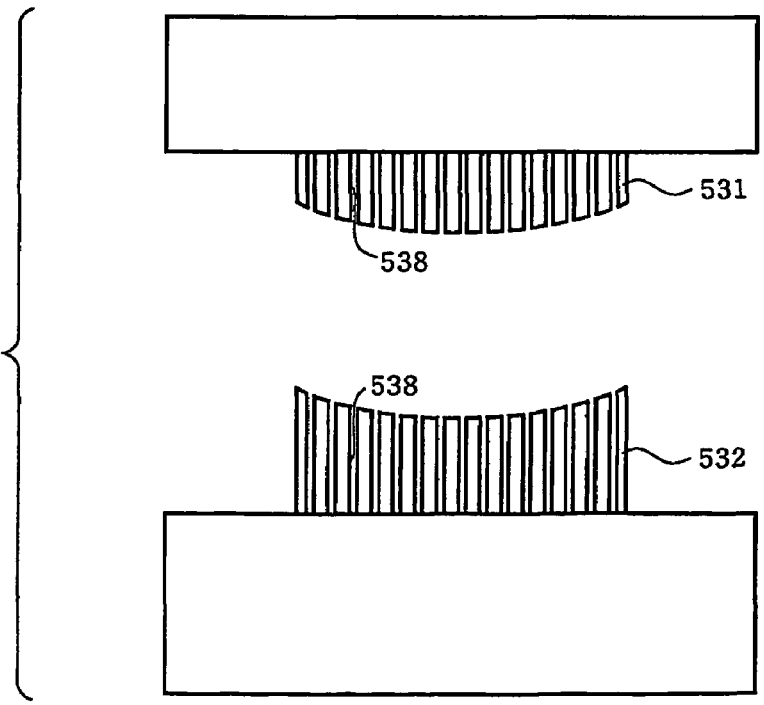

There will be described hereinafter a preparing method of a solid model of the aforementioned third press-bending mold. The third press-bending mold is substantially common to the second press-bending mold, except for the quenching device of the former. Thus, there shall be explained the preparing method of a solid model of the quenching device. Here, FIGS. 61 through 63 are explanatory views of a definition example of a solid model.

Firstly, there is prepared a quenching ring mold. The shape of the quenching ring mold is defined as subordinate designed values depending on the glass plate shape. Concretely, the outer shape of the quenching ring mold in a plan view depends on the outer shape of the glass plate, and the curved shape of the placing surface of the quenching ring mold for placing thereon the glass plate depends on the curved-surface shape of the glass plate. For example, upon giving shape data of vehicular glass (rear glass) G as shown in FIG. 58 similarly to the situation of the aforementioned second press-bending mold, there is formed a quenching ring mold 535 as shown in FIG. 61.

Next, there are prepared the upper quenching portion and lower quenching portion. The outer shape of the upper quenching portion in a bottom view and the outer shape of the lower quenching portion in a plan view are defined as subordinate designed values depending on the outer shape of the glass plate, while the bottom surface of the upper quenching portion and the upper surface of the lower quenching portion are defined as subordinate designed values depending on the curved-surface shape of the glass plate. In this way, there are formed the upper quenching portion 531 and lower quenching portion 532 as shown in FIG. 62.

Then, to be formed in the upper quenching portion and lower quenching portion are those through-holes for blasting cooled air. The widths and pitches of these through-holes are defined as fixed designed values. In this way, there are formed the upper quenching portion 531 and lower quenching portion 532 provided with the through-holes 538 as shown in FIG. 63.

(Relevant-Model Selecting Means)

Figure 64:
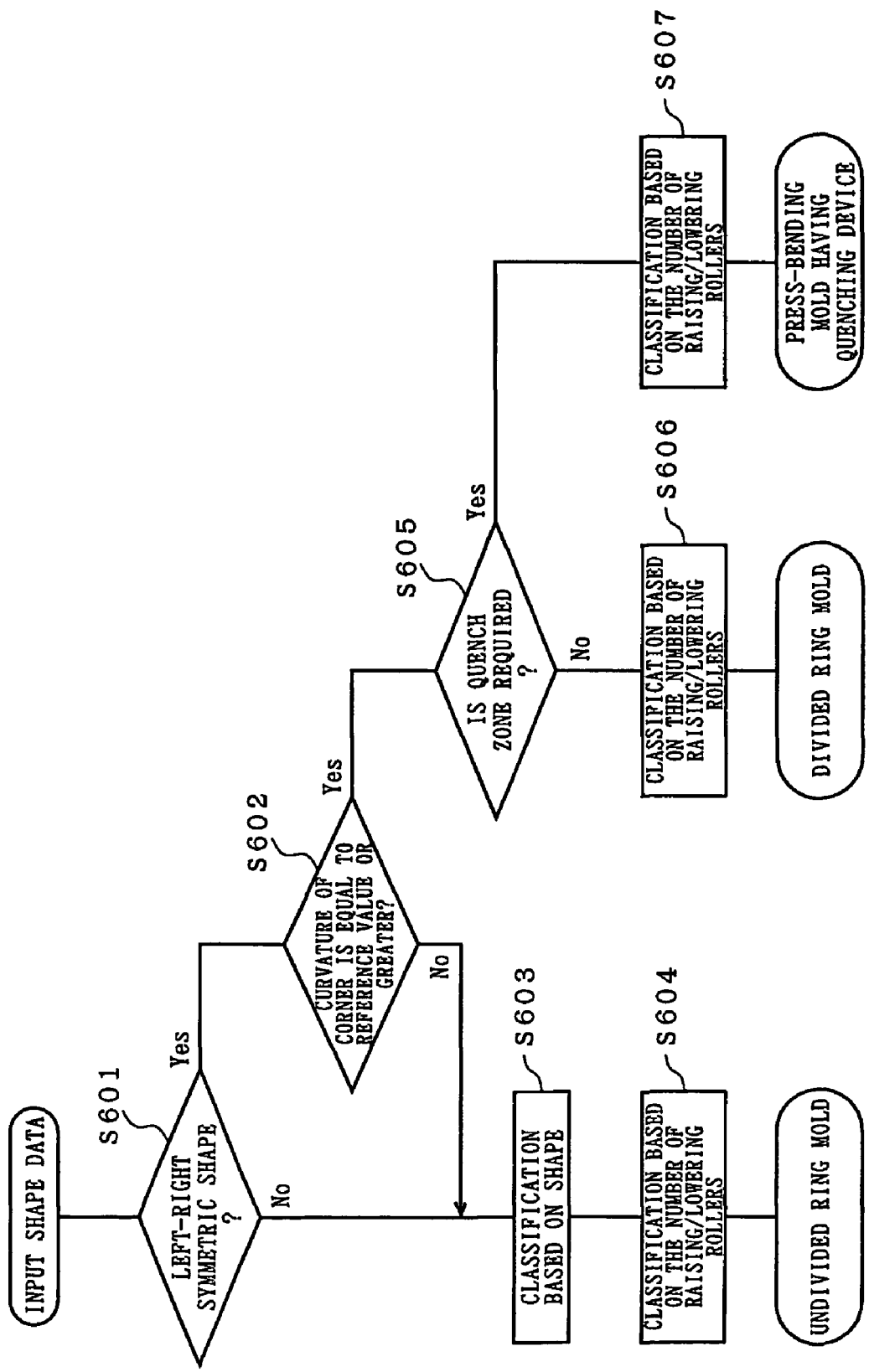
FIG. 64 is a flowchart showing a procedure for selecting an existing solid-model.

There will be described hereinafter respective means. Here, FIG. 64 is a flowchart showing a procedure for selecting an existing solid-model. The relevant-model selecting means 556 according to the second embodiment of the present invention has a function: to identify a glass plate shape based on inputted shape data of a glass plate; and to look up the existing-solid-model storing part 563 so as to select an existing solid-model for a glass shape approximating the targeted glass shape.

As concretely and exemplarily shown in FIG. 64, the relevant-model selecting means 556 judges whether the shape of the glass plate is left-right symmetric or not, based on the inputted glass-plate shape data (including designed values and attributions thereof) (step 601). If the glass plate shape is judged to be left-right symmetric, it is then judged whether the curvatures of the curved portions (corners) are equal to reference values or greater (step 602).

When the glass plate shape is judged to be left-right asymmetric at step 601 and when the curvatures of the corners are judged to be smaller than the reference values at step 602, there is conducted a classification based on the glass shape (such as triangle, quadrilateral) (step 603) and there is conducted a classification based on the number of raising/lowering rollers (step 604), to thereby extract an approximating type of an existing solid-model from models of press-bending molds having undivided pressing ring molds, respectively.

When the curvatures of the corners are judged to be equal to the reference values or greater at step 602, it is then judged whether quench zones are required or not (step 605). When the quench zones are judged to be unnecessary, there is conducted a classification based on the number of raising/lowering rollers (step 606) to thereby extract an approximating type of an existing solid-model from models of press-bending molds having divided pressing ring molds, respectively.

Meanwhile, when the quench zones are judged to be necessary at step 605, there is conducted a classification based on the number of raising/lowering rollers (step 607) to thereby extract an approximating type of an existing solid-model from models of press-bending molds having quenching devices, respectively.

Based on such steps, the relevant-model selecting means 556 selects or retrieves a relevant existing solid-model from the existing-solid-model storing part 563.

(Glass-Shape Exchanging Means)

There will be described hereinafter a glass shape exchanging means 557. The glass shape exchanging means 557 has a function to construct another solid model by modifying the inputted shape of an existing solid-model. Namely, the glass shape exchanging means 557 has a function to construct a new solid model, by replacing: the shape data of the glass plate as a basis for constructing the existing solid-model; by the shape data of a new glass plate inputted from the input means 555.

Concretely, the glass-shape exchanging means matches: those elements constituting the shape of the glass plate (basic glass plate) as a basis for constructing the selected or retrieved existing solid-model; with elements constituting the shape of a new glass plate; based on the attributions of designed values possessed by both pieces of the shape data of the basic glass plate and new glass plate; such that the glass-shape exchanging means replaces, the designed values of the basic glass plate of the selected or retrieved existing solid-model, by the designed values of the new glass plate, for each matched pair of identical elements. Concretely, in case of a glass plate having a quadrilateral outer shape, the designed values of the basic glass plate are replaced by the designed values of the new glass plate, for each of the upper edge, lower edge, left edge and right edge which are the elements of the outer shape.

In this way, the glass-shape exchanging means 557 replaces, the shape data of the glass plate as a basis for constructing the existing solid-model, by the shape data of the new glass plate inputted from the input means 555.

Next, there are modified the subordinate designed values depending on the glass plate shape, based on the shape data of the new glass plate. Concretely, the pressing ring mold provided by the existing solid-model is remodeled into a pressing ring mold conforming to the new glass plate shape. Further, there are modified the shapes, for example, of the upper quenching portion and lower quenching portion.

Meanwhile, there are inherited those values of the existing solid-model, concerning the arbitrarily modifiable parameters, such as the dividing positions, the positions of rotation axes, positions of stoppers and aligners. Further, there are inherited those values of the existing solid-model as they are, concerning the fixed designed values such as the horizontal positions, heightwise positions and pitches of the transfer rollers.

Further, those subordinate designed values such as depending on the shape of the pressing ring mold (i.e., those subordinate designed values indirectly depending on the glass plate shape) are modified such as based on the shape of the new pressing ring mold. These subordinate designed values include, for example, the shape of outer frame, shape of upper mold, lengths of joints (joining members), lengths of adjusting members, lengths of raising/lowering rollers, and shape of lower mold.

(Modified Parameter Reflecting Means)

Next, the modified-parameter reflecting means 558 has a function to reflect: the values of modifiable parameters inputted from the input means 555, for example; to the new solid model constructed by the glass shape exchanging means 557.

Namely, the modifiable parameters (such as stoppers positions) within the solid model are modified in accordance with the values of the inputted parameters. Further, there are also modified those subordinate designed values to be settled based on the modified parameters.

Concretely, when the dividing positions have been modified, there are also modified the dividing positions of the pressing ring mold and outer frame in the solid model. Further, when the positions of stoppers and aligners have been modified, there are modified the positions of stoppers and aliners in the solid model.

Moreover, when the positions of the stoppers and aligners have been modified, there are modified, in the solid model, the positions and shapes of notches provided in upper mold depending on the modified positions and shapes of the stoppers and aligners, respectively.

Herein, those parameters to be inputted from the input means 555 are not limited to the dividing positions, and positions of the stoppers and aligners, for example. Such parameters may include those alterable or modifiable designed values which constitute the press-bending mold.

Further, these alterable or modifiable designed values can be appropriately settled such as based on the specifications of the press-bending mold.

(Stopper/Aligner Adjusting Means)

Figure 65:
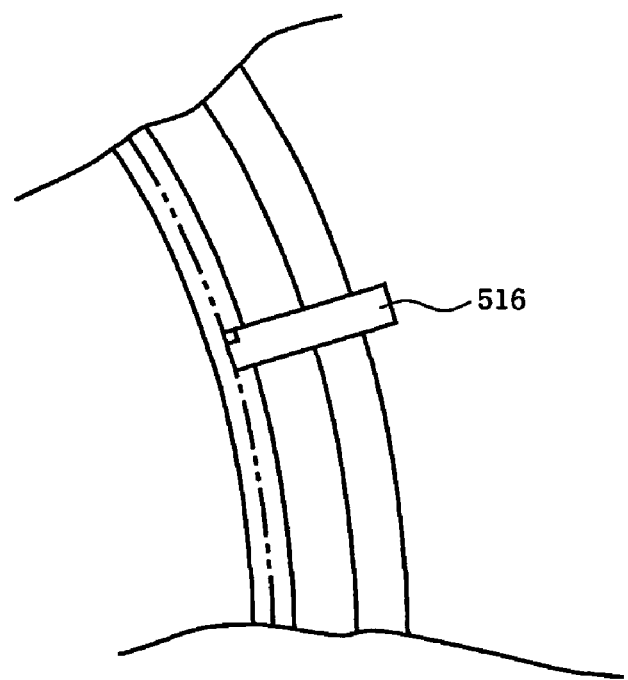
Figure 66:
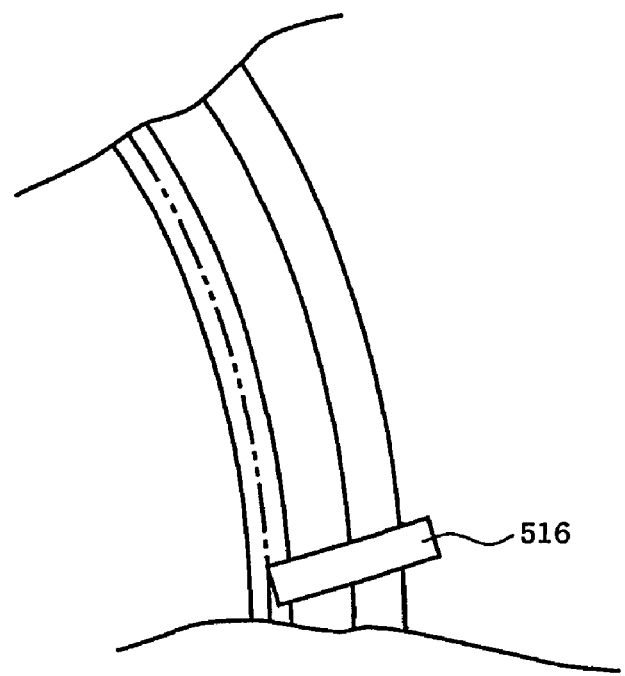

There will be explained hereinafter the stopper/aligner adjusting means 559. Here, FIGS. 65 through 67 are schematic views for explaining adjustment of stoppers and aligners. The stopper/aligner adjusting means has a function to adjust each of the stoppers and aligners to be positioned in a direction perpendicular to the outline of the glass.

As concretely shown in FIG. 65, each stopper 516 is provided in a direction for perpendicularly contacting with the outline of the glass plate. When the position of such a stopper 516 has been modified, or when the shape data of the glass plate has been modified, the angle defined between the glass outline and the stopper 516 may be deviated from a right angle as shown in FIG. 66.

As such, the stopper/aligner adjusting means 559 is to adjust and correct the directions of the stoppers and aligners, to thereby render the stoppers and aligners to be perpendicular to the glass outline, respectively. In this way, the direction of each stopper 516 is adjusted to be positioned in the direction perpendicular to the glass outline as shown in FIG. 67.

(Rotation-Center Adjusting Means)

There will be explained hereinafter the rotation-center adjusting means 560. Here, FIG. 68 is a view showing a flat-plate placing state of the pressing ring mold. The rotation-center adjusting means 560 has a function to adjust contact points between the pressing ring mold and glass plate (flat plate), in the state (i.e., flat-plate placing state) shown in FIG. 68 where the side segments of the pressing ring mold are rotated outwardly of the pressing ring mold to thereby place the glass plate (flat plate) on the pressing ring mold.

Concretely, the rotation-center adjusting means 560 is to calculate the contact points between: the pressing ring mold in the flat-plate placing state; and the glass plate assumed to be horizontally placed thereon. Then, the rotation-center adjusting means 560 judges whether the side segments of the pressing ring mold contact with the glass plate. If not, the rotation-center adjusting means 560 modifies the positions of the rotation axes. In this way, the positions of the rotation axes are adjusted such that the side segments of the pressing ring mold contact with the glass plate.

Note, when the positions of the rotation axes are modified, the modified-parameter reflecting means 558 is to modify the lengths of the hinge plates depending on the positions of the rotation axes.

(Interference Checking Means)

There will be explained hereinafter the interference checking means 561. The interference checking means 561 has a function to analyze the operation of the quenching ring mold and to confirm the interference of the quenching ring mold with other constituent parts.

Concretely, there is prepared an analysis model, by adding the constraint conditions retrieved from the constraint-condition storing part 564, to the data of the inputted solid model. Then, by using this analysis model, there is conducted a simulation for a case where the quenching ring mold is horizontally moved, to thereby confirm the interference of the quenching ring mold with the upper mold and upper quenching portion.

Further, the interference checking means 561 may indicate positions of those interference between the quenching ring mold and other constituent parts, if any.

Next, the design-drawing preparing means 562 has a function to fabricate design drawings based on the data of the prepared solid model of the press-bending mold.

Concretely, the design-drawing preparing means 562 fabricates designing data (such as two-dimensional design drawings) for fabricating a press-bending mold from the 3-dimensional solid model, based on the designing information such as dimensions, shapes and arrangement included in the solid model. Note, the designing data to be prepared may be electronic data, which can be transmitted to another computer and recorded into a recording medium, while the designing data may be also outputted onto a paper medium.

(Procedure of Designing Method)

Figure 70:
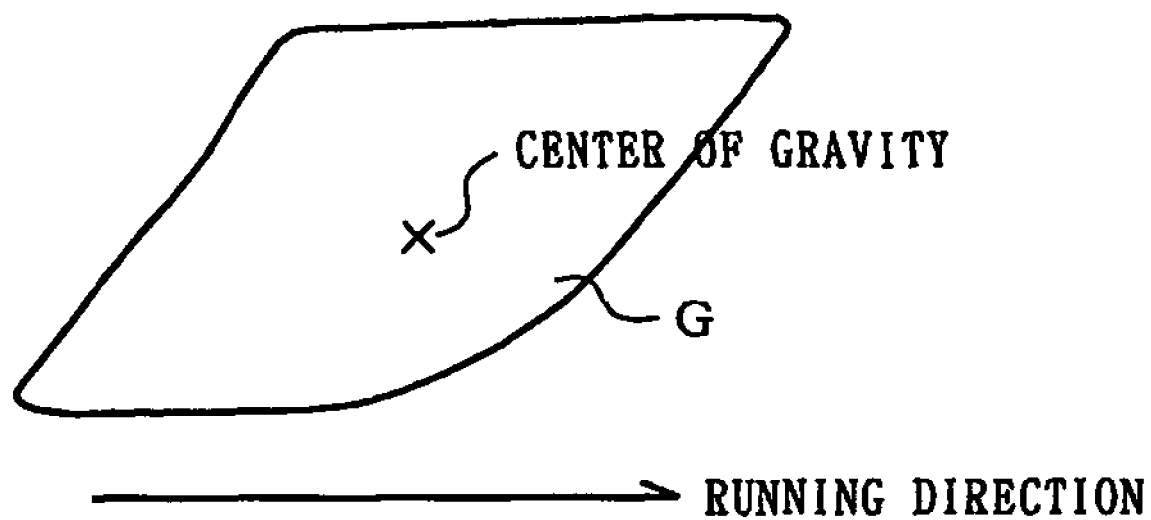
FIG. 70 is a view showing an exemplary shape of a glass plate as a design target.
Figure 71:
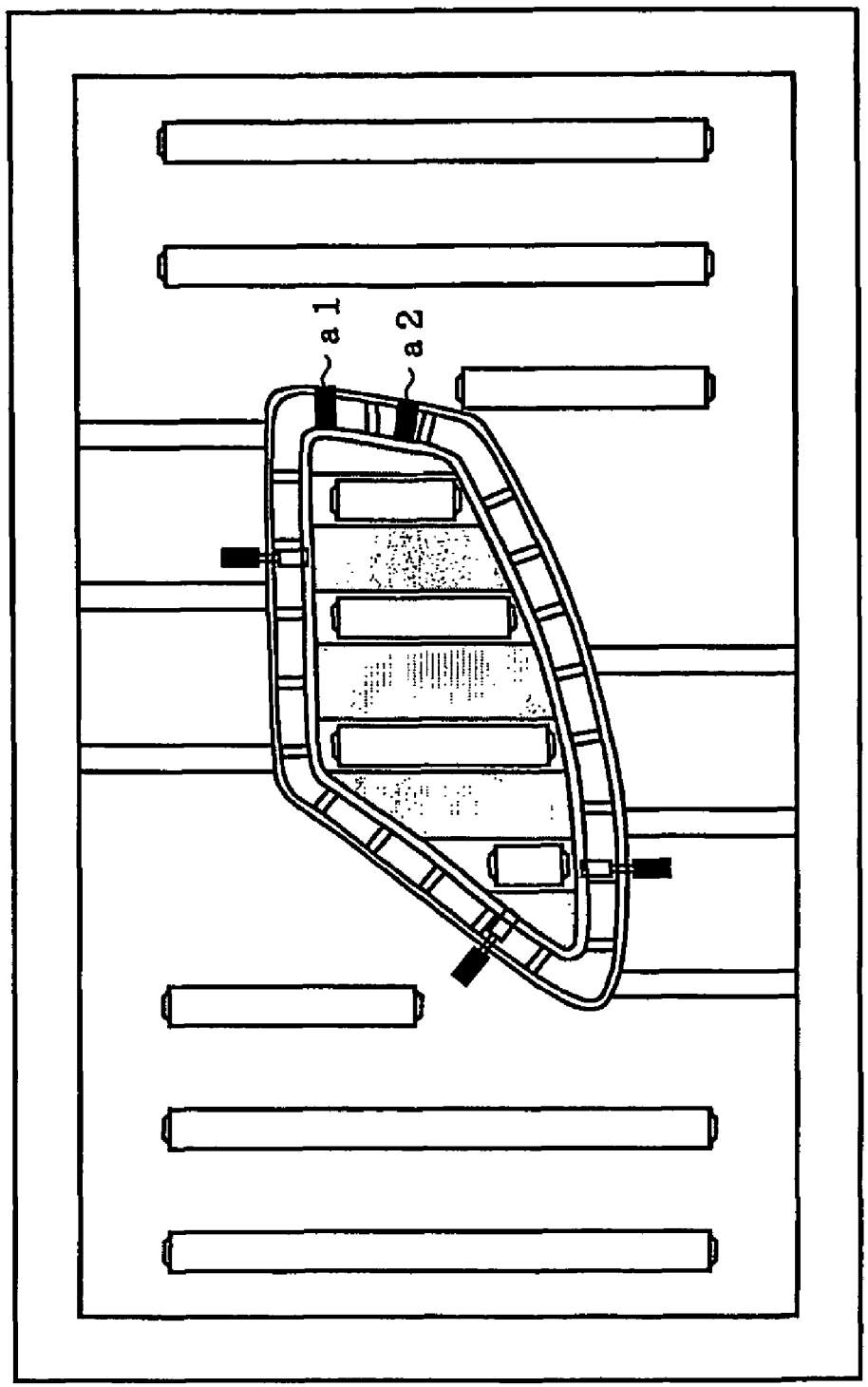
FIG. 71 is a view showing an exemplary constitution of an existing solid-model.
Figure 72:
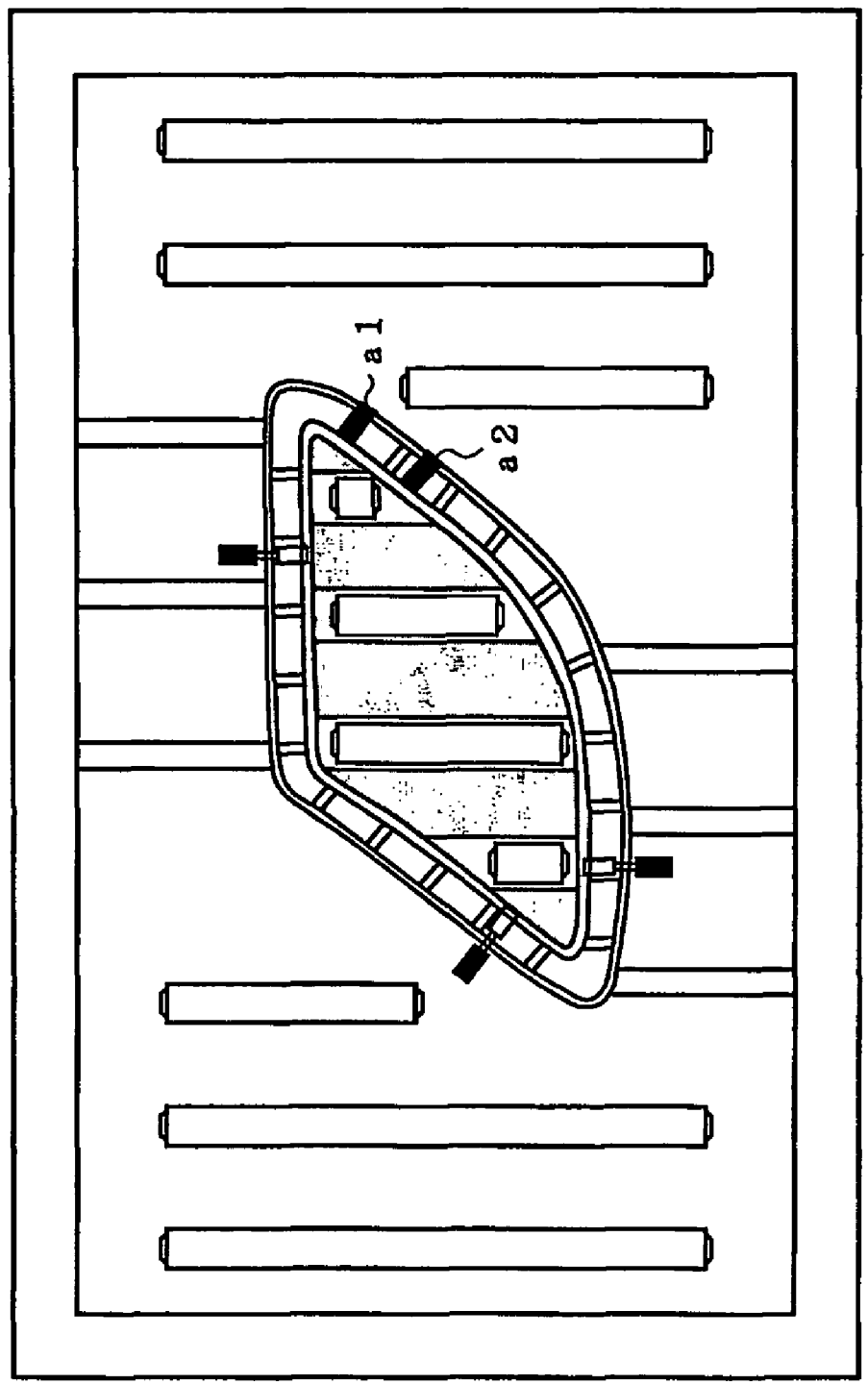
FIG. 72 is a view showing an exemplary constitution of a solid model remodeledly generated by the glass-shape exchanging means.
Figure 74A:
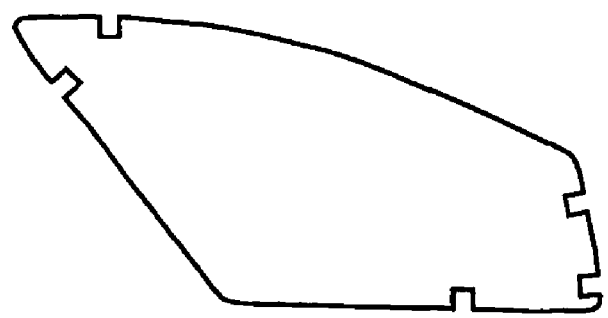
FIGS. 74A, 74B and 74C are views showing corrected examples of upper molds.
Figure 74B:
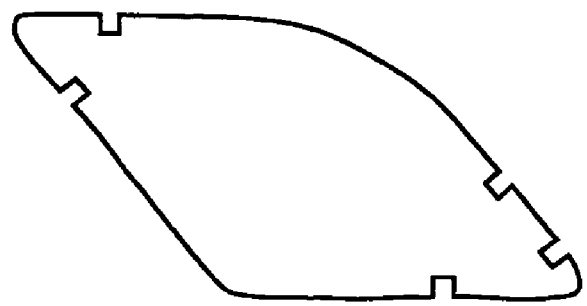
Figure 74C:
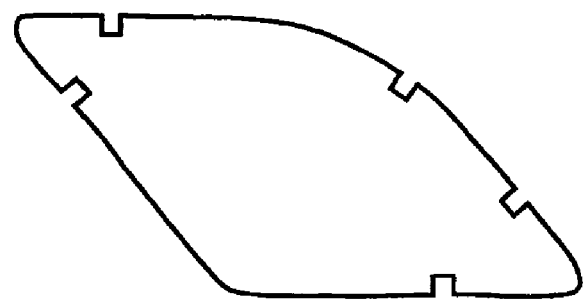

There will be explained hereinafter the designing method of a glass-plate-aimed press-bending mold making use of the aforementioned 3-dimensional CAD system, with reference to the accompanying drawings. Here, FIG. 69 is a flowchart for explaining a method for designing a glass-plate-aimed press-bending mold; FIG. 70 is a view showing an exemplary shape of a glass plate as a design target; FIG. 71 is a view showing an exemplary constitution of an existing solid-model; FIG. 72 is a view showing an exemplary constitution of a solid model remodeledly generated by the glass-shape exchanging means; FIG. 73 is a view showing an exemplary constitution of a solid model reflecting the modifications of parameters; and FIGS. 74A, 74B and 74C are views showing corrected examples of upper molds. Note, there shall be taken the aforementioned first press-bending mold, for example.

To be firstly given are the shape data (including designed values and attributions thereof) of a new glass plate (door glass) G as shown in FIG. 70 targeted by the bending mold design, while specifying the center of gravity and running direction of the new glass plate, for example. The relevant-model selecting means 556 or a human operator is to look up the existing-solid-model storing part 563 so as to select and retrieve a pertinent existing solid-model (step 701).

Concretely, in a situation where the existing-solid-model storing part 563 stores therein a plurality of existing solid-models, there is retrieved an existing solid-model of a press-bending mold such as having the same basic structure as the bending mold to be designed (for example, there is retrieved a bending mold having an undivided pressing ring mold, in case of door glass).

Alternatively, in accordance with the shape of the new glass plate, it is possible to retrieve an existing solid-model of a press-bending mold for a glass plate of a shape having higher similarities to the shape of the new glass plate.

Yet alternatively, based on the required number of raising/lowering rollers, it is also possible to retrieve an existing solid-model having the same number of raising/lowering rollers.

Next (at step 702), the glass-shape exchanging means 557 is inputted with: the shape data of the new glass plate; and the data of the existing solid-model retrieved from the existing-solid-model storing part 563 such as shown in FIG. 71 and FIG. 74A. Here, reference characters a1, a2 in FIG. 71 designate positions of stoppers.

The glass-shape exchanging means 557 is to replace: the shape data of the glass plate as a basis upon constructing the existing solid-model; by the shape data of the new glass plate. Concretely, the elements (upper, lower, left and right edges) constituting the outer shape of the glass plate as a basis of the existing solid-model are matched with elements (four edges) constituting the outer shape of the new glass plate. Then, concerning both glass plates, the surfaces contacting with the pressing ring mold, the centers of gravity and running directions are mutually matched, respectively, so as to replace: those designed values defining the glass plate shape possessed by the existing solid-model; by the designed values defining the new glass plate shape.

Based on the shape data of the new glass plate, the glass-shape exchanging means 557 is to remodel the pressing ring mold provided by the existing solid-model into a pressing ring mold conforming to the new glass plate shape. Further, the glass-shape exchanging means 557 is to modify the shapes of the upper mold and lower mold, in accordance with the new glass plate shape. Further, there are inherited those values of the existing solid-model, concerning the arbitrarily modifiable parameters such as positions of the stoppers and aligners. For example, the positions of the stoppers are kept unchanged at the predetermined distances (a1, a2) from the longitudinal center line of the pressing ring mold.

Concerning those subordinate designed values directly or indirectly depending on the glass plate shape such as the shape of outer frame, lengths of adjusting members, lengths of joints (joining members) and lengths of raising/lowering rollers, such values are modified based on the shape data of the new glass plate, to thereby construct a new solid model as shown in FIG. 72 and FIG. 74B (step 703).

In this way, the glass plate shape targeted by the bending mold design can be readily reflected to the existing solid-model. Further, the pertinent existing solid-model can be modified in a short time.

Then, it is judged by a human operator whether the modifiable parameters in the new solid model satisfy a predetermined designing criterion (step 704). Concretely, it is judged whether the positions of stoppers and aligners are suitable in view of the designing criterion.

When the positions of the stoppers and aligners are inappropriate, the human operator is to input new positions of the stoppers and aligners, by the input means 555 (step 705).

When the positions of the stoppers and aligners are changed, the modified-parameter reflecting means 558 changes the positions of the stoppers and aligners in the new solid model in accordance with the inputted values.

Further, the stopper/aligner adjusting means 559 judges whether the directions of the stoppers and aligners are suitable or not, and if not suitable, adjusts the directions of the stoppers and aligners to thereby position the stoppers and aligners in the directions perpendicular to the glass plate outline. In this way, the positions of stoppers in the solid model are changed as shown in FIG. 73 (step 706).

Further, the modified-parameter reflecting means 558 changes the positions and shapes of the notches of the upper mold, based on the changed positions and directions of the stoppers and aligners. In this way, there is obtained the solid model of the upper mold such as shown in FIG. 74C.

In this way, it becomes possible to readily utilize existing solid-models. Also, it becomes possible to readily reflect the design modification onto the solid model, to thereby confirm the result of the modification in a short time. This enables to obtain those values of parameters satisfying the desired design criteria, with simple procedures.

Then, the design-drawing preparing means 562 fabricates design drawings based on the inputted data of the solid model of the press-bending mold (step 707).

Figure 75:
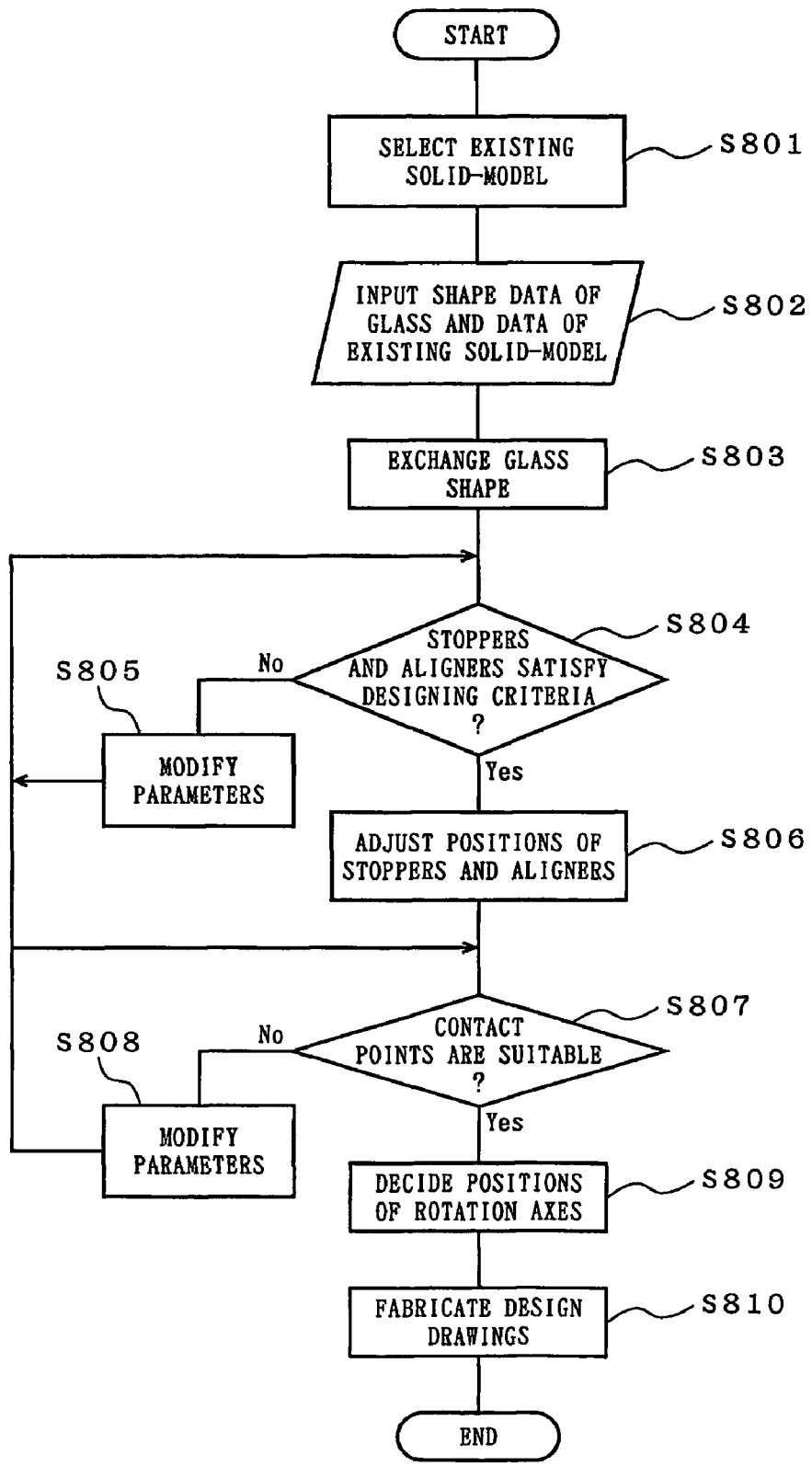
FIG. 75 is a flowchart for explaining a method for designing a glass-plate-aimed press-bending mold.
Figure 76:
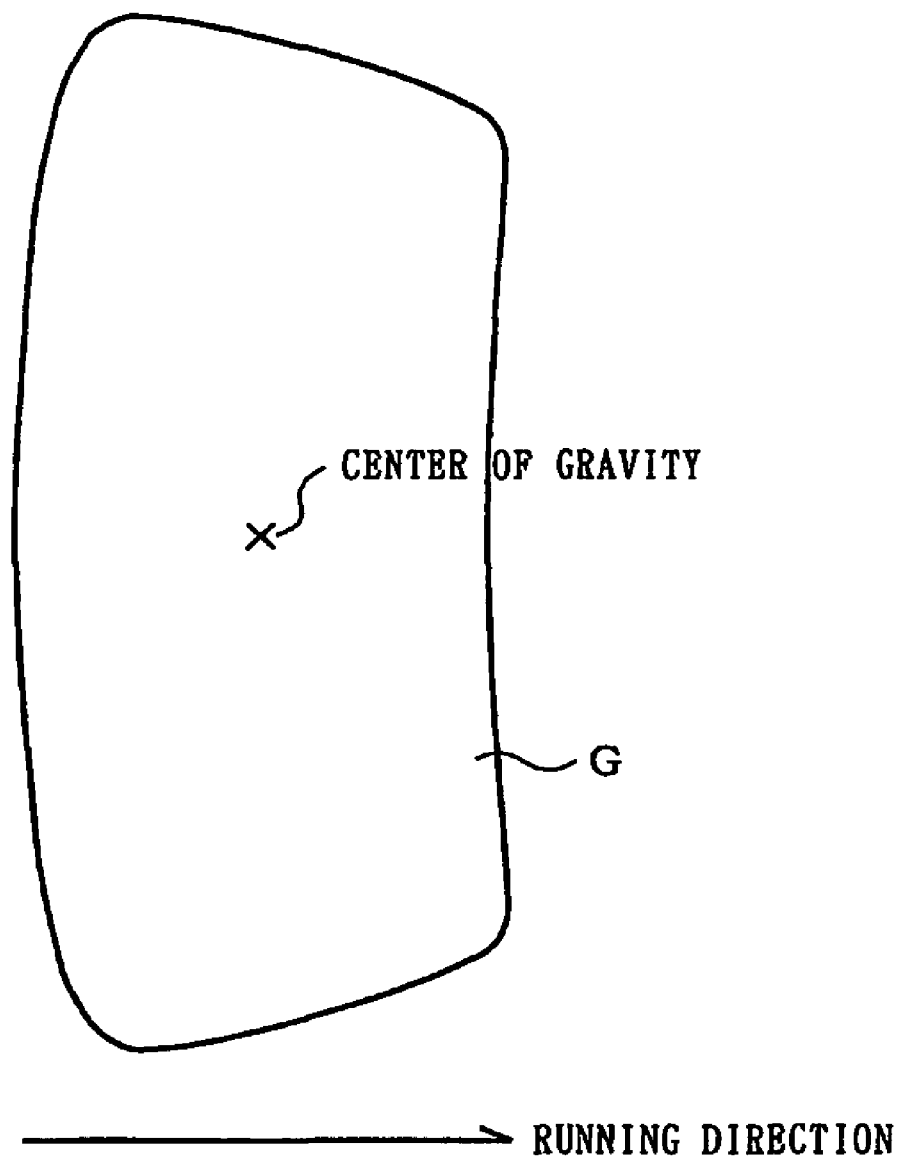
FIG. 76 is a view showing an exemplary shape of a glass plate as a design target.
Figure 79A:
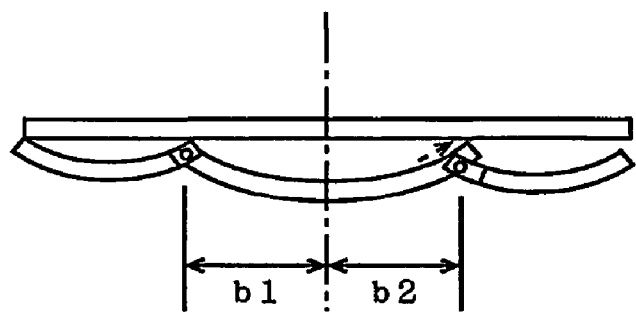
FIGS. 79A and 79B are views showing an exemplary constitution of a solid model reflecting the modification of the positions of rotation axes.
Figure 79B:
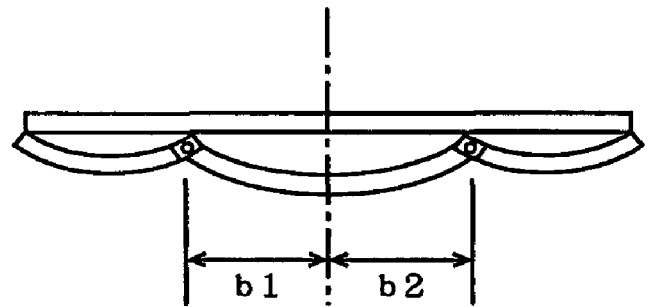

There will be described hereinafter a designing method of a press-bending mold, while targeting at the aforementioned second press-bending mold. Here, FIG. 75 is a flowchart for explaining a method for designing a glass-plate-aimed press-bending mold; FIG. 76 is a view showing an exemplary shape of a glass plate as a design target; FIG. 77 is a view showing an exemplary constitution of an existing solid-model; FIG. 78 is a view showing an exemplary constitution of a solid model remodeledly generated by the glass-shape exchanging means; and FIGS. 79A and 79B are views showing an exemplary constitution of a solid model reflecting the modification of the positions of rotation axes.

To be firstly given are the shape data (including designed values and attributions thereof) of a new glass plate (rear glass) G as shown in FIG. 76 targeted by the bending mold design, while specifying the center of gravity and running direction of the new glass plate, for example. The relevant-model selecting means 556 or a human operator is to look up the existing-solid-model storing part 563 so as to select and retrieve a pertinent existing solid-model as shown in FIG. 77 (step 801). Here, reference characters b1, b2 in FIG. 77 designate positions of the rotation axes.

Concretely, in a situation where the existing-solid-model storing part 563 stores therein a plurality of existing solid-models, there is retrieved an existing solid-model such as having a divided pressing ring mold.

Alternatively, based on the required number of raising/lowering rollers, it is possible to retrieve an existing solid-model having the same number of raising/lowering rollers.

There shall be omitted the explanation of step 802, since this step is the same as the above described step 702.

Based on the shape data of the new glass plate, the glass-shape exchanging means 557 is to remodel the pressing ring mold provided by the existing solid-model into a pressing ring mold conforming to the new glass plate shape. Further, the glass-shape exchanging means 557 is to modify the shapes of the upper mold and lower mold, in accordance with the new glass plate shape. Further, there are inherited those values of the existing solid-model, concerning the arbitrarily modifiable parameters such as dividing positions, positions of rotation axes, and positions of stoppers. For example, the positions of the rotation axes are kept unchanged at the predetermined distances (b1, b2) from the center line of the pressing ring mold in the fore-and-aft direction.

Concerning those subordinate designed values directly or indirectly depending on the glass plate shape such as the shape of outer frame, lengths of adjusting members, dimensions of supporting frame, lengths of joints (joining members) and lengths of raising/lowering rollers, such values are modified based on the shape data of the new glass plate, to thereby construct a new solid model as shown in FIG. 78 (step 803).

There shall be omitted the explanation of steps 804, 805, 806, since these steps are the same as the above described steps 704, 705, 706.

Thereafter, the rotation-center adjusting means 560 is to judge whether the contact points between the pressing ring mold and the glass plate (flat plate) are suitable or not in the flat-plate placing state of the new solid model (step 807).

Concretely, the rotation-center adjusting means 560 is to calculate the contact points between: the pressing ring mold in the flat-plate placing state; and the glass plate assumed to be horizontally placed. Then, the rotation-center adjusting means 560 judges whether the side segments of the pressing ring mold contact with the glass plate. If the side segments of the pressing ring mold do not contact with the glass plate as shown in FIG. 79A, the rotation-center adjusting means 560 modifies the parameters (positions of the rotation axes) acting as the determinants for determining the contact points (step 808).

When the positions of the rotation axes are modified, the rotation-center adjusting means 560 or modified-parameter reflecting means 558 is to modify the positions of the rotation axes in the new solid model in accordance with the modified values. Further, the modified-parameter reflecting means 558 modifies the lengths of the hinge plates, in accordance with the modified positions of the rotation axes. If the contact points between the pressing ring mold and glass plate are suitable as shown in FIG. 79B, the positions of the rotation axes are decided and adopted (step 809).

Such rotation-center adjusting means allows to readily obtain the positions of the rotation axes for permitting the pressing ring mold and glass plate to contact with each other at desired contact points. This allows to adjust the positions of the rotation axes in a short time, even in using an existing solid-model.

Next, the design-drawing preparing means 562 duly fabricates design drawings (step 810).

Figure 80:
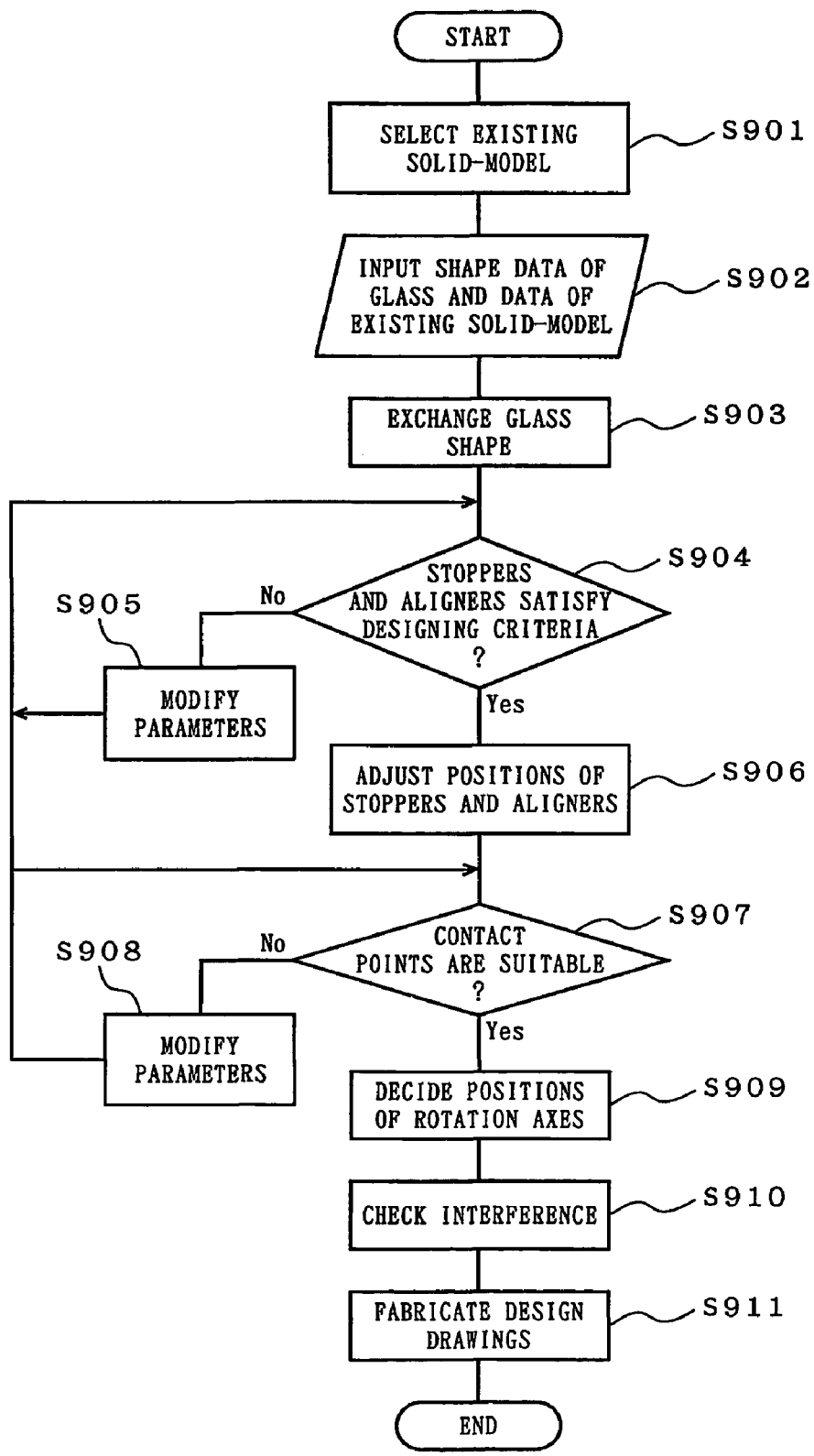
FIG. 80 is a flowchart for explaining a method for designing a glass-plate-aimed press-bending mold.

There will be described hereinafter a designing method of a press-bending mold, while targeting at the aforementioned third press-bending mold. Here, FIG. 80 is a flowchart for explaining a method for designing a glass-plate-aimed press-bending mold; FIG. 81 is a view showing an exemplary shape of a glass plate as a design target; and FIG. 82 is a view showing an exemplary constitution of a solid model remodeledly generated by the glass-shape exchanging means.

To be firstly given are the shape data (including designed values and attributions thereof) of a new glass plate (rear glass) G as shown in FIG. 81 targeted by the bending mold design, while specifying the center of gravity and running direction of the new glass plate, for example. The relevant-model selecting means 556 or a human operator is to look up the existing-solid-model storing part 563 so as to select and retrieve a pertinent existing solid-model (step 901).

Concretely, in a situation where the existing-solid-model storing part 563 stores therein a plurality of existing solid-models, there is retrieved an existing solid-model of a press-bending mold having a quenching device, for example.

Alternatively, based on the required number of raising/lowering rollers, it is possible to retrieve an existing solid-model having the same number of raising/lowering rollers.

There shall be omitted the explanation of step 902, since this step is the same as the above described step 802.

Based on the shape data of the new glass plate, the glass-shape exchanging means 557 is to remodel the pressing ring mold and quenching ring mold provided by the existing solid-model into a pressing ring mold and quenching ring mold conforming to the new glass plate shape. Further, the glass-shape exchanging means 557 is to modify the shape of upper mold, upper quenching portion and lower quenching portion in accordance with the new glass plate shape. Further, there are inherited those values of the existing solid-model, concerning the arbitrarily modifiable parameters such as positions of the stoppers and aligners.

Concerning those subordinate designed values directly or indirectly depending on the glass plate shape such as the shape of outer frame, lengths of adjusting members, lengths of joints and lengths of raising/lowering rollers, such values are modified based on the shape data of the new glass plate, to thereby construct a new solid model as shown in FIG. 82 (step 903).

There shall be omitted the explanation of steps 904 through 909, since these steps are the same as the above described steps 804 through 809.

(Check of Interference)

The interference checking means 561 analyzes the interference of the quenching ring mold. Concretely, the interference checking means 561 is inputted with the data of the new solid model and the constraint conditions stored in the constraint-condition storing part 564. The interference checking means 561 is to prepare an analysis model by adding the constraint conditions to the inputted data of the solid model. Then, by using this analysis model, there is conducted a simulation for a case where the quenching ring mold is horizontally moved, to thereby confirm the interference of the quenching ring mold with the upper mold and upper quenching portion (step 910). Then, the design-drawing preparing means 562 duly fabricates design drawings (step 911).

In this way, it becomes possible to readily check the interference in a short time without conducting a test based on a prototype, for example, in case of designing a press-bending mold corresponding to a new glass shape by utilizing an existing solid-model.

In the aforementioned description, it has been constitutionally settled that the human operator is to conduct the judgment whether the modifiable parameters within the solid model satisfies the predetermined design criteria or not.

However, the present invention is not limited thereto. It is also possible to modify the above constitution such that these judgments are partly or wholly conducted by predetermined deciding means to be realized by a computer. Such a modification is included within the scope of the present invention.

The present invention has been described based on a vehicular door glass or rear glass constituted of tempered glass. However, the present invention is not limited thereto. It is possible to adopt such as laminated glass, in addition to the tempered glass. Further, windshield glass will do, for example, in addition to door glass. Moreover, the present invention can be of course applied to the design of press-bending molds for other glass plates (such as window glass of buildings) in addition to vehicular glass.

Further, the present invention has been described based on the press-bending mold having a functionally 3-piece divided-type pressing ring mold (i.e., functional three pieces comprising central segment and side segments). However, the dividing configuration of the mold is not limited thereto. For example, the technical idea of the present invention is applicable to a design of a press-bending mold having a 2-piece divided-type pressing ring mold, and such an adaptation is included within the scope of the present invention.

While the present invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

INDUSTRIAL APPLICABILITY

According to the present invention as described above, it becomes possible to alter solid models of divided-type molds with simple procedures, and to prepare solid models of divided-type molds satisfying predetermined designing conditions.

Further, according to the present invention, it becomes possible to design a divided-type mold in a short time with simple procedures, for a glass plate having a new shape.

Furthermore, according to the present invention as described above, it becomes possible to alter solid models of press-bending molds with simple procedures, and to prepare solid models of press-bending molds satisfying predetermined designing conditions.

Further, according to the present invention, it becomes possible to design a press-bending mold in a short time with simple procedures, for a glass plate having a new shape.

What is claimed is:

1. A designing method of a new bending mold intended for use with a new glass plate making use of a 3-dimensional CAD application for solid models, said method comprising the steps of:
    providing bending-shape data of the new glass plate to be formed by the new bending mold to be designed;
    retrieving an existing solid-model of an existing bending mold from a solid model database, the existing solid-model determined based on bending-shape data of an existing glass plate;
    selectively replacing the bending-shape data of the existing glass plate with the bending-shape data of the new glass plate;
    remodeling the existing solid-model to generate a new solid model for the new bending mold based upon new design values, the new design values determined by automatically modifying design values of the existing solid-model required to be modified due to the replacing of the bending-shape data of the existing glass plate and by automatically inheriting design values of the existing solid-model not required to be modified due to the replacing of the bending-shape data of the existing glass plate;
    judging whether predetermined design criteria for any bending mold designed using the CAD application are satisfied by the new design values, or not;
    when the new design values do not satisfy the predetermined design criteria, modifying the new design values until the predetermined design criteria are satisfied; and
    when the new design values satisfy the predetermined design criteria, creating bending-mold fabricating data based on data of the new solid model.

2. A designing method of a new divided-type gravity-sagging/bending mold intended for use with a new glass plate making use of a 3-dimensional CAD application for solid models, said method comprising the steps of:
    providing bending-shape data of the new glass plate to be formed by the new divided-type gravity sagging/bending mold to be designed;
    retrieving art existing solid-model of an existing divided-type gravity-sagging/bending mold from a solid model database, the existing solid-model determined based on bending-shape data of an existing; glass plate;
    selectively replacing the bending-shape data of the existing glass plate bending-shape data of the new glass plate;
    remodeling the existing solid-model to generate a new solid model of the new divided-type gravity-sagging/bending mold based on new design values, the new design values determined by automatically modifying design values of the existing solid-model required to be modified due to the replacing of the bending-shape data of the existing glass plate and by automatically inheriting design values of the existing solid-model not required to be modified due to the replacing of the bending-shape data of the existing glass plate;
    judging whether predetermined design criteria for any bending mold designed using the CAD application are satisfied by the new design values, or not;
    when the new design values do not satisfy the predetermined design criteria, modifying the new design values until the predetermined design criteria are satisfied; and
    when the new design values satisfy the predetermined design criteria, automatically preparing a drawing of the new divided-type gravity-sagging/bending mold based on data of the new solid model.

3. A designing method of claim 2, wherein said solid model database stores therein existing solid-models of a plurality of divided-type molds classified based on features of shapes of glass plates; and
    wherein the existing solid-model of the existing divided-type gravity-sagging/bending mold retrieved from said solid model database is an existing solid-model of a divided-type gravity-sagging/bending mold designed for a glass plate having a high similarity to the bending-shape of the new glass plate.

4. A designing method of claim 2, further comprising the steps of:
    when the new design values satisfy the predetermined design criteria, providing constraint conditions which constrain movements of constituent parts constituting the new solid model to thereby prepare an analysis model, and analyzing the new divided-type gravity-sagging/bending mold by the analysis model to thereby calculate rotation moments tending to rotate rotative frames included in the new divided-type gravity-sagging/bending mold about predetermined rotation axes;
    judging whether the calculated rotation moments satisfy predetermined moment-design criteria, or not; and
    when the calculated rotation moments do not satisfy the predetermined moment-design criteria, modifying the new design values until the predetermined moment-design criteria are satisfied.

5. A designing method of claim 2, in which the new divided-type gravity-sagging/bending mold comprises rotative frames and counterweights for adjusting rotation moments tending to rotate the rotative frames about predetermined rotation axes said method further comprising the steps of:
    when the new design values satisfy the predetermined design criteria, providing constraint conditions which constrain movements of constituent parts constituting the new solid model to thereby prepare an analysis model, and analyzing the new divided-type gravity-sagging/bending mold by the analysis model to thereby calculate rotation moments;
    judging whether the calculated rotation moments satisfy predetermined moment-design criterion, or not; and
    when the calculated rotation moments do not satisfy the predetermined moment-design criteria, adjusting the counterweights until the predetermined moment-design criteria are satisfied.

6. A designing method of a new press-bending mold intended for use with a new glass plate making use of a 3-dimensional CAD application for solid models, said method comprising the steps of:
    (a) providing bending-shape data of the new glass plate to be formed by the new press-bending mold to be designed;
    (b) retrieving, from a solid model database, an existing solid-model of an existing press-bending mold for an existing glass plate having a most analogous shape to a bending shape of the new glass plate to be formed, the existing solid-model determined based on bending-shape data of the existing glass plate;
    (c) matching the bending-shape data of the new glass plate to be formed with the bending-shape data of the existing glass plate to provide matched pairs of bending-shape data, and for each matched pair of bending-shape data, selectively exchanging the bending-shape data of the existing glass plate with the bending-shape data of the new glass plate;

(d) remodeling the existing solid-model into a new solid model of the new press-bending mold for the new glass plate based upon new design values, the new design values determined by automatically modifying design values of the existing solid-model required to be modified due to the exchanging of the bending-shape data of the existing glass plate and by automatically inheriting design values of the existing solid-model not required to be modified due to the exchanging of the bending-shape data of the existing glass plates;

(e) judging whether predetermined design criteria for any bending mold designed using the CAD application are satisfied by the new design values, or not;

(f) when the new design values do not satisfy the predetermined designing criteria, modifying the new design values until the predetermined design criteria are satisfied.

(g) when the values of the predetermined parameters satisfy the predetermined design criteria, creating press-bending-mold fabricating data based on data of new solid model.

7. A designing method of claim 6, in which the new press-bending mold includes a divided pressing ring mold, and constituent parts of the divided pressing ring mold are rotated about at least one predetermined rotation axis, said method further comprising the steps of:

(h) judging whether contact points between the pressing ring mold and the new glass plate, when the new glass plate before press-bending is horizontally placed on the pressing ring mold in a bent state, are suitable or not;

(i) when the contact points are unsuitable, modifying the position of each rotation axis; and (j) repeating the steps (h) and (i) until the contact points become suitable.

8. A designing method of claim 6, in which the new press-bending mold includes a quenching device having a quenching ring mold, said method further comprising the steps of:

(k) conducting a simulation for horizontally moving the quenching ring mold; and (l) checking whether the quenching ring mold interferes with other constituent parts as a result of the simulation, or not.

9. A designing system of a new press-bending mold intended for use with a new glass plate making use of a 3-dimensional CAD application for solid models, said system comprising:

relevant-model selecting means for retrieving, from a solid model database, an existing solid-model of an existing press-bending mold for an existing glass plate having a most analogous shape to a bending shape of the new glass plate to be formed by the new press-bending mold to be designed;

glass-shape exchanging means for matching bending-shape data of the existinig glass plate with bending-shape data of the new glass plate to provide matched pairs of bending-shape data, and for each matched pair of bending-shape data, selectively exchanging the bending-shape date of the existing glass plate with the bending-shape data of the new glass plate;

remodeling means for remodeling the existing solid-model into a new solid model of the new press-bending mold for the new glass plate based upon new design values, the new design values determined by automatically modifying the existing design values of the existing solid-model required to be modified as a result of the exchanging between the bending-shape data of the existing glass plate and the new glass plates, and by automatically inheriting the existing design values of the existing solid-model not required to be modified due to the exchanging between the bending-shape data of the existing glass plates and the new glass plate;

modified-parameter reflecting means for reflecting modifiable parameters into the new solid model; and design-data preparing means for creating press-bending mold fabricating data based on data of the new solid model.

10. A designing system of claim 9, in which the new press-bending mold includes a divided pressing ring mold, and constituent parts of the divided pressing ring mold are rotated about at least one predetermined rotation axis, said system further comprising:

rotation-center adjusting means for (a) judging whether contact points between the pressing ring mold and the new glass plate, when the new glass plate before press-bending is horizontally placed on the pressing ring mold in a bent state, are suitable or not, (b) when the contact points are unsuitable, modifying the position of each rotation axis, and repeating the steps (a) and (b) until the contact points become suitable.

11. A designing system of claim 9, in which the new press-bending mold includes a quenching device having a quenching ring mold, said system further comprising:

interference checking means for conducting a simulation for horizontally moving the quenching ring mold; and checking whether the quenching ring mold interferes with other constituent parts as a result of the simulation, or not.

* * * * *